United States Patent
Nishihara et al.

(10) Patent No.: US 11,098,161 B2
(45) Date of Patent: Aug. 24, 2021

(54) POLYMER COMPOSITION

(71) Applicants: NISSAN CHEMICAL CORPORATION, Tokyo (JP); KYUSHU UNIVERSITY, NATIONAL UNIVERSITY CORPORATION, Fukuoka (JP)

(72) Inventors: Masamichi Nishihara, Fukuoka (JP); Shiyan Feng, Fukuoka (JP); Liana Christiani, Fukuoka (JP); Kazunari Sasaki, Fukuoka (JP); Shoichi Kondo, Funabashi (JP); Takahiro Kaseyama, Funabashi (JP); Taichi Nakazawa, Funabashi (JP); Takamasa Kikuchi, Funabashi (JP)

(73) Assignees: NISSAN CHEMICAL CORPORATION, Tokyo (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 131 days.

(21) Appl. No.: 16/339,211

(22) PCT Filed: Oct. 3, 2017

(86) PCT No.: PCT/JP2017/035935
§ 371 (c)(1),
(2) Date: Apr. 3, 2019

(87) PCT Pub. No.: WO2018/066546
PCT Pub. Date: Apr. 12, 2018

(65) Prior Publication Data
US 2020/0040137 A1 Feb. 6, 2020

(30) Foreign Application Priority Data

Oct. 4, 2016 (JP) .............................. JP2016-196739
Feb. 3, 2017 (JP) .............................. JP2017-019056
May 12, 2017 (JP) .............................. JP2017-096077

(51) Int. Cl.
| | | |
|---|---|---|
| *C08G 59/62* | (2006.01) | |
| *C08L 63/00* | (2006.01) | |
| *C08L 71/00* | (2006.01) | |
| *C08G 73/10* | (2006.01) | |
| *C08G 65/26* | (2006.01) | |
| *C08G 75/23* | (2006.01) | |
| *H01M 8/0221* | (2016.01) | |
| *H01M 8/103* | (2016.01) | |
| *H01M 8/1044* | (2016.01) | |

(52) U.S. Cl.
CPC ..... *C08G 73/1064* (2013.01); *C08G 65/2636* (2013.01); *C08G 73/1039* (2013.01); *C08G 75/23* (2013.01); *C08L 71/00* (2013.01); *H01M 8/0221* (2013.01); *H01M 8/103* (2013.01); *H01M 8/1044* (2013.01)

(58) Field of Classification Search
CPC ............ C08G 73/1064; C08G 65/2636; C08G 73/1039; C08G 75/23; C08G 73/10; C08G 65/4056; C08G 59/62; C08G 65/04; C08G 75/20; C08L 71/00; C08L 79/08; C08L 63/00; C08L 81/06; C08L 81/02; H01M 8/0221; H01M 8/103; H01M 8/1044; H01M 4/8663; H01M 8/1039; H01M 8/1027; H01M 8/1032; Y02E 60/50
See application file for complete search history.

(56) References Cited

U.S. PATENT DOCUMENTS

2006/0234059 A1   10/2006 Cella et al.
2013/0247992 A1   9/2013 Drees et al.

FOREIGN PATENT DOCUMENTS

| CN | 102117886 A | 7/2011 |
|---|---|---|
| JP | 2007-302717 A | 11/2007 |
| JP | 2011-68872 A | 4/2011 |
| JP | 2011-231281 A | 11/2011 |
| JP | 2015-518649 A | 7/2015 |
| TW | 201129635 A | 9/2011 |

(Continued)

OTHER PUBLICATIONS

Christiani et al., "Evaluation of Proton Conductivity of Sulfonated Polyimide/Dihydroxy Naphthalene Charge-Transfer Complex Hybrid Membranes", Journal of Polymer Science, Part A: Polymer Chemistry, vol. 52, 2014 (published online Aug. 14, 2014), pp. 2991-2997.

(Continued)

*Primary Examiner* — Irina S Zemel
(74) *Attorney, Agent, or Firm* — Birch, Stewart, Kolasch & Birch, LLP

(57) ABSTRACT

A composition containing electron-donating polymer (D) having a structure represented by the following formula (1), and electron-withdrawing polymer (A) having a structure represented by the following formula (2):

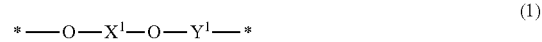

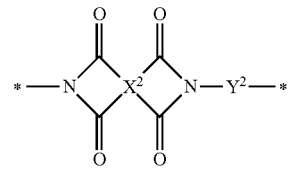

wherein definition of the symbols are as described in the DESCRIPTION is provided.

20 Claims, 9 Drawing Sheets

(56) References Cited

FOREIGN PATENT DOCUMENTS

WO     WO 2007/108118 A1     9/2007
WO     WO 2013/142841 A1     9/2013

OTHER PUBLICATIONS

Nishihara et al., "Experimental and Theoretical Study of Charge-Transfer Complex Hybrid Polyimide Membranes", Journal of Polymer Science, Part B: Polymer Physics, vol. 52, 2014 (published online Nov. 17, 2013), pp. 293-298.

Okamoto et al., "Anomalous dielectric response in tetrathiafulvalene-p-chloranil as observed in temperature-and pressure-induced neutral-to-ionic phase transition", Physical Review B, vol. 43, No. 10, Apr. 1, 1991, pp. 8224-8232.

Watari et al., "Preparation of novel polyimide hybrid materials by multi-layered charge-transfer complex formation", Polymer Journal, vol. 45, 2013 (published online Dec. 12, 2012), pp. 839-844.

Extended European Search Report dated Jul. 9, 2019, in European Patent Application No. 17858334.5.

Gabriel, G. J. and B. L. Iverson, "Aromatic Oligomers that Form Hetero Duplexes in Aqueous Solution," J. Am. Chem. Soc. (2002), vol. 124, pp. 15174-15175.

Zych, A. J. and B. L. Iverson, "Synthesis and Conformational Characterization of Tethered, Self-Complexing 1,5-Dialkoxynaphthalene/1,4,5,8-Napthalenetetracarboxylic Diimide Systems," J. Am. Chem. Soc. (2000), vol. 122, pp. 8898-8909.

(23a)

(24a)

POLYMER COMPOSITION

TECHNICAL FIELD

The present invention relates to a composition containing two or more different kinds of polymers.

BACKGROUND ART

Many materials that form charge-transfer complexes have been reported. For example, non-patent document 1 reports a charge-transfer complex using tetrathiafulvalene-p-chloranil and a derivative thereof. As polymer materials that form charge-transfer complexes, for example, non-patent documents 2 and 3 report a charge-transfer complex of a polymer, polyimide, and a low-molecular-weight compound dihydroxynaphthalene.

The materials of the charge-transfer complex of non-patent document 1 are low-molecular-weight compounds, and therefore, when the complex is utilized as a material, problems may occur in the stability. When the charge-transfer complex of non-patent document 2 and 3 is utilized as a material, leakage of the material (low-molecular-weight compound) and stability problem may occur. Therefore, a more stable material that can be utilized as a material has been desired.

DOCUMENT LIST

Non-Patent Documents non-patent document 1: Phys. Rev. B 43 (1991) 8224
non-patent document 2: Polymer Journal (2013) 45, 839-844
non-patent document 3: JOURNAL OF POLYMER SCIENCE, PART A POLYMER CHEMISTRY 2014, 52, 2991-2997

SUMMARY OF THE INVENTION

Problems to be Solved by the Invention

It is difficult to sufficiently mix different two or more kinds of polymers. Thus, in a composition containing different two or more kinds of polymers, suppression of phase separation in a micrometer order is difficult. Materials and membranes obtained from such polymer composition with phase separation sometimes fail to achieve sufficient function and strength. The present invention has been made taking note of such situation and aims to provide a composition containing different two or more kinds of polymers and showing suppressed phase separation in a micrometer order.

Means of Solving the Problems

The present inventors have conducted intensive studies and found that a composition of an electron-donating polymer having a rigid structure and an electron-withdrawing polymer having a soft structure, and a composition of an electron-donating polymer having a soft structure and an electron-withdrawing polymer having a rigid structure can form a charge-transfer complex of the electron-donating polymer and the electron-withdrawing polymer, as a result of which can suppress phase separation in a micrometer order. Formation of a charge-transfer complex between the main chains of different two or more kinds of polymers has not been reported. The present invention based on this finding is as described below.

[1] A composition comprising electron-donating polymer (D) and electron-withdrawing polymer (A), wherein the electron-donating polymer (D) has a structure represented by the formula (1):

$$*-O-X^1-O-Y^1-* \quad (1)$$

wherein $X^1$ is a divalent group containing a naphthalene ring,
$Y^1$ is a divalent group containing a $C_{3-10}$ alkylene group optionally having a substituent or a divalent group containing a benzene ring optionally having a substituent, and
*shows a bonding position, and
the electron-withdrawing polymer (A) has a structure represented by the formula (2):

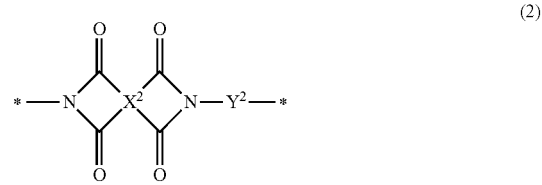

wherein $X^2$ is a tetravalent group containing a naphthalene ring,
when $Y^1$ is a divalent group containing a $C_{3-10}$ alkylene group optionally having a substituent, then $Y^2$ is a divalent group containing a benzene ring optionally having a substituent,
when $Y^1$ is a divalent group containing a benzene ring optionally having a substituent, then $Y^2$ is a divalent group containing a $C_{3-10}$ alkylene group optionally having a substituent, and
* shows a bonding position.
[2] The composition of the aforementioned [1], wherein at least one of $Y^1$ and $Y^2$ has a sulfo group.
[3] The composition of the aforementioned [1] or [2], wherein $Y^1$ is a divalent group containing a $C_{3-10}$ alkylene group optionally having a substituent, and $Y^2$ is a divalent group containing a benzene ring optionally having a substituent.
[4] The composition of any one of the aforementioned [1] to [3], wherein $X^1$ is a divalent group represented by the formula (3) or the formula (4):

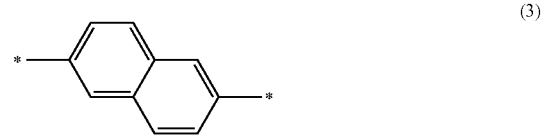

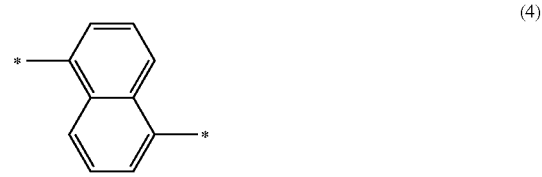

wherein * shows a bonding position.
[5] The composition of any one of the aforementioned [1] to [4], wherein $X^2$ is a tetravalent group represented by the formula (5), the formula (6-1) or the formula (6-2):

(5)

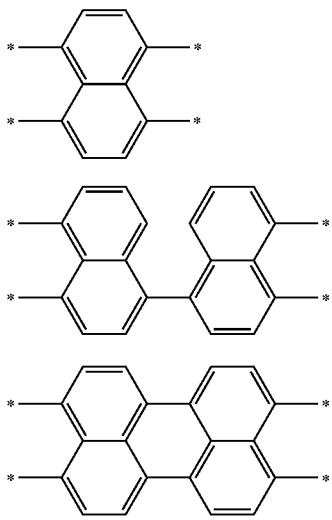

(6-1)

(6-2)

wherein * shows a bonding position.

[6] The composition of any one of the aforementioned [1] to [5], wherein $Y^1$ or $Y^2$ is a divalent group containing a structure represented by the formula (7):

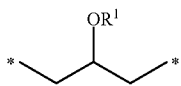
(7)

wherein $R^1$ is a hydrogen atom or a sulfo group, and * shows a bonding position.

[7] The composition of any one of the aforementioned [1] to [6], wherein $Y^1$ or $Y^2$ is a divalent group represented by any of the formula (8) to the formula (11):

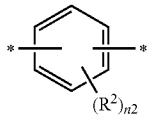
(8)

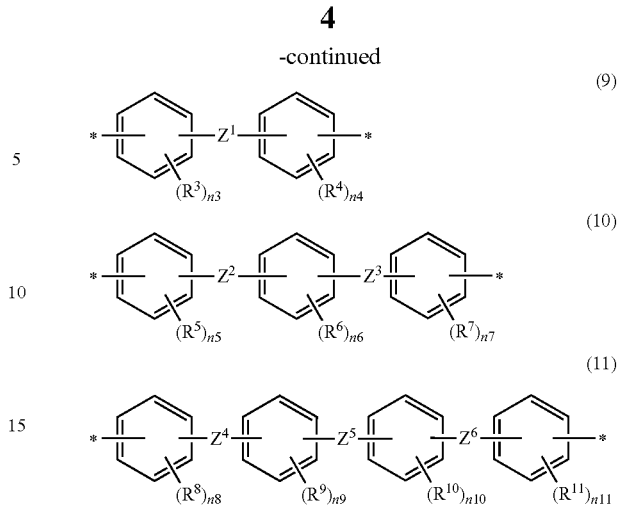

wherein n2 to n11 are each independently an integer of 0 to 4, $R^2$ to $R^{11}$ are each independently a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group, a sulfo group, a phenyl group optionally substituted by $W^1$, a thienyl group optionally substituted by $W^1$, or a furyl group optionally substituted by $W^1$, $W^1$ is a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group or a sulfo group, when n2 to n11 are an integer of 2 to 4, plural $R^2$ to $R^{11}$ are optionally the same as or different from each other, $Z^1$ to $Z^6$ are each independently a single bond, a $C_{1-2}$ alkylene group optionally substituted by a halogen atom, a $C_{3-10}$ alkylene group, a sulfonyl group, a carbonyl group, *—CONH—*, *—NHCO—*, *—C($R^{21}$)($R^{22}$)—*, or an oxy group, $R^{21}$ and $R^{22}$ are each independently a $C_{1-3}$ alkyl group optionally substituted by a halogen atom, or $R^{21}$ and $R^{22}$ are bonded to each other to form a $C_{3-6}$ hydrocarbon ring together with a carbon atom bonded thereto, and

* shows a bonding position.

[8] The composition of any one of the aforementioned [1] to [7], wherein the electron-donating polymer (D) comprises electron-donating polymer (D1) having a constitutional unit represented by the formula (12) or the formula (13):

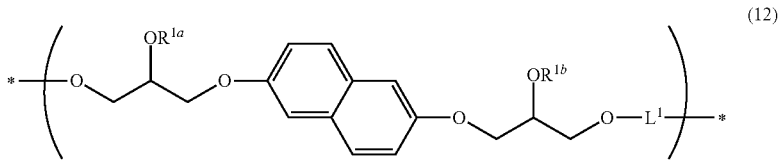
(12)

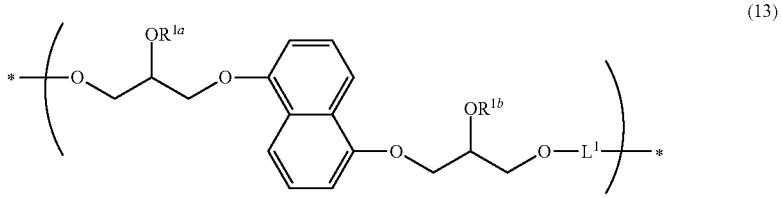
(13)

wherein L¹ is a divalent group represented by the formula (3), the formula (4) or the formula (14):

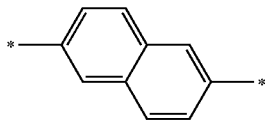
(3)

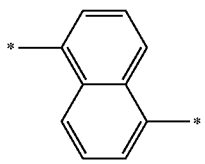
(4)

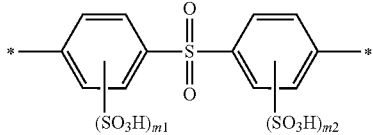
(14)

{wherein m1 and m2 are each independently an integer of 0 to 4, and * shows a bonding position},
when L¹ is a divalent group represented by the formula (3) or the formula (4), R$^{1a}$ and R$^{1b}$ are hydrogen atoms,
when L¹ is a divalent group represented by the formula (14), R$^{1a}$ and R$^{1b}$ are each independently a hydrogen atom or a sulfo group, and
* shows a bonding position.

[9] The composition of the aforementioned [8], wherein the electron-donating polymer (D1) comprises electron-donating polymer (D2) having a constitutional unit represented by the formula (15):

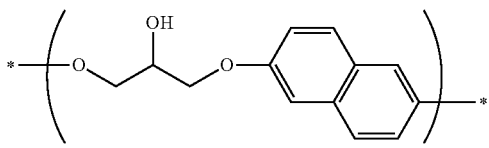
(15)

wherein * shows a bonding position.

[10] The composition of the aforementioned [8], wherein the electron-donating polymer (D1) comprises electron-donating polymer (D3) having a constitutional unit represented by the formula (16):

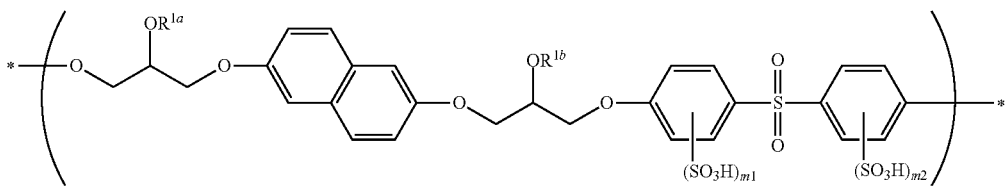
(16)

wherein R$^{1a}$ and R$^{1b}$ are each independently a hydrogen atom or a sulfo group,
m1 and m2 are each independently an integer of 0 to 4, and
* shows a bonding position.

[11] The composition of the aforementioned [8] or [10], wherein R$^{1a}$ and R$^{1b}$ are hydrogen atoms.

[12] The composition of the aforementioned [8], [10] or [11], wherein m1 and m2 are 0.

[13] The composition of any one of the aforementioned [7] to [12], wherein the divalent group represented by the formula (8) is a divalent group represented by the formula (8-1):

(8-1)

wherein n2, R² and * are as defined above, and
Z¹ to R⁶ are each independently a single bond, a C$_{1-2}$ alkylene group optionally substituted by a halogen atom, a C$_{3-10}$ alkylene group, a sulfonyl group, a carbonyl group, *—CONH—*, *—NHCO—*, or an oxy group.

[14] The composition of any one of the aforementioned [1] to [13], wherein the electron-withdrawing polymer (A) comprises electron-withdrawing polymer (A1a) having a constitutional unit represented by the formula (17a):

(17a)

wherein L$^{2a}$ is a divalent group represented by any of the formula (8) to the formula (11):

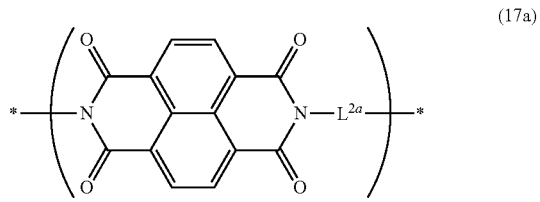
(8)

-continued

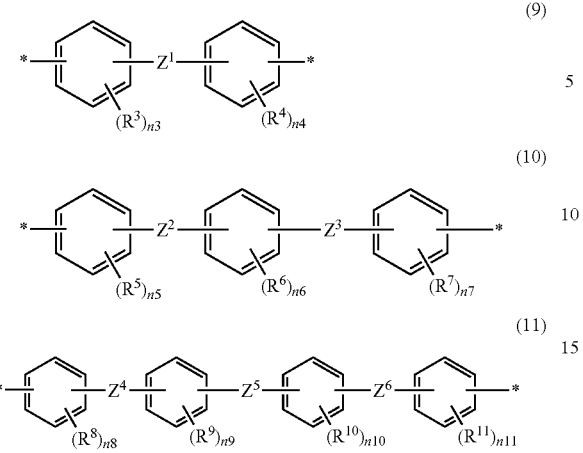

{wherein n2 to n11 are each independently an integer of 0 to 4, $R^2$ to $R^{11}$ are each independently a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group, a sulfo group, a phenyl group optionally substituted by $W^1$, a thienyl group optionally substituted by $W^1$, or a furyl group optionally substituted by $W^1$, $W^1$ is a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group or a sulfo group, when n2 to n11 are each an integer of 2 to 4, plural $R^2$ to $R^{11}$ are optionally the same as or different from each other, $Z^1$ to $Z^6$ are each independently a single bond, a $C_{1-2}$ alkylene group optionally substituted by a halogen atom, a $C_{3-10}$ alkylene group, a sulfonyl group, a carbonyl group, *—CONH—*, *—NHCO—*, *—C($R^{21}$)($R^{22}$)*, or an oxy group, $R^{21}$ and $R^{22}$ are each independently a $C_{1-3}$ alkyl group optionally substituted by a halogen atom, or $R^{21}$ and $R^{22}$ are bonded to each other to form a $C_{3-6}$ hydrocarbon ring together with a carbon atom bonded thereto, and

* shows a bonding position}, and

* shows a bonding position.

[15] The composition of the aforementioned [14], wherein the electron-withdrawing polymer (A1a) comprises electron-withdrawing polymer (A1b) having a constitutional unit represented by the formula (23):

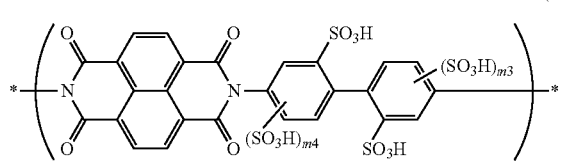

wherein m3 and m4 are each independently an integer of 0 to 3, and * shows a bonding position, and a constitutional unit represented by the formula (17b):

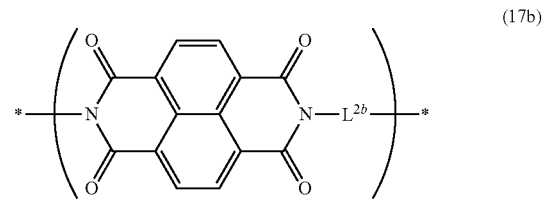

wherein $L^{2b}$ is a divalent group represented by any of the formula (8b) to the formula (11b):

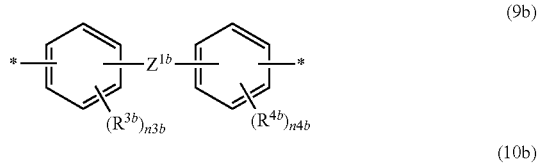

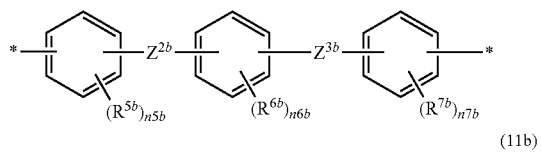

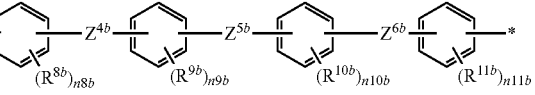

{wherein n2b to n11b are each independently an integer of 0 to 4, $R^{2b}$ to $R^{11b}$ are each independently a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group, a phenyl group optionally substituted by $W^{1b}$, a thienyl group optionally substituted by $W^{1b}$, or a furyl group optionally substituted by $W^{1b}$, $W^{1b}$ is a $C_{1-10}$ alkyl group optionally substituted by a halogen atom, a $C_{1-10}$ alkoxy group optionally substituted by a halogen atom, a hydroxy group, a halogen atom, a nitro group, a formyl group, or a cyano group, when n2b to n11b are each an integer of 2 to 4, plural $R^{2b}$ to $R^{11b}$ are optionally the same as or different from each other, $Z^{1b}$ to $Z^{6b}$ are each independently a single bond, a $C_{1-2}$ alkylene group optionally substituted by a halogen atom, a $C_{3-10}$ alkylene group, a sulfonyl group, a carbonyl group, *—CONH—*, *—NHCO—*, *—C($R^{21b}$)($R^{22b}$)—*, or an oxy group, $R^{21b}$ and $R^{22b}$ are each independently a $C_{1-3}$ alkyl group optionally substituted by a halogen atom, or $R^{21b}$ and $R^{22b}$ are bonded to each other to form a $C_{3-6}$ hydrocarbon ring together with a carbon atom bonded thereto, and

* shows a bonding position}, and

* shows a bonding position.

[16] The composition of the aforementioned [15], wherein a ratio of the number of the constitutional unit represented by the formula (23) and the number of the constitutional unit represented by the formula (17b) (number of constitutional unit represented by formula (23)/number of constitutional unit represented by formula (17b)) is 0.1/99.9 to 99.9/0.1.

[17] The composition of any one of the aforementioned [1] to [12], wherein the electron-withdrawing polymer (A) comprises electron-withdrawing polymer (A1) having a constitutional unit represented by the formula (17):

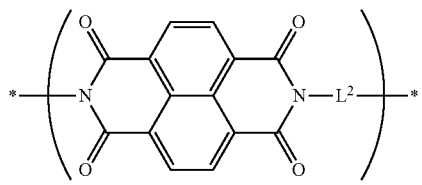

(17)

wherein $L^2$ is a divalent group represented by any of the formula (18) to the formula (22), the formula (31) and the formula (32):

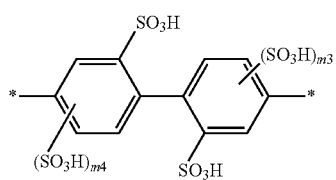

(18)

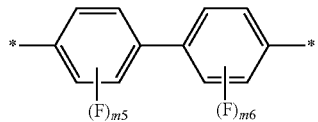

(19)

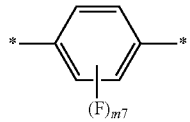

(20)

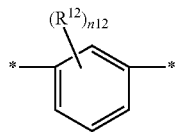

(21)

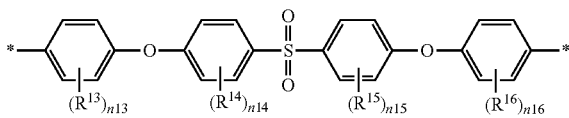

(22)

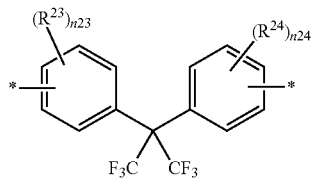

(31)

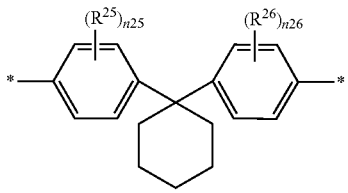

(32)

{wherein m3 and m4 are each independently an integer of 0 to 3,
m5 to m7 are each independently an integer of 1 to 4,
n12 is an integer of 1 to 4,
$R^{12}$ is a fluorine atom or a trifluoromethyl group, when n12 is an integer of 2 to 4, plural $R^{12}$ are optionally the same as or different from each other,
n13 to n16 are each independently an integer of 0 to 4,
$R^{13}$ is a nitro group, a sulfo group or a trifluoromethyl group, when n13 is an integer of 2 to 4, plural $R^{13}$ are optionally the same as or different from each other,
$R^{14}$ is a chlorine atom or a sulfo group, when n14 is an integer of 2 to 4, plural $R^{14}$ are optionally the same as or different from each other,
$R^{15}$ is a chlorine atom or a sulfo group, when n15 is an integer of 2 to 4, plural $R^{15}$ are optionally the same as or different from each other,
$R^{16}$ is a nitro group, a sulfo group or a trifluoromethyl group, when n16 is an integer of 2 to 4, plural $R^{16}$ are optionally the same as or different from each other,
n23 and n24 are each independently an integer of 0 to 4,
$R^{23}$ is a $C_{1-3}$ alkyl group optionally substituted by a halogen atom, or a sulfo group, when n23 is an integer of 2 to 4, plural $R^{23}$ are optionally the same as or different from each other,
$R^{24}$ is a $C_{1-3}$ alkyl group optionally substituted by a halogen atom, or a sulfo group, when n24 is an integer of 2 to 4, plural $R^{24}$ are optionally the same as or different from each other,
n25 and n26 are each independently an integer of 0 to 4,
$R^{25}$ is a $C_{1-3}$ alkyl group optionally substituted by a halogen atom, or a sulfo group, when n25 is an integer of 2 to 4, plural $R^{25}$ are optionally the same as or different from each other,
$R^{26}$ is a $C_{1-3}$ alkyl group optionally substituted by a halogen atom, or a sulfo group, when n26 is an integer of 2 to 4, plural $R^{26}$ are optionally the same as or different from each other, and
* shows a bonding position}, and
* shows a bonding position.

[18] The composition of the aforementioned [17], wherein $L^2$ is a divalent group represented by any of the formula (18) to the formula (22).

[19] The composition of the aforementioned [17], wherein the electron-withdrawing polymer (A1) comprises electron-withdrawing polymer (A2) having a constitutional unit represented by the formula (23):

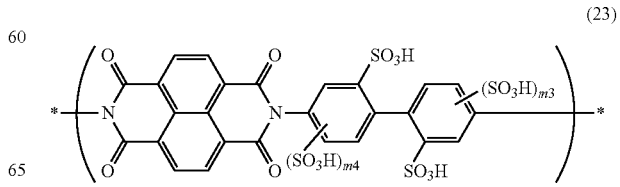

(23)

wherein m3 and m4 are each independently an integer of 0 to 3, and * shows a bonding position, and
a constitutional unit represented by the formula (24):

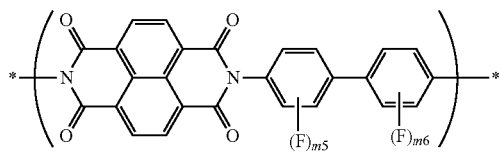

(24)

wherein m5 and m6 are each independently an integer of 1 to 4, and * shows a bonding position.

[20] The composition of the aforementioned [19], wherein a ratio of the number of the constitutional unit represented by the formula (23) and the number of the constitutional unit represented by the formula (24) (number of constitutional unit represented by formula (23)/number of constitutional unit represented by formula (24)) is 0.1/99.9 to 99.9/0.1.

[21] The composition of the aforementioned [17], wherein the electron-withdrawing polymer (A1) comprises electron-withdrawing polymer (A3) having a constitutional unit represented by the formula (23):

(23)

wherein m3 and m4 are each independently an integer of 0 to 3, and * shows a bonding position, and
a constitutional unit represented by the formula (25):

(25)

wherein m7 is an integer of 1 to 4, and * shows a bonding position.

[22] The composition of the aforementioned [21], wherein a ratio of the number of the constitutional unit represented by the formula (23) and the number of the constitutional unit represented by the formula (25) (number of constitutional unit represented by formula (23)/number of constitutional unit represented by formula (25)) is 0.1/99.9 to 99.9/0.1.

[23] The composition of the aforementioned [17], wherein the electron-withdrawing polymer (A1) comprises electron-withdrawing polymer (A4) having a constitutional unit represented by the formula (23):

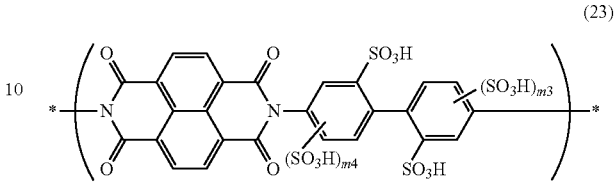

(23)

wherein m3 and m4 are each independently an integer of 0 to 3, and * shows a bonding position, and
a constitutional unit represented by the formula (26):

(26)

wherein n12 is an integer of 1 to 4,
$R^{12}$ is a fluorine atom or a trifluoromethyl group, when n12 is an integer of 2 to 4, plural $R^{12}$ are optionally the same as or different from each other, and
* shows a bonding position.

[24] The composition of the aforementioned [23], wherein a ratio of the number of the constitutional unit represented by the formula (23) and the number of the constitutional unit represented by the formula (26) (number of constitutional unit represented by formula (23)/number of constitutional unit represented by formula (26)) is 0.1/99.9 to 99.9/0.1.

[25] The composition of the aforementioned [17], wherein the electron-withdrawing polymer (A1) comprises electron-withdrawing polymer (A5) having a constitutional unit represented by the formula (23):

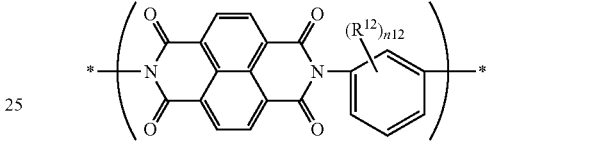

(23)

wherein m3 and m4 are each independently an integer of 0 to 3, and * shows a bonding position, and
a constitutional unit represented by the formula (27):

(27)

wherein n13 to n16 are each independently an integer of 0 to 4,

R[13] is a nitro group, a sulfo group or a trifluoromethyl group, when n13 is an integer of 2 to 4, plural R[13] are optionally the same as or different from each other, R[14] is a chlorine atom or a sulfo group, when n14 is an integer of 2 to 4, plural R[14] are optionally the same as or different from each other, R[15] is a chlorine atom or a sulfo group, when n15 is an integer of 2 to 4, plural R[15] are optionally the same as or different from each other, R[16] is a nitro group, a sulfo group or a trifluoromethyl group, when n16 is an integer of 2 to 4, plural R[16] are optionally the same as or different from each other, and

* shows a bonding position.

[26] The composition of the aforementioned [21], wherein a ratio of the number of the constitutional unit represented by the formula (23) and the number of the constitutional unit represented by the formula (27) (number of constitutional unit represented by formula (23)/number of constitutional unit represented by formula (27)) is 0.1/99.9 to 99.9/0.1.

[27] The composition of the aforementioned [17], wherein the electron-withdrawing polymer (A1) comprises electron-withdrawing polymer (A6) having a constitutional unit represented by the formula (23):

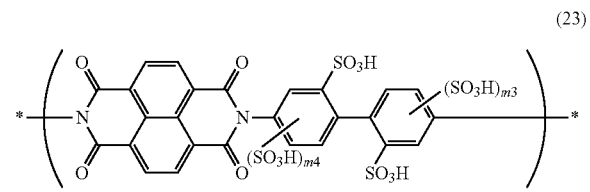

wherein m3 and m4 are each independently an integer of 0 to 3, and * shows a bonding position, and
a constitutional unit represented by the formula (33):

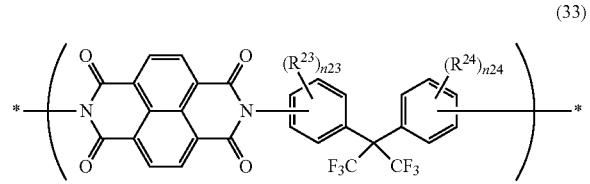

wherein n23 and n24 are each independently an integer of 0 to 4,

R[23] is a $C_{1-3}$ alkyl group optionally substituted by a halogen atom, or a sulfo group, when n23 is an integer of 2 to 4, plural R[23] are optionally the same as or different from each other, R[24] is a $C_{1-3}$ alkyl group optionally substituted by a halogen atom, or a sulfo group, when n24 is an integer of 2 to 4, plural R[24] are optionally the same as or different from each other, and

* shows a bonding position.

[28] The composition of the aforementioned [27], wherein a ratio of the number of the constitutional unit represented by the formula (23) and the number of the constitutional unit represented by the formula (33) (number of constitutional unit represented by formula (23)/number of constitutional unit represented by formula (33)) is 0.1/99.9 to 99.9/0.1.

[29] The composition of the aforementioned [17], wherein the electron-withdrawing polymer (A1) comprises electron-withdrawing polymer (A7) having a constitutional unit represented by the formula (23):

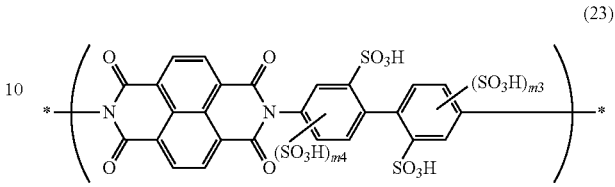

wherein m3 and m4 are each independently an integer of 0 to 3, and * shows a bonding position, and
a constitutional unit represented by the formula (34):

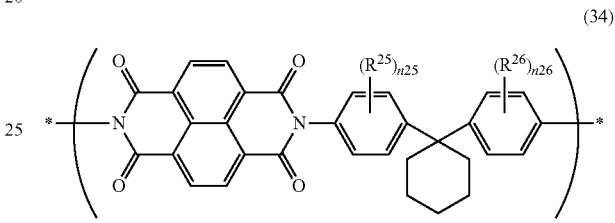

herein n25 and n26 are each independently an integer of 0 to 4,

R[25] is a $C_{1-3}$ alkyl group optionally substituted by a halogen atom, or a sulfo group, when n25 is an integer of 2 to 4, plural R[25] are optionally the same as or different from each other, R[26] is a $C_{1-3}$ alkyl group optionally substituted by a halogen atom, or a sulfo group, when n26 is an integer of 2 to 4, plural R[26] are optionally the same as or different from each other, and

* shows a bonding position.

[30] The composition of the aforementioned [29], wherein a ratio of the number of the constitutional unit represented by the formula (23) and the number of the constitutional unit represented by the formula (34) (number of constitutional unit represented by formula (23)/number of constitutional unit represented by formula (34)) is 0.1/99.9 to 99.9/0.1.

[31] The composition of any one of the aforementioned [17] to [20], wherein m5 and m6 are 4.

[32] The composition of the aforementioned [17], [18], [21] or [22], wherein m7 is 4.

[33] The composition of the aforementioned [17], [18], [23] or [24], wherein n12 is 1 and R[12] is a trifluoromethyl group.

[34] The composition of the aforementioned [17], [18], [25] or [26], wherein n13 to n16 are 0.

[35] The composition of the aforementioned [17], [27] or [28], wherein n23 and n24 are 0.

[36] The composition of the aforementioned [17], [29] or [30], wherein n25 and n26 are 0.

[37] The composition of any one of the aforementioned [17] to [36], wherein m3 and m4 are 0.

[38] The composition of any one of the aforementioned [1] to [37], wherein the electron-donating polymer (D) and the electron-withdrawing polymer (A) form a charge-transfer complex.

[39] An electrolyte membrane of a fuel cell comprising the composition of any one of the aforementioned [1] to [38].

[40] A catalyst layer of a fuel cell comprising the composition of any one of the aforementioned [1] to [38].
[41] The composition of the aforementioned [17], wherein the electron-withdrawing polymer (A1) comprises electron-withdrawing polymer (A8) composed of a constitutional unit represented by the formula (23):

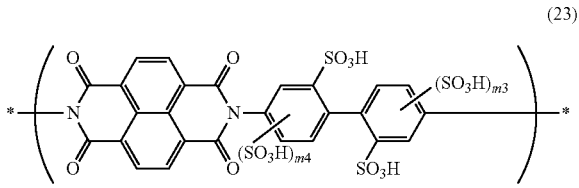

(23)

wherein m3 and m4 are each independently an integer of 0 to 3, and * shows a bonding position.
[42] The composition of the aforementioned [41], wherein m3 and m4 are 0.
[43] The composition of the aforementioned [41] or [42], wherein the electron-donating polymer (D) and electron-withdrawing polymer (A) form a charge-transfer complex.
[44] An electrolyte membrane of a fuel cell comprising the composition of any one of the aforementioned [41] to [43].
[45] A catalyst layer of a fuel cell comprising the composition of any one of the aforementioned [41] to [43].

Effect of the Invention

In the composition of the present invention, phase separation of polymer is suppressed. As a result, a membrane and the like obtained from the composition of the present invention are expected to show improved strength.

DESCRIPTION OF EMBODIMENTS

Figure 1:
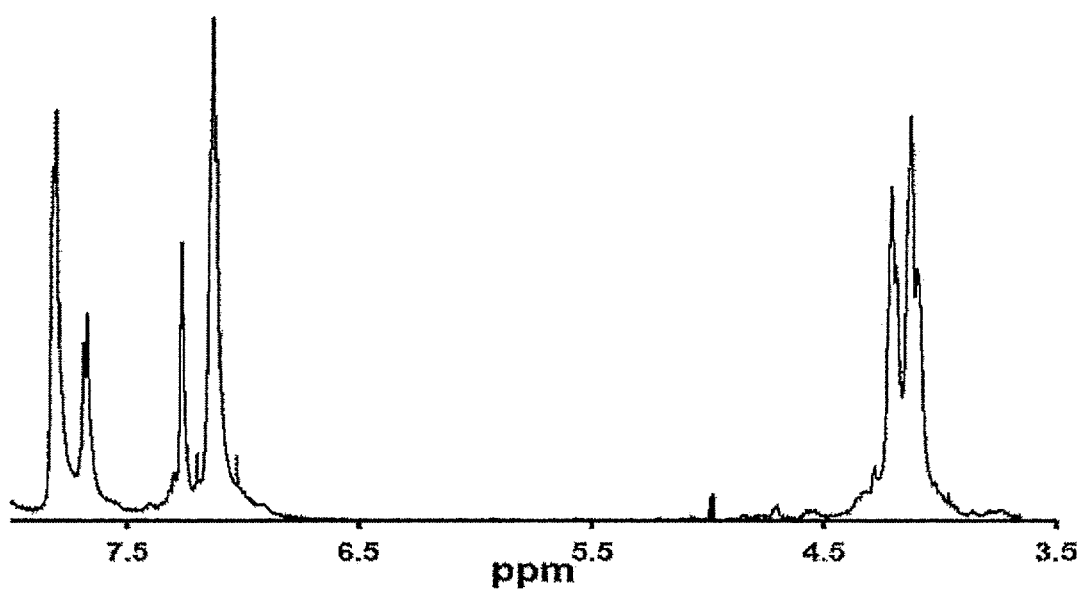
FIG. 1 shows a $^1$H NMR chart of electron-donating polymer (D3a-1) obtained in Synthetic Example 3.

The composition of the present invention characteristically contains electron-donating polymer (D) having a structure represented by the following formula (1), and electron-withdrawing polymer (A) having a structure represented by the following formula (2). Only one kind of the electron-donating polymer (D) may be used, or two or more kinds thereof may be used in combination. Similarly, only one kind of the electron-withdrawing polymer (A) may be used, or two or more kinds thereof may be used in combination.

(1)

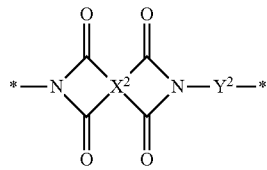

(2)

In the following, "a structure represented by (1)" is sometimes abbreviated as "structure (1)". Structure, constitutional unit and group represented by other formulas are sometimes abbreviated in the same manner. In the formulas, * shows a bonding position. In other formulas, * also shows a bonding position. In electron-donating polymer (D), only one kind or two or more kinds each of structure (1), $X^1$ and $Y^1$ may be contained. In electron-withdrawing polymer (A), only one kind or two or more kinds each of structure (2), $X^2$ and $Y^2$ may be contained.

As used herein, the "electron-donating" means property of a molecule or ion that can easily give electron to other molecule or ion. In electron-donating polymer (D) having structure (1), the moiety of —O—X¹—O— has electron-donating property.

From the aspect of durability, Y¹ preferably contains, as a part bonded to the oxygen atom in the formula (1), a divalent group represented by *—CQ¹Q²-* wherein Q¹ and Q² are each independently a hydrogen atom, a $C_{1-10}$ alkyl group optionally substituted by a halogen atom, a $C_{1-10}$ alkoxy group optionally substituted by a halogen atom, a halogen atom, or a sulfo group, and * shows a bonding position, or a divalent group represented by the formula (1-1):

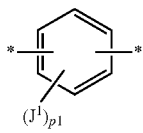

(1-1)

wherein p1 is an integer of 0 to 4,

J¹ is a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group, a sulfo group, a phenyl group optionally substituted W², a thienyl group optionally substituted W², or a furyl group optionally substituted W², W² is a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group or a sulfo group, when p1 is an integer of 2 to 4, plural J¹ are optionally the same as or different from each other, and

* shows a bonding position. The halogen atom, $C_{1-10}$ alkyl group and the like are described below.

In addition, "electron-withdrawing" means the property of a molecule or ion that can easily receive electron from other molecule or ion. The electron-withdrawing polymer (A) having structure (2) is a part where the imide structure part has electron-accepting property.

From the aspect of durability, Y² preferably contains, as a part bonded to the nitrogen atom in the formula (2), a divalent group represented by *—CQ³Q⁴-* wherein Q³ and Q⁴ are each independently a hydrogen atom, a $C_{1-10}$ alkyl group optionally substituted by a halogen atom, a $C_{1-10}$ alkoxy group optionally substituted by a halogen atom, a halogen atom, or a sulfo group, and * shows a bonding position), or a divalent group represented by the formula (2-1):

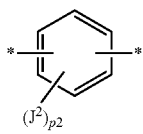

(2-1)

wherein p2 is an integer of 0 to 4,

J² is a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group, a sulfo group, a phenyl group optionally substituted by W³, a thienyl group optionally substituted by W³, or a furyl group optionally substituted by W³, W³ is a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group or a sulfo group, when p2 is an integer of 2 to 4, plural J² are optionally the same as or different from each other, and

* shows a bonding position. The halogen atom, $C_{1-10}$ alkyl group and the like are described below.

When Y¹ in the formula (1) is a divalent group containing a $C_{3-10}$ alkylene group optionally having a substituent, and electron-donating polymer (D) has a soft structure, Y² in the formula (2) is a divalent group containing a benzene ring optionally having a substituent, and electron-withdrawing polymer (A) has a rigid structure. By combining the soft electron-donating polymer (D) and the rigid electron-withdrawing polymer (A), a charge-transfer complex of these polymers can be formed.

Conversely, when Y¹ in the formula (1) is a divalent group containing a benzene ring optionally having a substituent and the electron-donating polymer (D) has a rigid structure, Y² in the formula (2) is a divalent group containing a $C_{3-10}$ alkylene group optionally having a substituent and the electron-withdrawing polymer (A) has a soft structure. By combining the rigid electron-donating polymer (D) and the soft electron-withdrawing polymer (A), a charge-transfer complex of these polymers can also be formed.

As used herein, the "charge-transfer complex" means an intermolecular compound formed by two kinds of neutral molecules by charge-transfer force. That the electron-donating polymer (D) and electron-withdrawing polymer (A) in the composition of the present invention form a charge-transfer complex can be confirmed from the fact that the UV-vis absorption spectrum of the composition has a peak or shoulder around 530 nm, as described in Nature, 375 (6529), 303-305 (1995) and Polym. J. (2013), 45, 839-844.

Membranes produced from the composition of the present invention containing electron-withdrawing polymer (A) and electron-donating polymer (D) can improve its mechanical strength while maintaining proton conductivity. Therefore, the composition of the present invention is useful as an electrolyte material for a fuel cell. In addition, this membrane is advantageous in that the production thereof is simple and the properties can be adjusted easily. Therefore, the composition of the present invention can contribute to achieving a low cost and high durability of the fuel cell. Also, a hardly water-soluble membrane can be produced from the composition of the present invention.

The composition of the present invention also contains two or more kinds of different polymers (i.e., electron-withdrawing polymer (A) and electron-donating polymer (D)). Therefore, the composition of the present invention, which can be produced by mixing a polymer having sufficient proton conductivity and other mechanically soft polymer, can be expected as an electrolyte material for a fuel cell with higher property. Examples of the electrolyte material include electrolyte materials used for catalyst layer, electrolyte membrane, and the like.

It is generally difficult to improve the property of a polymer having an imide structure like the structure (2) after m synthesis by chemical reaction or the like since it is chemically stable. In contrast, the composition of the present invention contains, in addition to the electron-withdrawing polymer (A) having structure (2), electron-donating polymer (D) different therefrom. Therefore, the property of the film obtained from the composition of the present invention can be controlled by adjusting the kind, amount and the like of the electron-donating polymer (D) to be used. More particularly, a membrane can be prepared easily from the compositions of the present invention.

$X^1$ and the like contained in the formula (1) and the like are now described in order.

$X^1$ in the formula (1) is a divalent group containing a naphthalene ring. $X^1$ is preferably a divalent group represented by the following formula (3) or the formula (4):

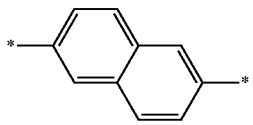
(3)

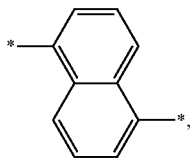
(4)

more preferably divalent group (3).

$X^2$ in the formula (2) is a tetravalent group containing a naphthalene ring. $X^2$ is preferably a tetravalent group represented by the following formula (5), the formula (6-1) or the formula (6-2):

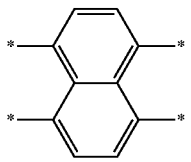
(5)

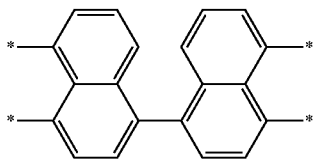
(6-1)

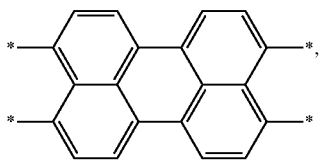
(6-2)

more preferably tetravalent group (5).

$Y^1$ is a divalent group containing a $C_{3-10}$ alkylene group optionally having a substituent or a divalent group containing a benzene ring optionally having a substituent. When $Y^1$ is a divalent group containing a $C_{3-10}$ alkylene group optionally having a substituent, $Y^2$ is a divalent group containing a benzene ring optionally having a substituent. When $Y^1$ is a divalent group containing a benzene ring optionally having a substituent, $Y^2$ is a divalent group containing a $C_{3-10}$ alkylene group optionally having a substituent.

To impart protonic conductivity to at least one of the aforementioned electron-donating polymer (D) and the aforementioned electron-withdrawing polymer (A), at least one of $Y^1$ and $Y^2$ is preferably has a sulfo group.

As mentioned above, either one of $Y^1$ and $Y^2$ is a divalent group containing a $C_{3-10}$ alkylene group optionally having a substituent.

In the present specification, the $C_{1-2}$ alkylene group is a methylene group or an ethylene group.

In the present specification, examples of the $C_{3-10}$ alkylene group include trimethylene group, 1-methylethylene group, tetramethylene group, 1-methyltrimethylene group, 1,1-dimethylethylene group, pentamethylene group, 1-methyltetramethylene group, 2-methyltetramethylene group, 1,1-dimethyltrimethylene group, 1,2-dimethyltrimethylene group, 2,2-dimethyltrimethylene group, 1-ethyltrimethylene group, hexamethylene group, 1-methylpentamethylene group, 2-methylpentamethylene group, 3-methylpentamethylene group, 1,1-dimethyltetramethylene group, 1,2-dimethyltetramethylene group, 2,2-dimethyltetramethylene group, 1-ethyltetramethylene group, 1,1,2-trimethyltrimethylene group, 1,2,2-trimethyltrimethylene group, 1-ethyl-1-methyltrimethylene group, and 1-ethyl-2-methyltrimethylene group.

Either one of $Y^1$ and $Y^2$ is preferably a divalent group containing a structure represented by the formula (7):

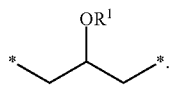
(7)

$R^1$ in the formula (7) is a hydrogen atom or a sulfo group, preferably a hydrogen atom.

As mentioned above, either one of $Y^1$ and $Y^2$ is a divalent group containing a benzene ring optionally having a substituent. Either one of $Y^1$ and $Y^2$ is preferably a divalent group represented by any of the formula (8) to the formula (11):

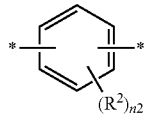
(8)

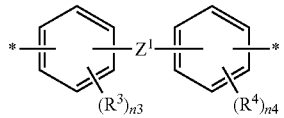
(9)

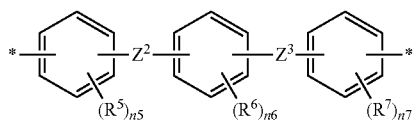
(10)

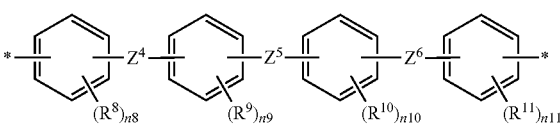
(11)

(namely, any of divalent group (8) to divalent group (11)). As mentioned above, only one kind or two or more kinds each of $Y^1$ and $Y^2$ may be contained.

n2 to n11 are each independently an integer of 0 to 4. When n2 is 0, it means that a substituent $R^2$ is absent. When n2 is an integer of 2 to 4, plural $R^2$ are optionally the same as or different from each other. The same applied to the aforementioned p1 and p2, n3 to n11, the below-mentioned n12 and the like.

$R^2$ to $R^{11}$ are each independently a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group, a sulfo group, a phenyl group optionally substituted by $W^1$, a thienyl group optionally substituted by $W^1$, or a furyl group optionally substituted by $W^1$.

In the present specification, examples of the $C_{1-10}$ alkyl group include methyl group, ethyl group, propyl group, isopropyl group, butyl group, isobutyl group, sec-butyl group, tert-butyl group, pentyl group, isopentyl group, neopentyl group, tert-pentyl group, hexyl group, heptyl group, octyl group, nonyl group, and decyl group.

In the present specification, examples of the $C_{1-10}$ alkoxy group include methoxy group, ethoxy group, propoxy group, isopropoxy group, butoxy group, isobutoxy group, sec-butoxy group, tert-butoxy group, pentyloxy group, isopentyloxy group, neopentyloxy group, tert-pentyloxy group, hexyloxy group, heptyloxy group, octyloxy group, nonyloxy group, and decyloxy group.

In the present specification, examples of the halogen atom include fluorine, chlorine, bromine, and iodine.

$W^1$ is a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group or a sulfo group.

$Z^1$ to $Z^6$ are each independently a single bond, a $C_{1-2}$ alkylene group optionally substituted by a halogen atom, a $C_{3-10}$ alkylene group, a sulfonyl group, a carbonyl group, *—CONH—*, *—NHCO—*, *—C($R^{21}$)($R^{22}$)—*, or an oxy group.

$R^{21}$ and $R^{22}$ are each independently a $C_{1-3}$ alkyl group optionally substituted by a halogen atom, or $R^{21}$ and $R^{22}$ are bonded to each other to form a $C_{3-6}$ hydrocarbon ring together with a carbon atom bonded thereto.

In the present specification, examples of the $C_{1-3}$ alkyl group include methyl group, ethyl group, propyl group, and isopropyl group.

In the present specification, examples of the $C_{3-6}$ hydrocarbon ring include cyclopropane ring, cyclobutane ring, cyclopentane ring, and cyclohexane ring.

The divalent group (8) is preferably a divalent group represented by the following formula (8-1) (in the following formula, n2, $R^2$ and * are as defined above):

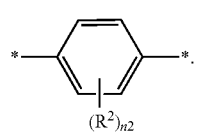

(8-1)

$Z^1$ to $Z^6$ are preferably each independently a single bond, a $C_{1-2}$ alkylene group optionally substituted by a halogen atom, a $C_{3-10}$ alkylene group, a sulfonyl group, a carbonyl group, *—CONH—*, *—NHCO—*, or an oxy group.

$Y^1$ is preferably a divalent group containing a $C_{3-10}$ alkylene group optionally having a substituent, and $Y^2$ is preferably a divalent group containing a benzene ring optionally having a substituent. $Y^1$ is more preferably a divalent group containing structure (7), and $Y^2$ is more preferably any of divalent group (8) to divalent group (11). $Y^1$ is further preferably a divalent group containing structure (7) wherein $R^1$ is a hydrogen atom, and $Y^2$ is further preferably any of divalent group (8) to divalent group (11).

As mentioned above, only one kind or two or more kinds each of $Y^1$ and $Y^2$ may be contained.

The weight-average molecular weight (Mw) of the aforementioned electron-donating polymer (D) is preferably 5,000 to 800,000, more preferably 8,000 to 500,000, further preferably 10,000 to 100,000. Mw can be measured by gel permeation chromatography (GPC) with polystyrene as the standard, as described in the below-mentioned Examples. Mw of other polymers can also be measured similarly.

The weight-average molecular weight (Mw) of the aforementioned electron-withdrawing polymer (A) is preferably 5,000 to 1,000,000, more preferably 8,000 to 900,000, further preferably 10,000 to 150,000.

The amount of electron-donating polymer (D) in the composition of the present invention is preferably 1 to 10,000 parts by weight, more preferably 10 to 1,500 parts by weight, further preferably 20 to 900 parts by weight, most preferably 50 to 500 parts by weight, per 100 parts by weight of electron-withdrawing polymer (A).

The aforementioned electron-donating polymer (D) can be synthesized by a known reaction using a commercially available product as a starting material. Commercially available products are available from, for example, Tokyo Chemical Industry Co., Ltd., Wako Pure Chemical Industries, Ltd., and the like. In addition, a compound obtained by introducing a substituent into a commercially available product by a known reaction may also be used as a starting material.

The synthesis of a divalent compound having epoxy groups, which is a starting material of electron-donating polymer (D), is explained below. For example, 2,6-bis(oxiran-2-ylmethoxy)naphthalene usable as the starting material of electron-donating polymer (D) can be synthesized according to the method described in Journal of Organic Chemistry, 81(16), 7139-7147; 2016. The synthesis of 2,7-bis(oxiran-2-ylmethoxy)naphthalene different in the position of the hydroxy group is described in Applied Surface Science, 256(8), 2462-2467; 2010.

1,5-Dihydroxynaphthalene, 2,6-dihydroxynaphthalene, and 4,4'-dihydroxydiphenyl sulfone usable as the starting materials of electron-donating polymer (D) are available from, for example, Tokyo Chemical Industry Co., Ltd., Wako Pure Chemical Industries, Ltd. and the like.

The aforementioned electron-donating polymer (D) preferably contains electron-donating polymer (D1) having a constitutional unit represented by the formula (12) or the formula (13):

(12)

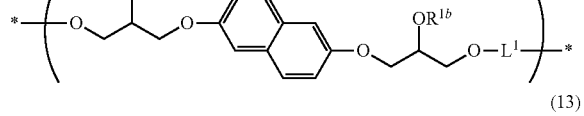

(13)

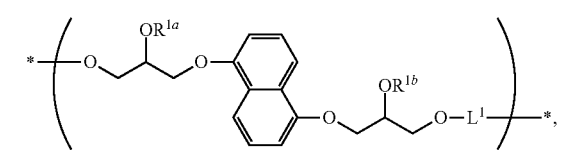

and is more preferably composed of the electron-donating polymer (D1). Only one kind of electron-donating polymer (D1) may be used, or two or more kinds thereof may be used in combination. In addition, in the electron-donating polymer (D1), only one kind or two or more kinds each of the constitutional unit (12) and constitutional unit (13) may be contained.

$L^1$ in the formula (12) or the formula (13) is a divalent group represented by the formula (3), the formula (4) or the formula (14):

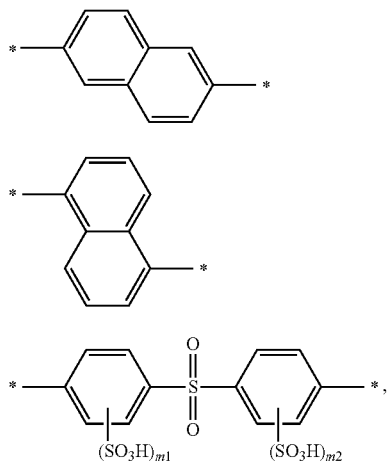

preferably divalent group (3) or divalent group (14).

In the formula (14), m1 and m2 are each independently an integer of 0 to 4, preferably 0.

When $L^1$ is divalent group (3) or divalent group (4), $R^{1a}$ and $R^{1b}$ in the formula (12) or the formula (13) is a hydrogen atom.

When $L^1$ is divalent group (14), $R^{1a}$ and $R^{1b}$ are each independently a hydrogen atom or a sulfo group, preferably a hydrogen atom.

The weight-average molecular weight (Mw) of the electron-donating polymer (D1) is preferably 5,000 to 800,000, more preferably 8,000 to 500,000, further preferably 10,000 to 100,000.

In one embodiment of the present invention, the electron-donating polymer (D1) preferably contains electron-donating polymer (D2) having a constitutional unit represented by the formula (15):

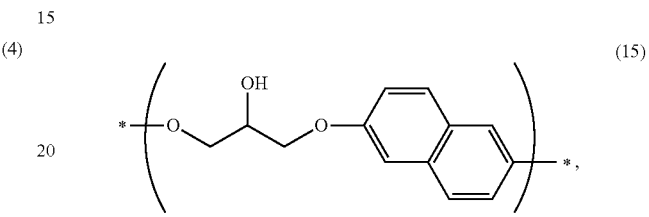

and is more preferably composed of the electron-donating polymer (D2).

The weight-average molecular weight (Mw) of the electron-donating polymer (D2) is preferably 5,000 to 800,000, more preferably 8,000 to 500,000, further preferably 10,000 to 100,000.

In one embodiment of the present invention, the electron-donating polymer (D1) is preferably electron-donating polymer (D3) having a constitutional unit represented by the formula (16):

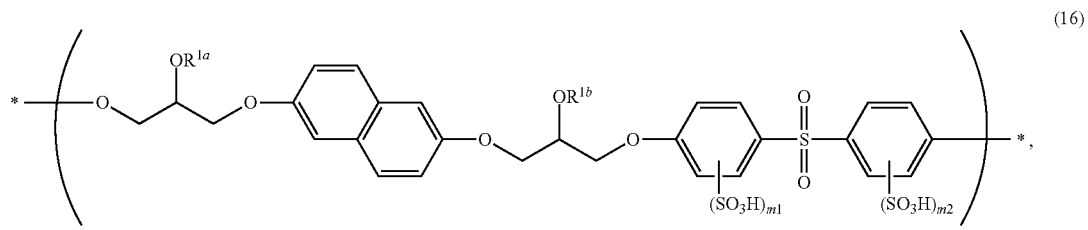

and is more preferably composed of the electron-donating polymer (D3). In the electron-donating polymer (D3), only one kind or two or more kinds of the constitutional unit (16) may be contained.

$R^{1a}$ and $R^{1b}$ in the formula (16) are each independently a hydrogen atom or a sulfo group, preferably a hydrogen atom.

In the formula (16), m1 and m2 are each independently an integer of 0 to 4, preferably 0.

The electron-donating polymer (D3) is preferably electron-donating polymer (D3a) having a constitutional unit represented by the formula (16a):

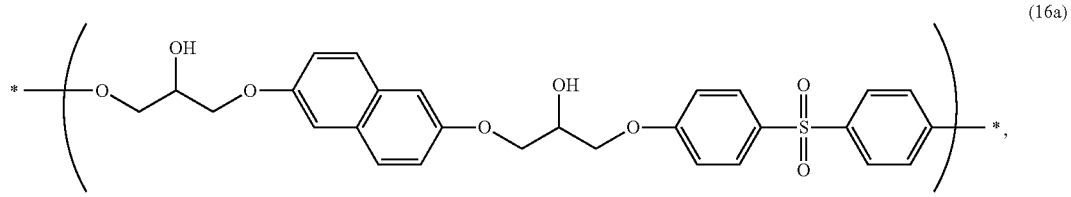

or electron-donating polymer (D3b) having a constitutional unit represented by the formula (16b):

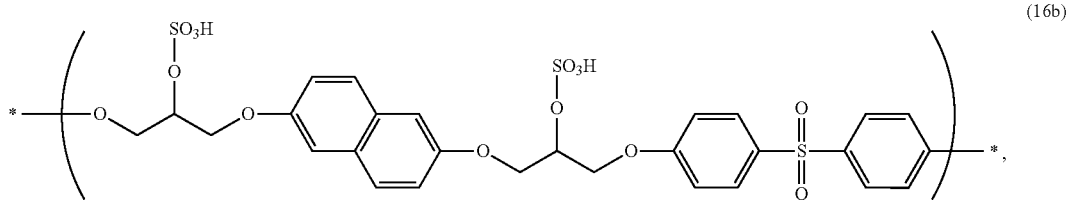

(16b)

more preferably electron-donating polymer (D3a).

The weight-average molecular weight (Mw) of the electron-donating polymer (D3) (preferably electron-donating polymer (D3a)) is preferably 5,000 to 800,000, more preferably 8,000 to 500,000, further preferably 10,000 to 100,000.

The electron-donating polymer (D1) can be synthesized by a known reaction using a commercially available product as a starting material. Commercially available products are available from, for example, Tokyo Chemical Industry Co., Ltd., Wako Pure Chemical Industries, Ltd., and the like. For example, electron-donating polymer (D1a) wherein $R^{1a}$ and $R^{1b}$ are hydrogen atoms can be produced by reacting a divalent compound having epoxy groups (e.g., 2,6-bis(oxiran-2-ylmethoxy)naphthalene) with a divalent compound having hydroxy groups (e.g., 2,6-dihydroxynaphthalene, 4,4'-dihydroxydiphenyl sulfone), as described in the below-mentioned Examples. In addition, a compound obtained by introducing a substituent into a commercially available product by a known reaction may also be used as a starting material.

The amount of the divalent compound having epoxy groups in the aforementioned reaction is preferably 0.8 to 1.2 mol, more preferably 0.9 to 1.1 mol, per 1 mol of a divalent compound having hydroxy groups.

The aforementioned reaction is generally performed in a solvent. As the solvent, ketone solvents can be mentioned. Examples thereof include cyclohexanone, acetone, methylethyl ketone, methyl isobutyl ketone, diisobutyl ketone and the like. Preferred is cyclohexanone or acetone. The amount of the solvent is preferably 0.5 to 50 L, more preferably 1 to 10 L, per 1 mol of a divalent compound having epoxy groups.

A catalyst may be used for the aforementioned reaction. Examples of the catalyst include phosphines and imidazoles. Examples of the phosphines include triphenylphosphine, tris(2,6-dimethoxyphenyl)phosphine and the like. Examples of the imidazoles include 2-methylimidazole and the like. Among these, tris(2,6-dimethoxyphenyl)phosphine is preferable. When a catalyst is used, the amount thereof is preferably 0.0001 to 0.1 mmol, more preferably 0.001 to 0.015 mmol, per 1 mol of a divalent compound having epoxy groups.

The reaction temperature of the aforementioned reaction is preferably 50 to 200° C., more preferably 100 to 180° C. When the reaction temperature is higher than the boiling point of the solvent, the reaction may be performed in a sealed tube. The reaction time is preferably 20 to 200 hr, more preferably 30 to 100 hr.

After the aforementioned reaction, electron-donating polymer (D1a) wherein $R^{1a}$ and $R^{1b}$ are hydrogen atoms can be obtained by a known means such as precipitation, collection by filtration, drying and the like.

The electron-donating polymer (D1b) wherein $R^{1a}$ and $R^{1b}$ are sulfo groups can be synthesized, for example, by reacting electron-donating polymer (D1a) wherein $R^{1a}$ and $R^{1b}$ are hydrogen atoms with a pyridine-sulfur trioxide complex according to the method described in Tetrahedron Vol. 51, No. 4, pp. 1177-1186, 1995.

The pyridine-sulfur trioxide complex is commercially available from, for example, Tokyo Chemical Industry Co., Ltd. The amount of the pyridine-sulfur trioxide complex is preferably 1 to 10 mol, more preferably 1.5 to 5 mol, per 1 mol of the hydroxy group in the electron-donating polymer (D1a).

The aforementioned reaction is generally performed in a solvent. The solvent is not particularly limited as long as it does not inhibit progress of the reaction. Examples thereof include chloroform, chlorobenzene, dichlorobenzene, diethyl ether, 1,2-dimethoxyethane, N,N-dimethylformamide, tetrahydrofuran, and 1,4-dioxane.

The reaction temperature of the aforementioned reaction is preferably −30° C. to 80° C., more preferably −10° C. to 50° C., and the reaction time is preferably 1 to 24 hr, more preferably 6 to 18 hr.

After the aforementioned reaction, electron-donating polymer (D1b) wherein $R^{1a}$ and $R^{1b}$ are sulfo groups can be obtained by a known means such as precipitation, collection by filtration, drying and the like.

The aforementioned electron-withdrawing polymer (A) can be synthesized by a known reaction using a commercially available product as a starting material. Commercially available products are available from, for example, Tokyo Chemical Industry Co., Ltd., Wako Pure Chemical Industries, Ltd., and the like. Examples of the known reaction include a reaction of tetracarboxylic dianhydride with diamine as described in the below-mentioned Examples. In addition, a compound obtained by introducing a substituent into a commercially available product by a known reaction may also be used as a starting material.

In one embodiment of the present invention, the aforementioned electron-withdrawing polymer (A) preferably contains electron-withdrawing polymer (A1a) having a constitutional unit represented by any of the formula (17a):

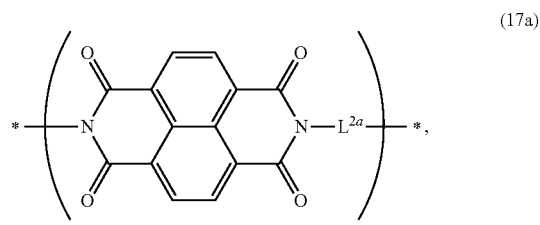

(17a)

and is more preferably composed of the electron-withdrawing polymer (A1a). Only one kind of electron-withdrawing polymer (A1a) may be used, or two or more kinds thereof may be used in combination. In the electron-withdrawing polymer (A1a), only one kind or two or more kinds of the constitutional unit (17a) may be contained. In the electron-withdrawing polymer (A1a), two kinds of the constitutional unit (17a) is preferably contained.

$L^{2a}$ in the formula (17) is a divalent group represented by the formula (8) to the formula (11) mentioned above (the groups and symbols in the formula (8) to the formula (11) are as defined above).

The weight-average molecular weight (Mw) of the electron-withdrawing polymer (A1a) is preferably 5,000 to 1,000,000, more preferably 8,000 to 900,000, further preferably 10,000 to 150,000.

In one embodiment of the present invention, the electron-withdrawing polymer (A1a) preferably contains electron-withdrawing polymer (A1b) having a constitutional unit represented by the formula (23):

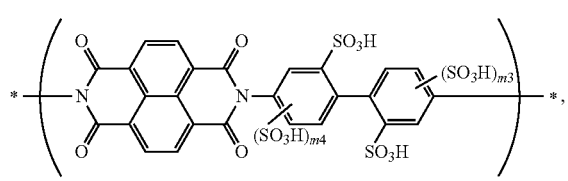

(23)

and a constitutional unit represented by the formula (17b):

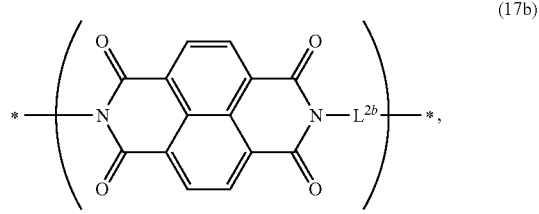

(17b)

and is more preferably composed of the electron-withdrawing polymer (A1b). Only one kind of the electron-withdrawing polymer (A1b) may be used, or two or more kinds thereof may be used in combination. In addition, in the electron-withdrawing polymer (A1b), only one kind or two or more kinds each of the constitutional unit (23) and constitutional unit (17b) may be contained. In the electron-withdrawing polymer (A1b), the one kind of the constitutional unit (23) is preferably contained. In the electron-withdrawing polymer (A1b), one kind of the constitutional unit (17b) is preferably contained.

$L^{2b}$ in the formula (17b) is a divalent group represented by the formula (8b) to the formula (11b):

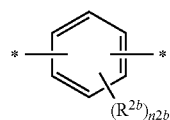

(8b)

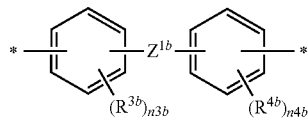

(9b)

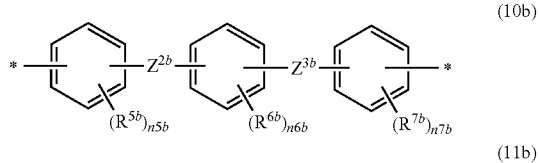

(10b)

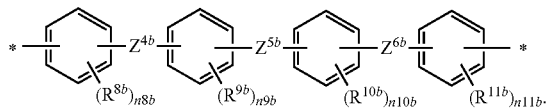

(11b)

n2b to n11b are each independently an integer of 0 to 4. when n2b to n11b are each an integer of 2 to 4, plural $R^{2b}$ to $R^{11b}$ are optionally the same as or different from each other.

$R^{2b}$ to $R^{11b}$ are each independently a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group, a phenyl group optionally substituted by $W^{1b}$ a thienyl group optionally substituted by $W^{1b}$ or a furyl group optionally substituted by $W^{1b}$.

$W^{1b}$ is a $C_{1-10}$ alkyl group optionally substituted by a halogen atom, a $C_{1-10}$ alkoxy group optionally substituted by a halogen atom, a hydroxy group, a halogen atom, a nitro group, a formyl group, or a cyano group.

$Z^{1b}$ to $Z^{6b}$ are each independently a single bond, a $C_{1-2}$ alkylene group optionally substituted by a halogen atom, a $C_{3-10}$ alkylene group, a sulfonyl group, a carbonyl group, *—CONH—*, *—NHCO—*, *—C($R^{21b}$)($R^{22b}$)—*, or an oxy group.

$R^{21b}$ and $R^{22b}$ are each independently a $C_{1-3}$ alkyl group optionally substituted by a halogen atom, or $R^{21b}$ and $R^{22b}$ are bonded to each other to form a $C_{3-6}$ hydrocarbon ring together with a carbon atom bonded thereto.

As used herein, the "divalent group (8b) to divalent group (11b) are the same as the aforementioned divalent group (8) to divalent group (11) except they do not have a sulfo group is absent.

m3 and m4 in the formula (23) are as described in the formula (18). The constitutional unit (23) is preferably a constitutional unit represented by the formula (23a):

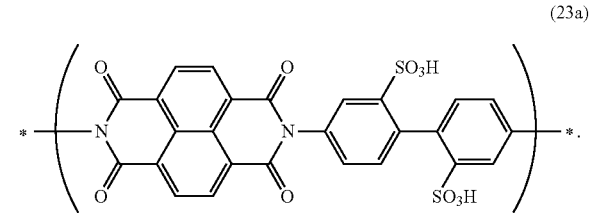

(23a)

A ratio of the number of the constitutional unit (23) (preferably constitutional unit (23a)) and the number of the constitutional unit (17b) (number of constitutional unit (23)/ number of constitutional unit (17b)) is preferably 0.1/99.9 to 99.9/0.1, more preferably 1/99 to 99/1, further preferably 30/70 to 95/5.

The weight-average molecular weight (Mw) of the electron-withdrawing polymer (A1b) is preferably 5,000 to 1,000,000, more preferably 8,000 to 900,000, further preferably 10,000 to 150,000.

In one embodiment of the present invention, the aforementioned electron-withdrawing polymer (A) preferably contains electron-withdrawing polymer (A1) having a constitutional unit represented by the formula (17):

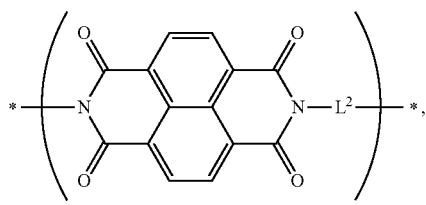
(17)

and is more preferably composed of the electron-withdrawing polymer (A1). Only one kind of the electron-withdrawing polymer (A1) may be used, or two or more kinds thereof may be used in combination. In the electron-withdrawing polymer (A1), only one kind or two or more kinds of the constitutional unit (17) may be contained. In the electron-withdrawing polymer (A1), two kinds of the constitutional unit (17) is preferably contained.

$L^2$ in the formula (17) is a divalent group represented by any of the formula (18) to the formula (22), the formula (31) and the formula (32):

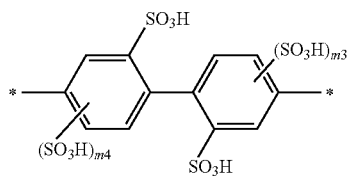
(18)

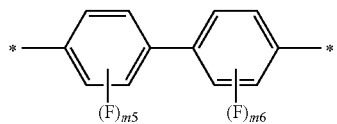
(19)

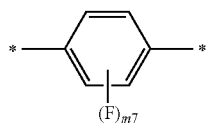
(20)

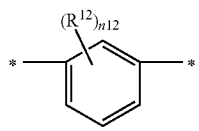
(21)

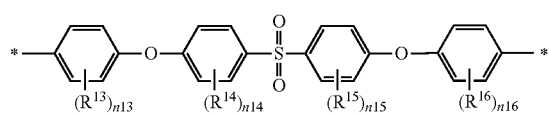
(22)

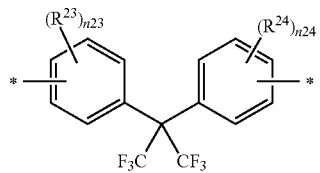
(31)

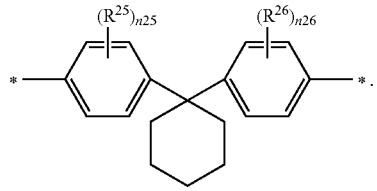
(32)

In the electron-withdrawing polymer (A1), only one kind or two or more kinds of $L^2$ may be contained. $L^2$ is preferably any of divalent group (18) to divalent group (22).

m3 and m4 in the formula (18) are each independently an integer of 0 to 3, preferably 0.

m5 to m7 in the formula (19) and the formula (20) are each independently an integer of 1 to 4, preferably 4.

n12 in the formula (21) is an integer of 1 to 4, preferably 1.

$R^{12}$ in the formula (21) is a fluorine atom or a trifluoromethyl group, and when n12 is an integer of 2 to 4, plural $R^{12}$ are optionally the same as or different from each other. $R^{12}$ is preferably a fluorine atom.

n13 to n16 in the formula (22) are each independently an integer of 0 to 4, preferably 0.

$R^{13}$ in the formula (22) is a nitro group, a sulfo group or a trifluoromethyl group and when n13 is an integer of 2 to 4, plural $R^{13}$ are optionally the same as or different from each other.

$R^{14}$ in the formula (22) is a chlorine atom or a sulfo group, and when n14 is an integer of 2 to 4, plural $R^{14}$ are optionally the same as or different from each other.

$R^{15}$ in the formula (22) is a chlorine atom or a sulfo group, and when n15 is an integer of 2 to 4, plural $R^{15}$ are optionally the same as or different from each other.

$R^{16}$ in the formula (22) is a nitro group, a sulfo group or a trifluoromethyl group, and when n16 is an integer of 2 to 4, plural $R^{16}$ are optionally the same as or different from each other.

n23 and n24 in the formula (31) are each independently an integer of 0 to 4, preferably 0 or 1, more preferably 0.

$R^{23}$ in the formula (31) is a $C_{1-3}$ alkyl group optionally substituted by a halogen atom, or a sulfo group, and when n23 is an integer of 2 to 4, plural $R^{23}$ are optionally the same as or different from each other. $R^{23}$ is preferably a $C_{1-3}$ alkyl group, more preferably a methyl group.

$R^{24}$ in the formula (31) is a $C_{1-3}$ alkyl group optionally substituted by a halogen atom, or a sulfo group, and when n24 is an integer of 2 to 4, plural $R^{24}$ are optionally the same as or different from each other. $R^{23}$ is preferably a $C_{1-3}$ alkyl group, more preferably a methyl group.

The divalent group (31) is preferably a divalent group represented by the formula (31a) or the formula (31b):

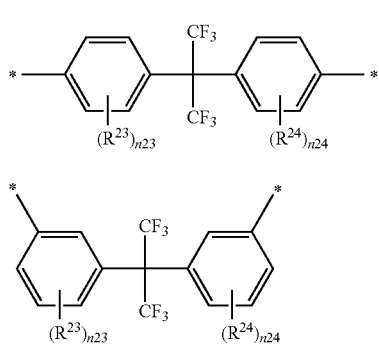

(31a)

(31b)

wherein n23, n24, $R^{23}$, $R^{24}$ and * are as defined above, more preferably divalent group (31a).

n25 and n26 in the formula (32) are each independently an integer of 0 to 4, preferably 0.

$R^{25}$ in the formula (32) is a $C_{1-3}$ alkyl group optionally substituted by a halogen atom, or a sulfo group, and when n25 is an integer of 2 to 4, plural $R^{25}$ are optionally the same as or different from each other.

$R^{26}$ in the formula (32) is a $C_{1-3}$ alkyl group optionally substituted by a halogen atom, or a sulfo group, and when n26 is an integer of 2 to 4, plural $R^{26}$ are optionally the same as or different from each other.

The weight-average molecular weight (Mw) of the electron-withdrawing polymer (A1) is preferably 5,000 to 1,000,000, more preferably 8,000 to 900,000, further preferably 10,000 to 150,000.

In one embodiment of the present invention, the electron-withdrawing polymer (A1) preferably contains electron-withdrawing polymer (A2) having a constitutional unit represented by the formula (23):

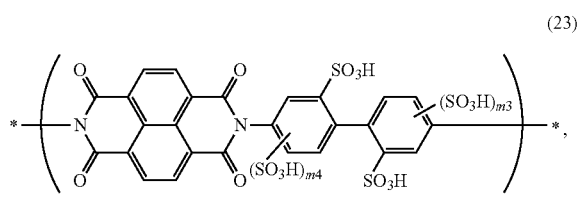

(23)

and a constitutional unit represented by the formula (24):

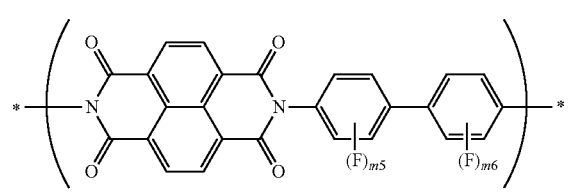

(24)

and is more preferably composed of the electron-withdrawing polymer (A2). The electron-withdrawing polymer (A2) is preferably a random copolymer. In the electron-withdrawing polymer (A2), only one kind or two or more kinds each of the constitutional unit (23) and constitutional unit (24) may be contained.

m3 and m4 in the formula (23) are as described in the formula (18). The constitutional unit (23) is preferably a constitutional unit represented by the formula (23a):

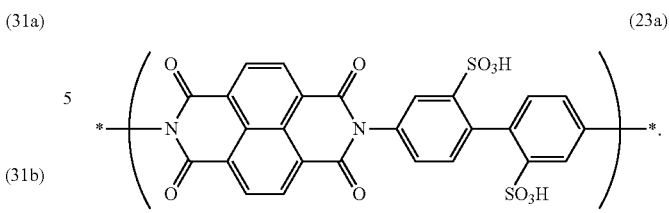

(23a)

m5 and m6 in the formula (24) are each independently an integer of 1 to 4, preferably 4. The constitutional unit (24) is preferably a constitutional unit represented by the formula (24a):

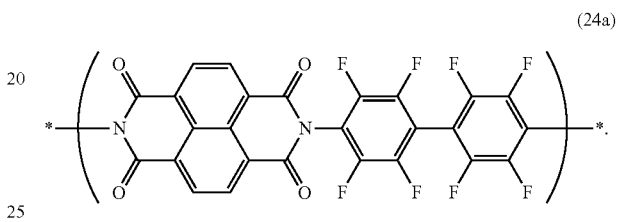

(24a)

A ratio of the number of the constitutional unit (23) (preferably constitutional unit (23a)) and the number of the constitutional unit (24) (preferably constitutional unit (24a)) (number of constitutional unit (23)/number of constitutional unit (24)) is preferably 0.1/99.9 to 99.9/0.1, more preferably 1/99 to 99/1, further preferably 30/70 to 95/5.

The weight-average molecular weight (Mw) of the electron-withdrawing polymer (A2) is preferably 5,000 to 1,000,000, more preferably 8,000 to 900,000, further preferably 10,000 to 150,000.

In one embodiment of the present invention, the electron-withdrawing polymer (A1) preferably contains electron-withdrawing polymer (A3) having the aforementioned constitutional unit (23) and a constitutional unit represented by the formula (25):

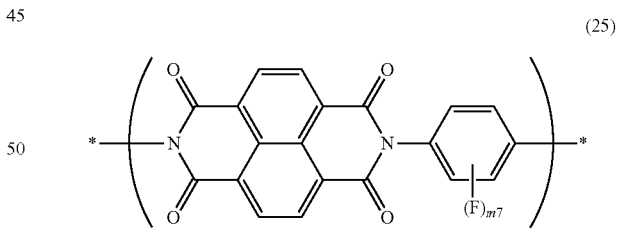

(25)

and is more preferably composed of the electron-withdrawing polymer (A3). The electron-withdrawing polymer (A3) is preferably a random copolymer. In the electron-withdrawing polymer (A3), only one kind or two or more kinds each of the constitutional unit (23) and constitutional unit (25) may be contained.

The constitutional unit (23) in the electron-withdrawing polymer (A3) is as described in the aforementioned electron-withdrawing polymer (A2).

In the formula (25), m7 is an integer of 1 to 4, preferably 4. That is, the constitutional unit (25) is preferably a constitutional unit represented by the formula (25a):

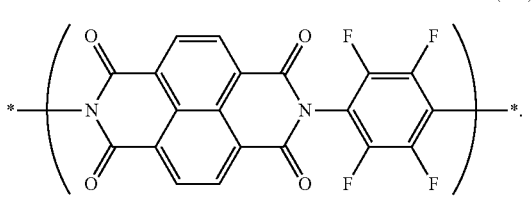

(25a)

A ratio of the number of the constitutional unit (23) (preferably constitutional unit (23a)) and the number of the constitutional unit (25) (preferably constitutional unit (25a)) (number of constitutional unit (23)/number of constitutional unit (25)) is preferably 0.1/99.9 to 99.9/0.1, more preferably 1/99 to 99/1, further preferably 30/70 to 95/5.

The weight-average molecular weight (Mw) of the electron-withdrawing polymer (A3) is preferably 5,000 to 1,000,000, more preferably 8,000 to 900,000, further preferably 10,000 to 150,000.

In one embodiment of the present invention, the electron-withdrawing polymer (A1) preferably contains electron-withdrawing polymer (A4) having the aforementioned constitutional unit (23) and a constitutional unit represented by the formula (26):

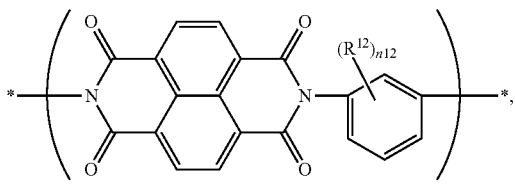

(26)

and is more preferably composed of the electron-withdrawing polymer (A4). The electron-withdrawing polymer (A4) is preferably a random copolymer. In the electron-withdrawing polymer (A4), only one kind or two or more kinds each of the constitutional unit (23) and constitutional unit (26) may be contained.

The constitutional unit (23) in the electron-withdrawing polymer (A4) is as described in the aforementioned electron-withdrawing polymer (A2).

n12 and $R^{12}$ in the formula (26) are as described in the formula (21). The constitutional unit (26) is preferably a constitutional unit represented by the formula (26a):

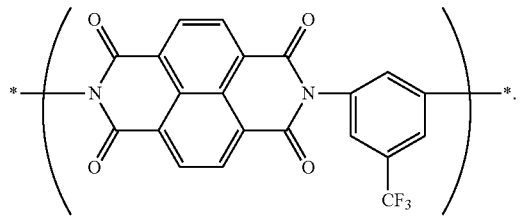

(26a)

A ratio of the number of the constitutional unit (23) (preferably constitutional unit (23a)) and the number of the constitutional unit (26) (preferably constitutional unit (26a)) (number of constitutional unit (23)/number of constitutional unit (26)) is preferably 0.1/99.9 to 99.9/0.1, more preferably 1/99 to 99/1, further preferably 30/70 to 95/5.

The weight-average molecular weight (Mw) of the electron-withdrawing polymer (A4) is preferably 5,000 to 1,000,000, more preferably 8,000 to 900,000, further preferably 10,000 to 150,000.

In one embodiment of the present invention, the electron-withdrawing polymer (A1) preferably contains electron-withdrawing polymer (A5) having the aforementioned constitutional unit (23) and a constitutional unit represented by the formula (27):

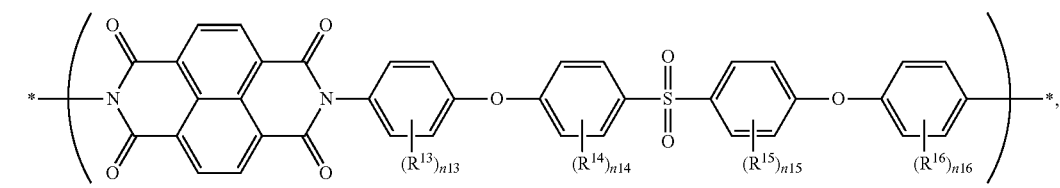

(27)

and is more preferably composed of the electron-withdrawing polymer (A5). The electron-withdrawing polymer (A5) is preferably a random copolymer. In the electron-withdrawing polymer (A5), only one kind or two or more kinds each of the constitutional unit (23) and constitutional unit (27) may be contained.

The constitutional unit (23) in the electron-withdrawing polymer (A5) is as described in the aforementioned electron-withdrawing polymer (A2).

n13 to n16 and $R^{13}$ to $R^{16}$ in the formula (27) are as described in the formula (22). The constitutional unit (27) is preferably a constitutional unit represented by the formula (27a):

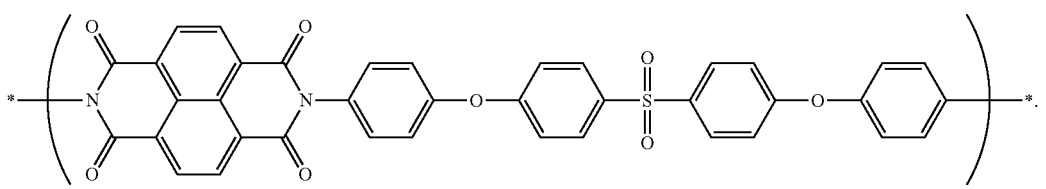

(27a)

A ratio of the number of the constitutional unit (23) (preferably constitutional unit (23a)) and the number of the constitutional unit (27) (preferably constitutional unit (27a)) (number of constitutional unit (23)/number of constitutional unit (27)) is preferably 0.1/99.9 to 99.9/0.1, more preferably 1/99 to 99/1, further preferably 30/70 to 95/5.

The weight-average molecular weight (Mw) of the electron-withdrawing polymer (A5) is preferably 5,000 to 1,000,000, more preferably 8,000 to 900,000, further preferably 10,000 to 150,000.

In one embodiment of the present invention, the electron-withdrawing polymer (A1) preferably contains electron-withdrawing polymer (A6) having the aforementioned constitutional unit (23) and a constitutional unit represented by the formula (33):

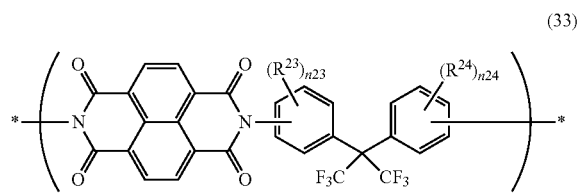

(33)

and is more preferably composed of the electron-withdrawing polymer (A6). The electron-withdrawing polymer (A6) is preferably a random copolymer. In the electron-withdrawing polymer (A6), only one kind or two or more kinds each of the constitutional unit (23) and constitutional unit (33) may be contained.

The constitutional unit (23) in the electron-withdrawing polymer (A6) is as described in the aforementioned electron-withdrawing polymer (A2).

n23 and n24, and $R^{23}$ and $R^{24}$ in the formula (33) are as described in the formula (31). The constitutional unit (33) is preferably a constitutional unit represented by the formula (33a) or the formula (33b):

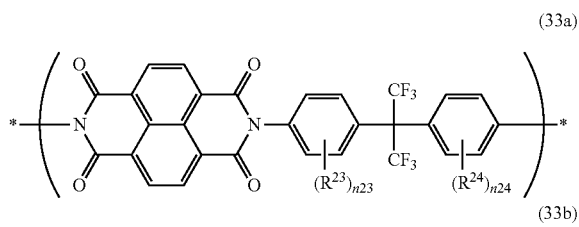

(33a)

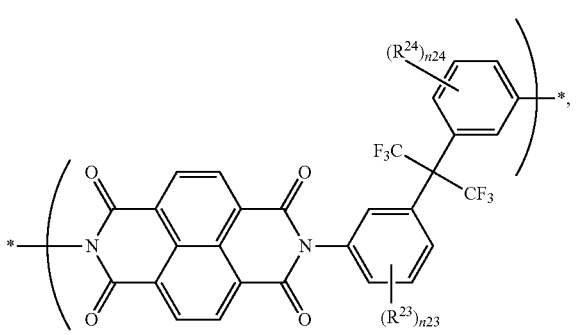

(33b)

more preferably constitutional unit (33a). The constitutional unit (33) is further preferably a constitutional unit represented by the formula (33a-1):

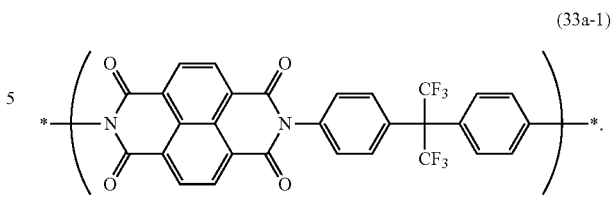

(33a-1)

A ratio of the number of the constitutional unit (23) (preferably constitutional unit (23a)) and the number of the constitutional unit (33) (preferably constitutional unit (33a) or constitutional unit (33b), more preferably constitutional unit (33a), further preferably constitutional unit (33a-1)) (number of constitutional unit (23)/number of constitutional unit (33)) is preferably 0.1/99.9 to 99.9/0.1, more preferably 1/99 to 99/1, further preferably 30/70 to 95/5.

The weight-average molecular weight (Mw) of the electron-withdrawing polymer (A6) is preferably 5,000 to 1,000,000, more preferably 8,000 to 900,000, further preferably 10,000 to 150,000.

In one embodiment of the present invention, the electron-withdrawing polymer (A1) preferably contains electron-withdrawing polymer (A7) having the aforementioned constitutional unit (23) and a constitutional unit represented by the formula (34):

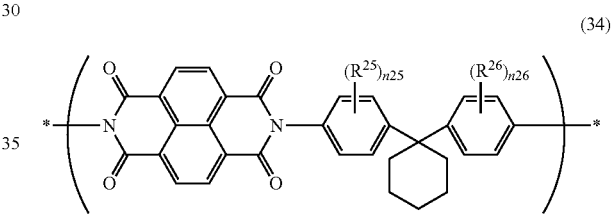

(34)

and is more preferably composed of the electron-withdrawing polymer (A7). The electron-withdrawing polymer (A7) is preferably a random copolymer. In the electron-withdrawing polymer (A7), only one kind or two or more kinds each of the constitutional unit (23) and constitutional unit (34) may be contained.

The constitutional unit (23) in the electron-withdrawing polymer (A7) is as described in the aforementioned electron-withdrawing polymer (A2).

n25 and n26, and $R^{25}$ and $R^{26}$ in the formula (34) are as described in the formula (32). The constitutional unit (34) is preferably a constitutional unit represented by the formula (34a):

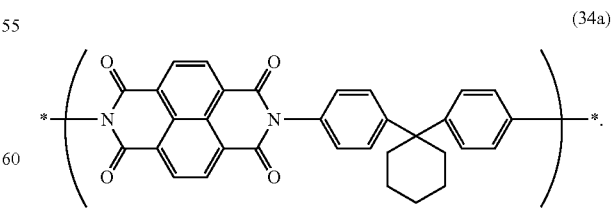

(34a)

A ratio of the number of the constitutional unit (23) (preferably constitutional unit (23a)) and the number of the constitutional unit (34) (preferably constitutional unit (34a)) (number of constitutional unit (23)/number of constitutional unit (34)) is preferably 0.1/99.9 to 99.9/0.1, more preferably 1/99 to 99/1, further preferably 30/70 to 95/5.

The weight-average molecular weight (Mw) of the electron-withdrawing polymer (A7) is preferably 5,000 to 1,000,000, more preferably 8,000 to 900,000, further preferably 10,000 to 150,000.

In one embodiment of the present invention, the electron-withdrawing polymer (A1) preferably contains electron-withdrawing polymer (A8) composed of the aforementioned constitutional unit (23), and is more preferably composed of the electron-withdrawing polymer (A8). In the electron-withdrawing polymer (A8), only one kind or two or more kinds of the constitutional unit (23) may be contained. The constitutional unit (23) in the electron-withdrawing polymer (A8) is as described in the aforementioned electron-withdrawing polymer (A2).

The weight-average molecular weight (Mw) of the electron-withdrawing polymer (A8) is preferably 5,000 to 1,000,000, more preferably 8,000 to 900,000, further preferably 10,000 to 150,000.

In a preferable embodiment, the composition of the present invention contains electron-donating polymer (D1) and electron-withdrawing polymer (A1). The amount of the electron-donating polymer (D1) in this embodiment is preferably 1 to 10,000 parts by weight, more preferably 10 to 1,500 parts by weight, further preferably 20 to 900 parts by weight, per 100 parts by weight of the electron-withdrawing polymer (A1).

In another preferable embodiment, the composition of the present invention contains at least one selected from the group consisting of electron-donating polymer (D2) and electron-donating polymer (D3), and at least one selected from the group consisting of electron-withdrawing polymer (A2) to electron-withdrawing polymer (A7). The total amount of at least one selected from the group consisting of electron-donating polymer (D2) and electron-donating polymer (D3) in this embodiment is preferably 1 to 10,000 parts by weight, more preferably 10 to 1,500 parts by weight, further preferably 20 to 900 parts by weight, most preferably 50 to 500 parts by weight, per 100 parts by weight of the total amount of at least one selected from the group consisting of electron-withdrawing polymer (A2) to electron-withdrawing polymer (A7).

In another preferable embodiment, the composition of the present invention contains at least one selected from the group consisting of electron-donating polymer (D2) and electron-donating polymer (D3), and at least one selected from the group consisting of electron-withdrawing polymer (A2) to electron-withdrawing polymer (A5). The total amount of at least one selected from the group consisting of electron-donating polymer (D2) and electron-donating polymer (D3) in this embodiment is preferably 1 to 10,000 parts by weight, more preferably 10 to 1,500 parts by weight, further preferably 20 to 900 parts by weight, most preferably 50 to 500 parts by weight, per 100 parts by weight of the total amount of at least one selected from the group consisting of electron-withdrawing polymer (A2) to electron-withdrawing polymer (A5).

In another preferable embodiment, the composition of the present invention contains electron-donating polymer (D2) or electron-donating polymer (D3), and any one of electron-withdrawing polymer (A2) to electron-withdrawing polymer (A7) (i.e., electron-withdrawing polymer (A2), electron-withdrawing polymer (A3), electron-withdrawing polymer (A4), electron-withdrawing polymer (A5), electron-withdrawing polymer (A6) or electron-withdrawing polymer (A7)). The amount of the electron-donating polymer (D2) or electron-donating polymer (D3) in this embodiment is preferably 1 to 10,000 parts by weight, more preferably 10 to 1,500 parts by weight, further preferably 20 to 900 parts by weight, most preferably 50 to 500 parts by weight, per 100 parts by weight of any one of electron-withdrawing polymer (A2) to electron-withdrawing polymer (A7).

In another preferable embodiment, the composition of the present invention contains electron-donating polymer (D2) or electron-donating polymer (D3), and any one of electron-withdrawing polymer (A2) to electron-withdrawing polymer (A5) (i.e., electron-withdrawing polymer (A2), electron-withdrawing polymer (A3), electron-withdrawing polymer (A4) or electron-withdrawing polymer (A5)). The amount of the electron-donating polymer (D2) or electron-donating polymer (D3) in this embodiment is preferably 1 to 10,000 parts by weight, more preferably 10 to 1,500 parts by weight, further preferably 20 to 900 parts by weight, most preferably 50 to 500 parts by weight, per 100 parts by weight of any one of electron-withdrawing polymer (A2) to electron-withdrawing polymer (A5).

In another preferable embodiment, the composition of the present invention contains at least one selected from the group consisting of electron-donating polymer (D2) and electron-donating polymer (D3), and electron-withdrawing polymer (A8). The total amount of at least one selected from the group consisting of electron-donating polymer (D2) and electron-donating polymer (D3) in this embodiment is preferably 1 to 10,000 parts by weight, more preferably 10 to 1,500 parts by weight, further preferably 20 to 900 parts by weight, most preferably 50 to 500 parts by weight, per 100 parts by weight of electron-withdrawing polymer (A8).

In another preferable embodiment, the composition of the present invention contains electron-donating polymer (D2) or electron-donating polymer (D3), and electron-withdrawing polymer (A8). The amount of electron-donating polymer (D2) or electron-donating polymer (D3) in this embodiment is preferably 1 to 10,000 parts by weight, more preferably 10 to 1,500 parts by weight, further preferably 20 to 900 parts by weight, most preferably 50 to 500 parts by weight, per 100 parts by weight of electron-withdrawing polymer (A8).

In the composition of the present invention containing electron-withdrawing polymer (A1) and electron-donating polymer (D1), a ratio of the number of the constitutional unit of electron-withdrawing polymer (A1) and the number of the constitutional unit of electron-donating polymer (D1) (number of constitutional unit of electron-withdrawing polymer (A1)/number of constitutional unit of electron-donating polymer (D1)) is preferably 1/30 to 30/1, more preferably 1/2 to 2/1, further preferably 10/11 to 11/10, to improve the amount of the charge-transfer complex formed in the composition.

The electron-withdrawing polymer (A1) (preferably electron-withdrawing polymer (A2) to (A5)) can be synthesized by a known reaction using a commercially available product as a starting material. Commercially available products are available from, for example, Tokyo Chemical Industry Co., Ltd., Wako Pure Chemical Industries, Ltd., and the like. For example, electron-withdrawing polymer (A1) can be produced by reacting tetracarboxylic dianhydride (e.g., naphthalene-1,4,5,8-tetracarboxylic dianhydride) with diamine (e.g., 4,4'-diamino-2,2'-biphenyldisulfonic acid, 4,4'-diaminooctafluorobiphenyl, 2,3,5,6-tetrafluoro-1,4-phenylenediamine), as described in the below-mentioned Examples. In addition, a compound obtained by introducing a substituent into a commercially available product by a known reaction may also be used as a starting material.

The aforementioned electron-withdrawing polymer can be synthesized, for example, according to the method described in Macromolecules, 2002, 35, 9022-9028, Macromol. Chem. Phys. 2016, 217, 654-663, or Journal of Polymer Science: Part A: Polymer Chemistry, Vol. 41, 3901-3907 (2003).

The amount of tetracarboxylic dianhydride in the aforementioned reaction is preferably 0.98 to 1.02 mol, more preferably 0.99 to 1.01 mol, per 1 mol of diamine.

The production method of electron-withdrawing polymer (A1) includes a dissolution step, a polymerization step and, as necessary, a modification step.

The dissolution step is a step of dissolving diamine in an organic solvent by heating a mixture of diamine (0.1 mM to 5 M), tertiary amine (0.1 mM to 20 M), and an organic solvent. Tertiary amine is used to dissolve diamine having an acidic group in an organic solvent. While the temperature of heating the mixture is not particularly limited, diamine can be easily dissolved uniformly in a solvent at around 20 to 160° C.

The tertiary amine is not particularly limited, and examples thereof include trimethylamine, triethylamine, tripropylamine, N-ethyl-N-methylbutylamine, tributylamine, N,N-dimethylbenzylamine, N,N-diethylbenzylamine, tribenzylamine, diazabicycloundecene and the like. Among these, triethylamine is preferable. Only one kind of these tertiary amines may be used, or two or more kinds thereof may be used in combination.

As the organic solvent, one having high boiling point and high polarity is preferable. Examples thereof include phenol, m-cresol, m-chlorophenol, p-chlorophenol, dimethylformamide, dimethylacetamide, dimethyl sulfoxide, N-methyl-2-pyrrolidinone, N-cyclohexyl-2-pyrrolidinone and the like. Among these, m-cresol, dimethyl sulfoxide and N-methyl-2-pyrrolidinone are preferable. Only one kind of these organic solvents may be used, or two or more kinds thereof may be used in combination.

In the present specification, "m-" shows meta and "p-" shows para.

The polymerization step is a step of adding tetracarboxylic dianhydride (0.1 mM to 5 M) to a solution of diamine obtained in the dissolution step, and polymerizing the obtained mixture by heating in the presence of an organic acid (0.01 mM to 20 M). The organic acid acts as a catalyst for polymerization and ring-closing reaction and promotes production of polyamic acid and formation of an imide ring by the ring-closing thereof.

As the organic acid, a compound having a high boiling point and highly soluble in the above-mentioned organic solvent is preferable. Examples thereof include benzoic acid, methylbenzoic acid, dimethylbenzoic acid, salicylic acid and the like. Among these, benzoic acid is preferable. The organic acid only needs to be present in the polymerization step, and may be added in the above-mentioned dissolution step. While the amount of the organic acid to be added is not particularly limited, when benzoic acid is used as the organic acid, the amount thereof is preferably about 1-6 mol per 1 mol of tetracarboxylic dianhydride. The temperature of heating the reaction mixture is at least not less than 40° C. By setting the temperature to preferably 100 to 190° C., more preferably 140 to 180° C., the polymerization reaction efficiently proceeds, and a high-molecular-weight electron-withdrawing polymer, polyimide, can be obtained.

The modification step is a step of modifying structural defects in the polyimide obtained in the polymerization step. The structural defect refers to a defect based on the unclosing part (amic acid) in polyimide. In the modification step, the reaction mixture after the polymerization step is further heated at a temperature higher than the temperature of the polymerization step to perform a dehydration reaction, whereby the unclosing part is imidated. The temperature is at least preferably not less than 150° C., more preferably 190 to 220° C. The ring-closing reaction efficiently proceeds in this modification step, and polyimide free of structural defect can be obtained.

After the aforementioned step, electron-withdrawing polymer (A1) can be obtained by a known means such as precipitation, collection by filtration, dialysis, drying and the like.

In the composition of the present invention, it is preferable that electron-donating polymer (D) and electron-withdrawing polymer (A) form a charge-transfer complex. As a result, electron-donating polymer (D) and electron-withdrawing polymer (A) are sufficiently mixed, and a hardly water-soluble membrane superior in the strength, chemical durability and the like can be formed from the composition of the present invention. The sufficient mixing (preferably absence of phase separation in micrometer order) can be confirmed by, for example, SEM-EDX mapping of the fluorine element.

A solution of the composition of the present invention is prepared, and the solvent is evaporated from this solution, whereby the membrane can be produced. A method for preparing the solution of the composition of the present invention is not particularly limited. For example, electron-donating polymer (D) and electron-withdrawing polymer (A) are successively or simultaneously added to a solvent, and the mixture is appropriately heated to prepare a solution of the composition. Alternatively, a solution of electron-donating polymer (D) and a solution of electron-withdrawing polymer (A) are separately prepared, and the obtained solutions are mixed to prepare a solution of the composition.

Examples of the solvent for preparing a solution of the composition include water, methanol, ethanol, trifluoroethanol, 1-propanol, 2-propanol, 2-methyl-2-butanol, ethylene glycol, benzyl alcohol, cyclohexane, benzene, nitrobenzene, chloroform, carbon tetrachloride, diethyl ether, tetrahydrofuran, isoxazole, 1,4-dioxane, cyclopentyl methyl ether, acetone, acetonitrile, nitromethane, dimethyl sulfoxide, N,N-dimethylformamide, sulfolane, and 1,3-propanesultone. Only one kind of these solvents may be used, or two or more kinds thereof may be used in combination. Among these, methanol, ethanol, 1-propanol, 2-propanol, ethylene glycol, benzyl alcohol, cyclohexane, benzene, nitrobenzene, chloroform, carbon tetrachloride, diethyl ether, tetrahydrofuran, 1,4-dioxane, cyclopentyl methyl ether, acetone, acetonitrile, nitromethane, dimethyl sulfoxide, N,N-dimethylformamide, sulfolane, and 1,3-propanesultone are preferable, methanol, ethanol, 1-propanol, 2-propanol, ethylene glycol, and dimethyl sulfoxide are more preferable, and dimethyl sulfoxide is further preferable.

In the solution containing electron-donating polymer (D) and electron-withdrawing polymer (A), the total concentration of the electron-donating polymer (D) and electron-withdrawing polymer (A) is preferably 0.1 to 100 wt %, more preferably 0.5 to 10 wt %, based on the whole solution.

A method for evaporating a solvent from a solution of the composition is not particularly limited, and a solvent may be evaporated by a known means (e.g., drying by heating, drying under reduced pressure etc.). The thickness of the membrane can be adjusted by the amounts of electron-donating polymer (D) and electron-withdrawing polymer (A) to be charged, and the area of petri dish used for evaporating the solvent. The thickness of the membrane produced from the composition of the present invention is preferably 0.01 to 200 μm, more preferably 0.1 to 100 μm, further preferably 0.3 to 60 μm.

Evaporation of a solvent from a solution of the composition may be performed under air atmosphere or inert gas (e.g., nitrogen, argon) atmosphere. The solvent may be evaporated under normal pressure or under reduced pressure using vacuum dryer, vacuum pump and the like.

The temperature of evaporation of a solvent from a solution of the composition is preferably −10 to 200° C., more preferably 40 to 160° C., further preferably 50 to 130° C. Evaporation of the solvent may be performed at a constant temperature, or by changing the temperature in multiple steps.

The time of evaporation of a solvent from a solution of the composition is preferably 0.5 to 300 hr, more preferably 1 to 160 hr, further preferably 2 to 150 hr.

The conditions for producing a membrane from the composition of the present invention (e.g., kind of the aforementioned solvent, concentration of polymer in the solution, and atmosphere, pressure, temperature and time of solvent evaporation) can be selected as appropriate.

A membrane of the composition of the present invention obtained as mentioned above is preferably subjected to a heat treatment. The heat treatment can increase the amount of a charge-transfer complex formed in the membrane. The heat treatment is preferably performed under inert gas (e.g., nitrogen, argon) atmosphere. The temperature of the heat treatment is preferably 40 to 200° C., more preferably 60 to 180° C., further preferably 70 to 160° C., and the time thereof is preferably 0.01 to 200 hr, more preferably 0.5 to 160 hr, further preferably 1 to 80 hr.

The membrane produced from the composition of the present invention (i.e., membrane containing the composition of the present invention) can be used for various applications. Examples of the application of the membrane containing the composition of the present invention include electrolyte membrane of fuel cell, electrolyte coated membrane on electrode catalyst in catalyst layer, gas-permeation-suppressing membrane and the like. Among these, electrolyte membrane of fuel cell or electrolyte coated membrane on electrode catalyst in catalyst layer is preferable, and electrolyte membrane of fuel cell is more preferable. The thickness of the electrolyte membrane of a fuel cell containing the composition of the present invention is preferably 0.1 to 200 μm, more preferably 2 to 50 μm, further preferably 5 to 20 μm. The thickness of the electrolyte coated membrane on the electrode catalyst in the catalyst layer of a fuel cell containing the composition of the present invention is preferably 1 to 100 nm, more preferably 2 to 50 nm, further preferably 5 to 30 nm.

EXAMPLES

While the Synthetic Examples and Examples of the present invention are explained in more detail in the following, the present invention is not limited by them. The analysis apparatuses and conditions therefor used in the Synthetic Examples and Examples are as follows.

NMR:

The chemical shift value of proton nuclear magnetic resonance ($^1$H NMR) of polymer was measured in a deuterodimethyl sulfoxide (DMSO-$d_6$) solvent using AV-400 (400 MHz) manufactured by Bruker or AVANCE III (500 MHz) manufactured by Bruker. The chemical shift was shown by the δ value (ppm) when tetramethylsilane was the internal standard (0.0 ppm). In the description of the NMR spectrum, "s" means singlet, "brs" means broad singlet, "d" means doublet, "t" means triplet, "dd" means double doublet, "m" means multiplet, "br" means broad, "J" means coupling constant, and "Hz" means hertz.

The chemical shift value of fluorine nuclear magnetic resonance ($^{19}$F NMR) of polymer was measured in a deuterodimethyl sulfoxide (DMSO-$d_6$) solvent using INOVA 400 (376 MHz) manufactured by Agilent. The chemical shift was shown by the δ value (ppm) when trifluoroacetic acid was the external standard (−79 ppm). As interpolation of the baseline, Akima interpolation was used.

"DMSO-$d_6$" means deuterodimethyl sulfoxide.

GPC:

The weight-average molecular weight (Mw) and number-average molecular weight (Mn) of polymer was measured by gel permeation chromatography (GPC) under analysis condition A, and converted using the calibration curve of standard polystyrene.

<Analysis Condition A> column: guard column (Tosoh TSK guard column Super AW-H), manufactured by Tosoh Corporation, column (Tosoh TSK gel super AW 3000) and column (Tosoh TSK gel super AW 5000) manufactured by Tosoh Corporation were connected in tandem in this order and used.

column temperature: 40° C.

detector: difference refractive index detector RI-2031 and ultraviolet-visible detector UV-2075 manufactured by JASCO Corporation eluent: 10 mmol/L sodium nitrate dissolved in dimethyl sulfoxide UV-Vis:

The measurement of ultraviolet-visible spectroscopy (UV-vis) of polymer or polymer composition was performed using ultraviolet visible near infrared spectrophotometer V-650 manufactured by JASCO Corporation provided with integrating sphere unit ISV-722 manufactured by JASCO Corporation and sample holder SSH-506 manufactured by JASCO Corporation.

DSC:

Differential scanning calory (DSC) of polymer or polymer composition was measured under analysis condition B.

<Analysis Condition B> instrument used: thermal analysis apparatus NETZSCH STA 449 F3 Jupiter manufactured by NETZSCH under nitrogen temperature decreasing rate: 10° C./min IEC [Milliequivalent (Meq)/g (Dry Weight)]:

The theoretical ion exchange capacity (IEC) was calculated as the number of moles (mmol) of sulfo group contained per 1 g of polymer.

As for the ion exchange capacity of polymer or polymer composition, the molar ratio of a sulfo group-containing monomer introduced into the polymer was calculated from $^1$H NMR spectrum, and the amount of sulfo group introduced per repeating unit of the polymer was calculated. The number of moles of sulfo group per 1 g of polymer was calculated and divided by the unit molecular weight obtained from the composition ratio to calculate IEC.

Protonic Conductivity:

As for protonic conductivity of a membrane of polymer or polymer composition, temperature and humidification conditions were set using membrane resistance measurement system MTS740 of Scribner, and ionic conductance in the membrane thickness direction was measured, from which protonic conductivity was calculated.

Tensile Breaking Strength, Tensile Elastic Modulus and Tensile Breaking Elongation:

Using tensile tester FGS-TV (type FGP-5) manufactured by NIDEC-SHIMPO CORPORATION under the conditions of room temperature, crosshead speed 10 mm/min, and test piece size 12 mm×2 mm, a stress-strain curve of a membrane of polymer or polymer composition, tensile breaking strength (MPa), tensile elastic modulus (Young's modulus) (GPa) and tensile breaking elongation (%) were calculated.

SEM-EDX:

For the measurement of scanning electron microscope-energy dispersive X-ray spectroscopy (SEM-EDX) of a membrane of polymer composition, the membrane was embedded in an epoxy resin (product name G-2) manufactured by GATAN, heated at 100° C. for 1 hr to prepare a cured product, a cross section of the membrane in the obtained cured product was exposed using a cross section polisher manufactured by JEOL Ltd. to prepare a sample for observation. Then, the cross section of the aforementioned sample for observation was observed using JSM-7800F manufactured by JEOL Ltd. under the conditions of accelerating voltage 1 kV, magnification 3000 times. Element mapping of fluorine and the like were performed on the image, obtained by the observation, at accelerating voltage 7 kV by using EDX manufactured by Oxford Instruments.

Hydrogen Gas Permeability:

For the measurement of hydrogen gas permeability, a membrane cut into a circle with diameter 1 cm was fixed with a polyimide film tape (manufactured by DU PONT-TORAY CO., LTD., product name "Kempton tape") and an alumina tape to prepare a test piece. Using the obtained test piece and GTR-11A/31A gas barrier testing system manufactured by GTR TEC Corporation, the permeability rate of dry hydrogen passing through the membrane was measured at room temperature. Furthermore, the pressure difference between the pressurized gas supply side and the depressurized gas permeation side was set to 200 kPa, the volume of the recovered hydrogen gas was measured using G3700T gas chromatograph manufactured by YANACO TECHNICAL SCIENCE CO., LTD. provided with a thermal conductivity detector, and the hydrogen gas permeability of the membrane was calculated by the differential pressure method.

Power Generation Test 1 of Fuel Cell:

A membrane electrode assembly (hereinafter to be abbreviated as "MEA") was prepared from electrolyte membrane, catalyst ink and gas diffusion layer.

The catalyst ink was prepared using an electrode catalyst of platinum-supporting carbon (manufactured by Tanaka Kikinzoku Kogyo K.K., platinum content: 46.2 wt %, product name "TEC10E50E"), ethanol (manufactured by Wako Pure Chemical Industries, Ltd.), deionized water, and Nafion dispersion (manufactured by Wako Pure Chemical Industries, Ltd., product name "5% Nafion Dispersion DE521 CS type").

As the gas diffusion layer, hydrophobic carbon paper (manufactured by Toray Industries, Inc., product name "EC-TP1-060T") was used.

Ultrasonic wave was irradiated on the catalyst ink for 30 min using homogenizer UH-600 manufactured by SMT Co., Ltd., and the catalyst ink was applied to the both surfaces of the electrolyte membrane by spray coater V8H manufactured by Nordson Corporation. The coating conditions included 0.3 mg of the platinum amount per 1 cm$^2$ of electrolyte membrane for one surface, and Nafion proportion (=100×Nafion solid content (weight)/(Pt/C electrode catalyst+Nafion solid content) (weight)) of 28 wt %. The solid contents (weight) of GDE composition (VIII) were cathode side 1.0026 mg, and anode side 1.0243 mg.

Then, the electrolyte membrane coated with the electrode catalyst was thermocompression bonded under the conditions of 132° C., 0.3 kN, 180 sec to prepare a catalyst coated membrane (hereinafter to be abbreviated as "CCM"), and a gas diffusion layer was successively thermocompression bonded to the both surfaces of CCM under the conditions of 132° C., 0.6 kN, 20 sec to prepare MEA. The prepared MEA was placed on a single cell (manufactured by FC Development Co., Ltd., JARI standard cell) having a 1 cm$^2$ electrode area.

Using potentio-galvanostat VersaSTAT 4 manufactured by AMETEK, Inc., polarization curve and power density were measured, impedance of the single cell was measured by four-terminal sensing using SI 1287 electrochemical interface impedance analyzer manufactured by Solartron at direct current 0.6 V, alternating current 3 mV, and cell resistance value and open-circuit voltage (hereinafter to be abbreviated as "OCV") were measured. OCV is an electric potential when no electric voltage or electric current is applied to a single cell. The property of the power generation test was examined using hydrogen (100 mL/min) and air gas (atmospheric pressure) streams at 80° C., relative humidity 95%. Prior to the power generation test, cell ageing at 0.6V was performed for 4 hr. Using potentio-galvanostat VersaSTAT 4 manufactured by AMETEK, Inc., the voltage was controlled and the current density was measured. In addition, cell resistance value was measured by four-terminal sensing using SI 1287 electrochemical interface impedance analyzer manufactured by Solartron.

Power Generation Test 2 of Fuel Cell:

MEA was prepared from an electrolyte membrane, a catalyst ink and a gas diffusion layer.

As the electrolyte membrane, Nafion 212 (manufactured by Du Pont, purchased from TOYO Corporation, membrane thickness: 50 µm) was used.

The catalyst ink was prepared using electrode catalyst of platinum-supporting carbon (manufactured by Tanaka Kikinzoku Kogyo K.K., platinum content: 46.2 wt %, product name "TEC10E50E"), dimethyl sulfoxide (manufactured by Wako Pure Chemical Industries, Ltd.), deionized water, and composition (VIII) (i.e., composition containing electron-donating polymer (D3a-1) and electron-withdrawing polymer (A4-1)) obtained in the below-mentioned Example 8.

As the gas diffusion layer, a gas diffusion layer (GDL 24 BCH) manufactured by SIGRACET with a micro porous layer (hereinafter to be abbreviated as "MPL") was used. MPL is a coating layer containing a water-repellent resin and a carbon material as the main components.

Ultrasonic wave was irradiated on the catalyst ink for 30 min using homogenizer UH-600 manufactured by SMT Co., Ltd., and the catalyst ink was applied with a dropper to a gas diffusion layer with MPL (GDL 24 BCH) placed on a hot plate controlled to 140 to 150° C. to prepare a gas diffusion electrode (hereinafter to be abbreviated as "GDE"). The coating conditions included 0.3 mg of the platinum amount per 1 cm$^2$ of electrolyte membrane for one surface, and proportion of composition (VIII) (=100×solid content (weight) of composition (VIII)/solid content (weight) of (Pt/C electrode catalyst+composition (VIII))) of 28 wt %.

Then, GDE was successively thermocompression bonded to the both surfaces of electrolyte membrane under the conditions of 132° C., 0.6 kN, 20 sec to prepare MEA.

The voltage and current density were measured by the method described in Power generation test 1 of fuel cell.

Power Generation Test 3 of Fuel Cell:

A power generation test was performed by a method similar to that in Power generation test 2 of fuel cell except that the catalyst ink and the applicator alone were changed. The catalyst ink was prepared using electrode catalyst of platinum-supporting carbon (manufactured by Tanaka Kikinzoku Kogyo K.K., platinum content: 46.2 wt %, product name "TEC10E50E"), dimethyl sulfoxide (manufactured by Wako Pure Chemical Industries, Ltd.), ethanol (manufactured by Wako Pure Chemical Industries, Ltd.), and composition (XI) (i.e., composition containing electron-donating polymer (D3a-1) and electron-withdrawing polymer (A4-1)) obtained in the below-mentioned Example 11. As the applicator of the catalyst ink, airbrush system No. 23 spray-work HG airbrush wide trigger type 74523 manufactured by TAMIYA INC. was used. The solid contents (weight) of composition (XI) of GDE were cathode side 2.4233 mg, and anode side 2.0954 mg.

Evaluation of Chemical Durability:

Using the produced membrane and Nafion 212 (manufactured by Du Pont, purchased from TOYO Corporation, membrane thickness: 51 μm), the chemical durability thereof was evaluated as follows. First, iron (II) sulfate heptahydrate was dissolved in ultrapure water (concentration of iron (II) sulfate in the obtained aqueous solution: 20 ppm (based on weight)). The obtained aqueous iron (II) sulfate solution was added to the aqueous hydrogen peroxide solution (concentration of iron (II) sulfate in the obtained aqueous solution 2 ppm (based on weight), concentration of hydrogen peroxide ($H_2O_2$): 3 wt %). The obtained solution is hereinafter referred to as "Fenton test solution". The produced membrane was cut out in 1 $cm^2$ sample piece, and the weight of the sample piece before immersion in Fenton test solution was measured. The sample piece was maintained in Fenton test solution at 80° C. for 1 hr, taken out from the Fenton test solution, and the surface of the sample piece taken out was wiped with gauze. Thereafter, the weight of the sample piece after immersion in the Fenton test solution was measured. From the measured weights of the sample piece before and after immersion in the Fenton test solution, the residual rate (wt %) (=100×weight of sample piece after immersion/weight of sample piece before immersion) was calculated, and the chemical durability of the test piece (=membrane) was evaluated.

Synthetic Example 1: Synthesis of 2,6-bis(oxiran-2-ylmethoxy)naphthalene

A refluxing condenser and a dropping funnel were mounted on a reaction container, and 2,6-dihydroxynaphthalene (7.36 g, 46.0 mmol), acetone (55 mL) and water (10 mL) were successively added to the reaction container. Then, the reaction mixture was heated to 65° C. and epichlorohydrin (28.8 mL, 368.0 mmol) was added with stirring. Potassium hydroxide (5.16 g, 91.9 mmol) dissolved in a mixed solvent of acetone (20 mL) and water (45 mL) was added dropwise to the reaction mixture with a dropping funnel over 2 hr and the mixture was reacted by stirring for 12 hr. After completion of the reaction, a precipitate from the solvent was collected by filtration, and the precipitate was washed with water to give the object compound as a white solid (6.7 g, yield 54%).

Synthetic Example 2: Synthesis of Electron-Donating Polymer (D2-1)

After purging the inside of a reaction container with nitrogen, 2,6-bis(oxiran-2-ylmethoxy)naphthalene (1.246 g, 4.58 mmol), 2,6-dihydroxynaphthalene (0.733 g, 4.58 mmol), tris(2,6-dimethoxyphenyl)phosphine (16.2 mg, 36.6 μmol) and cyclohexanone (15 mL) were successively added to the reaction container. Then, the reaction mixture was stirred at 140° C. for 12 hr, dimethyl sulfoxide (10 mL) was added and the mixture was further stirred at 160° C. for 40 hr. After completion of the reaction, the reaction mixture was added dropwise to chloroform to allow for precipitation, and the precipitate was collected by filtered and dried under reduced pressure to give an electron-donating polymer (D2-1) having a constitutional unit represented by the formula (15):

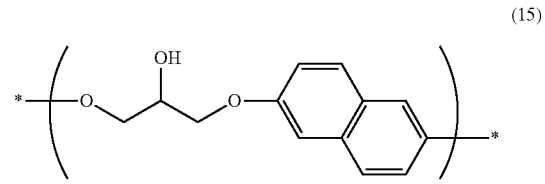

(15)

as a dark reddish-brown solid (1.86 g, yield 94%).

NMR:

$^1$H NMR (400 MHz, DMSO-$d_6$) δ: 8.23-7.56 (m, 30H), 3.49 (brs, 2H), 1.38-1.24 (m, 6H).

GPC:

weight-average molecular weight (Mw)=1.7×10,000
number-average molecular weight (Mn)=5.0×1,000
molecular weight distribution (Mw/Mn)=3.4

Synthetic Example 3: Synthesis of Electron-Donating Polymer (D3a-1)

After purging the inside of a reaction container with nitrogen, 2,6-bis(oxiran-2-ylmethoxy)naphthalene (1.246 g, 4.58 mmol), 4,4'-dihydroxydiphenyl sulfone (1.150 g, 4.58 mmol), tris(2,6-dimethoxyphenyl)phosphine (16.2 mg, 36.6 μmol) and cyclohexanone (15 mL) were successively added to the reaction container. Then, the reaction mixture was reacted by stirring at 120° C. for 96 hr. After completion of the reaction, the reaction mixture was added dropwise to methanol to allow for precipitation, and the precipitate was collected by filtered and dried under reduced pressure to give an electron-donating polymer (D3-1) having a constitutional unit represented by the formula (16a):

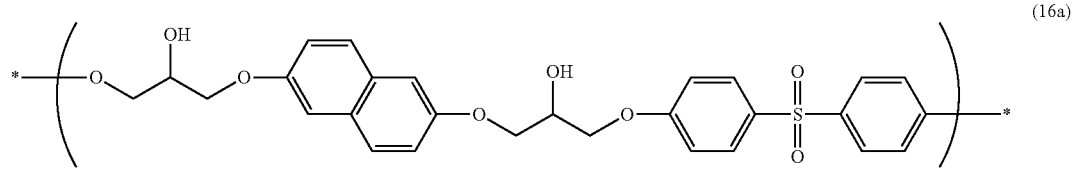

(16a)

as a dark reddish-brown solid (1.72 g, yield 72%).

FIG. 1 shows a chart of $^1$H NMR (400 MHz, DMSO-$d_6$) of the electron-donating polymer (D3a-1).

GPC:
weight-average molecular weight (Mw)=7.9×1,000
number-average molecular weight (Mn)=1.1×1,000
molecular weight distribution (Mw/Mn)=7.2

Synthetic Example 4: Synthesis of Electron-Withdrawing Polymer (A2-1)

After purging the inside of a reaction container with nitrogen, 4,4'-diamino-2,2'-biphenyldisulfonic acid (4.14 g, 12.0 mmol), 4,4'-diaminooctafluorobiphenyl (0.44 g, 1.3 mmol), m-cresol (38 g), and triethylamine (3.38 g, 33.4 mmol) were successively added to the reaction container. Then, the reaction mixture was stirred at 140 to 145° C. to dissolve a solid, and naphthalene-1,4,5,8-tetracarboxylic dianhydride (3.65 g, 13.6 mmol), and benzoic acid (3.27 g, 26.8 mol) were added. The reaction mixture was reacted by stirring at 170 to 175° C. for 27 hr. After completion of the reaction, the reaction mixture was added dropwise to a mixed solvent of methanol and concentrated hydrochloric acid (methanol:concentrated hydrochloric acid=5:1 (volume ratio)) to allow for precipitation. The precipitate was collected by filtered and the obtained precipitate was added to dimethyl sulfoxide and dissolved by heating at 100 to 110° C. to give a dimethyl sulfoxide solution.

Then, the obtained dimethyl sulfoxide solution was added dropwise to a mixed solvent of methanol and concentrated hydrochloric acid (methanol:concentrated hydrochloric acid=5:1 (volume ratio)) to allow for precipitation, and the precipitate was collected by filtration. Dimethyl sulfoxide was added to the precipitate and the precipitate was dissolved by heating at 100 to 110° C. The dimethyl sulfoxide solution was added dropwise to methanol to allow for precipitation, and the precipitate was collected by filtration. Dimethyl sulfoxide was added to the precipitate and the precipitate was dissolved by heating at 100 to 110° C. The obtained dimethyl sulfoxide solution was dialyzed for 4 days against dialysis membrane with cut-off molecular weight 1,000 (Spectra/Por 6, MWCO (Daltons) 1000, manufactured by Spectrum Laboratory). After completion of the dialysis, the solution was freeze-dried to give an electron-withdrawing polymer (A2-1) which is a random copolymer having a constitutional unit represented by the formula (23a) and a constitutional unit represented by the formula (24a):

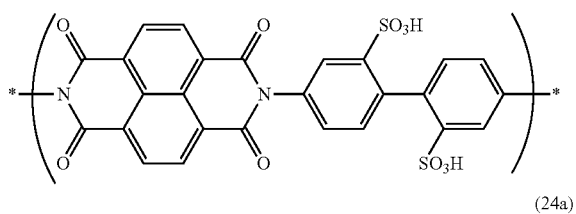

(23a)

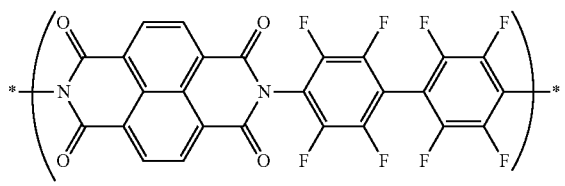

(24a)

as a deep brown solid (5.4 g, yield 70%). The number of constitutional unit (23a)/number of constitutional unit (24a) in the electron-withdrawing polymer (A2-1), which is calculated from the charged amount of the material, is 9/1.

NMR:
$^1$H NMR (400 MHz, DMSO-$d_6$) δ: 8.81 (brs), 8.06 (s), 7.78 (brs), 7.43 (brs).

Figure 2:
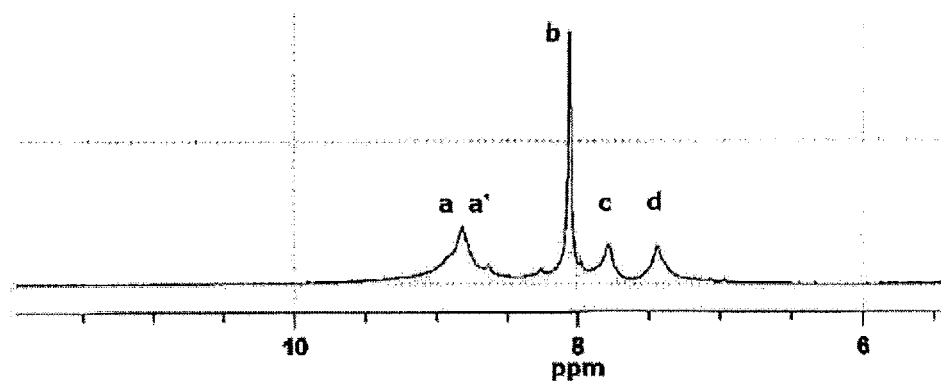
FIG. 2 shows a $^1$H NMR chart of electron-withdrawing polymer (A2-1) obtained in Synthetic Example 4 and chemical formulas showing the position of protons corresponding to the peaks.
Figure 2:
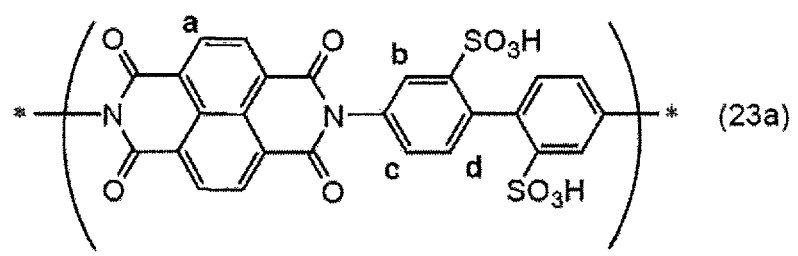
Figure 2:
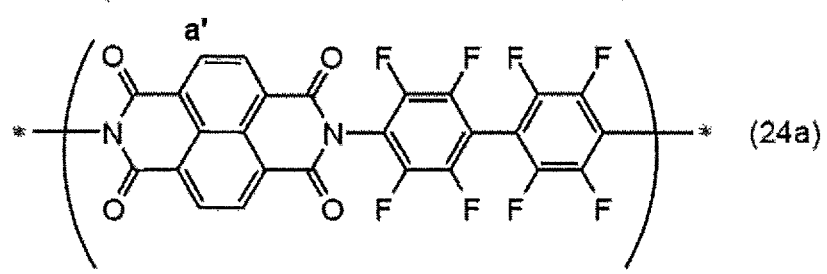
Figure 3:
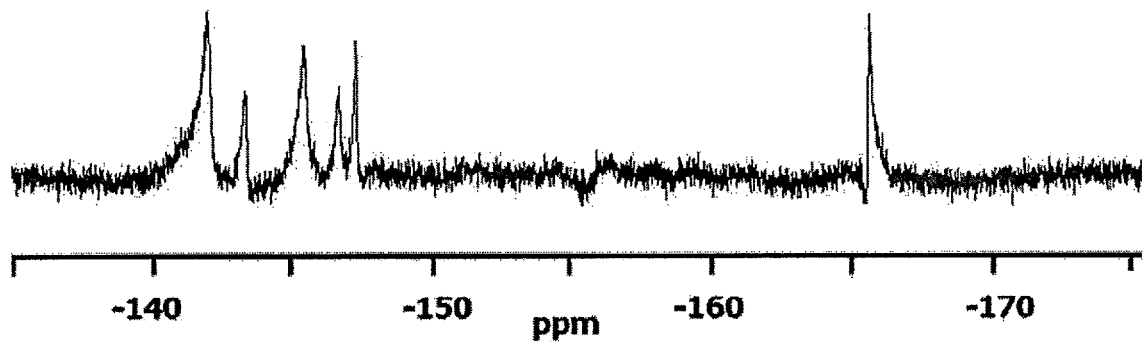
FIG. 3 shows a $^{19}$F NMR chart of electron-withdrawing polymer (A2-1) obtained in Synthetic Example 4.

FIG. 2 shows a chart of $^1$H NMR (400 MHz, DMSO-$d_6$) of the electron-withdrawing polymer (A2-1) and chemical formulas showing the position of protons corresponding to peaks. FIG. 3 shows a chart of $^{19}$F NMR (400 MHz, DMSO-$d_6$) of the electron-withdrawing polymer (A2-1).

GPC:
weight-average molecular weight (Mw)=7.5×10,000
number-average molecular weight (Mn)=1.6×10,000
molecular weight distribution (Mw/Mn)=4.7

IEC:
theoretical ion exchange capacity (IEC)=3.13 (meq/g)

protonic conductivity:
15.1 (mS/cm) at temperature 70° C., relative humidity 92%

Synthetic Example 5: Synthesis of Electron-Withdrawing Polymer (A2-2)

In the same manner as in Synthetic Example 4 except that the charged amount of the material was changed, an electron-withdrawing polymer (A2-2) which is a random copolymer having a constitutional unit represented by the formula (23a) and a constitutional unit represented by the formula (24a):

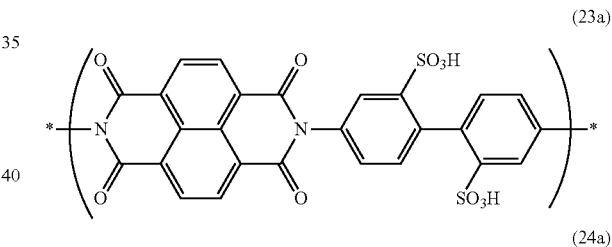

(23a)

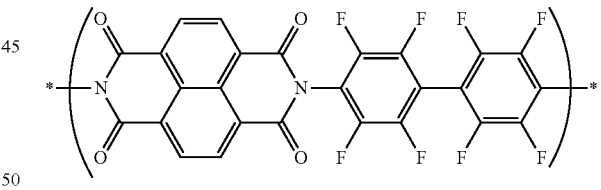

(24a)

was obtained as a dark reddish-brown solid (7.0 g, yield 92%). The number of constitutional unit (23a)/number of constitutional unit (24a) in the electron-withdrawing polymer (A2-2), which is calculated from the charged amount of the material, is 61.7/38.3.

IEC:
theoretical ion exchange capacity (IEC)=2.16 (meq/g)

Synthetic Example 6: Electron-Withdrawing Polymer (A3-1)

After purging the inside of a reaction container with nitrogen, 4,4'-diamino-2,2'-biphenyldisulfonic acid (4.15 g, 12.1 mmol), 2,3,5,6-tetrafluoro-1,4-phenylenediamine (0.240 g, 1.33 mmol), m-cresol (32 g), and triethylamine (3.41 g, 33.7 mmol) were successively added to the reaction container. Then, the reaction mixture was stirred at 140 to 145° C. to dissolve a solid, naphthalene-1,4,5,8-tetracarboxylic dianhydride (3.65 g, 13.6 mmol) and benzoic acid (3.26 g, 26.7 mol) were added, and the reaction mixture was reacted by stirring at 170 to 175° C. for 22 hr.

Figure 4:
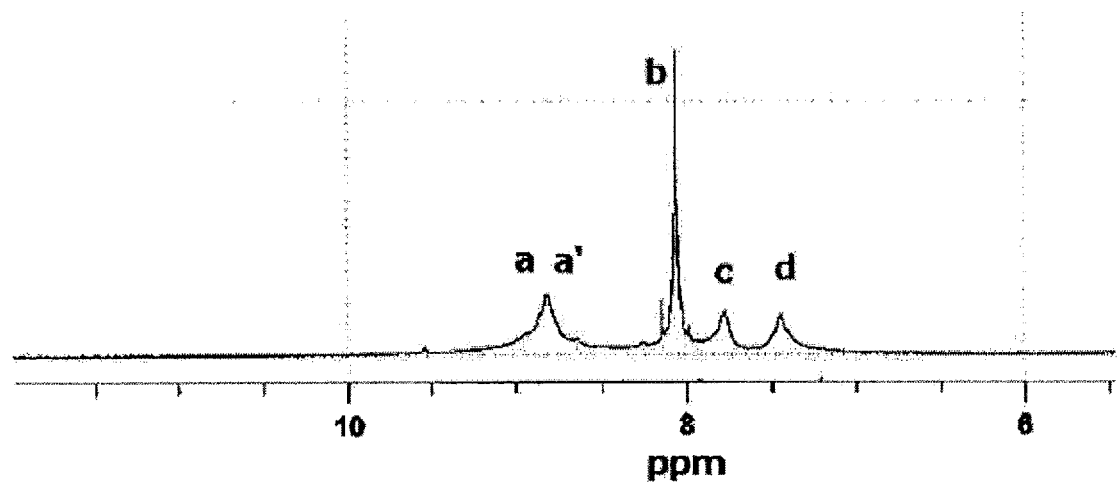
FIG. 4 shows a $^1$H NMR chart of electron-withdrawing polymer (A3-1) obtained in Synthetic Example 6 and chemical formulas showing the position of protons corresponding to the peaks.
Figure 4:
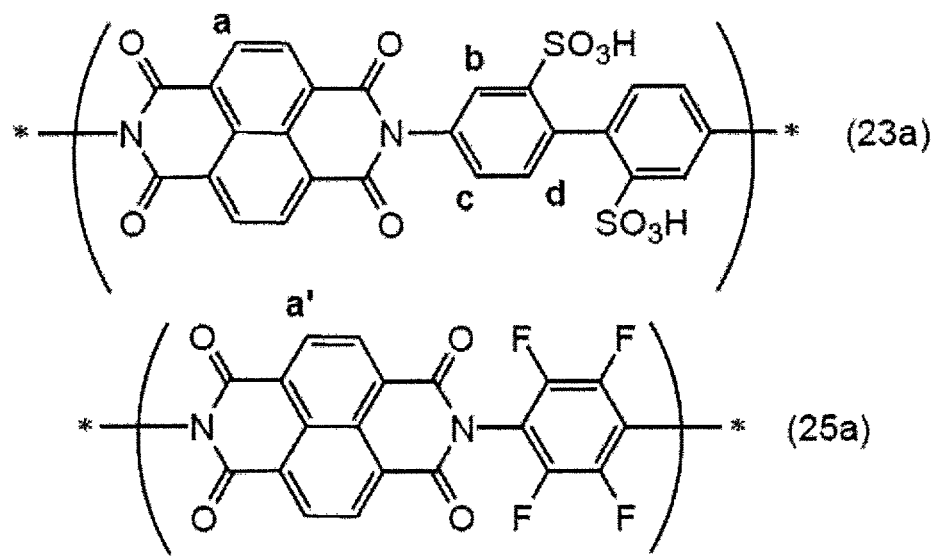
Figure 5:
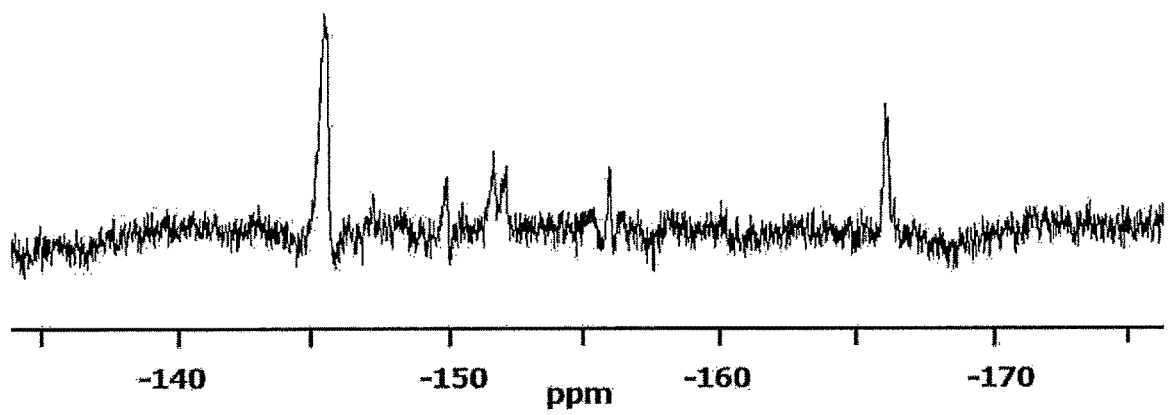
FIG. 5 shows a $^{19}$F NMR chart of electron-withdrawing polymer (A3-1) obtained in Synthetic Example 6.

After completion of the reaction, the reaction mixture was added dropwise to a mixed solvent of methanol and concentrated hydrochloric acid (methanol:concentrated hydrochloric acid=5:1 (volume ratio)) to allow for precipitation, and the precipitate was collected by filtration. Dimethyl sulfoxide was added to the precipitate, and the precipitate was dissolved by heating at 100 to 110° C. to give a dimethyl sulfoxide solution. The dimethyl sulfoxide solution was added dropwise to a mixed solvent of methanol and concentrated hydrochloric acid (methanol:concentrated hydrochloric acid=5:1 (volume ratio)) to allow for precipitation, and the precipitate was collected by filtration. This operation was repeated twice, and the obtained precipitate was dried under reduced pressure to give an electron-withdrawing polymer (A3-1) which is a random copolymer having a constitutional unit represented by the formula (23a) and a constitutional unit represented by the formula (25a):

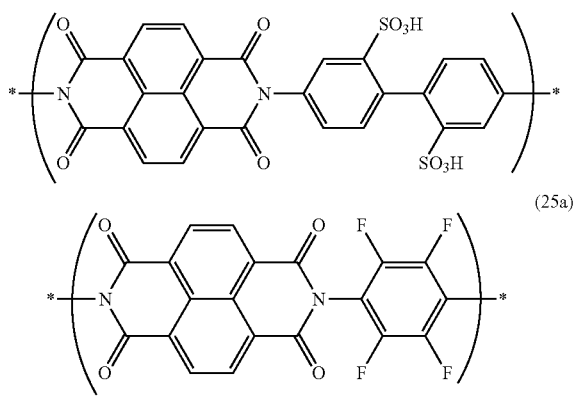

as a deep brown solid (4.2 g, yield 56%). The number of constitutional unit (23a)/number of constitutional unit (25a) in the electron-withdrawing polymer (A3-1), which is calculated from the charged amount of the material, is 9/1.
NMR:
$^1$H NMR (400 MHz, DMSO-$d_6$) δ: 8.81 (brs), 8.06 (s), 7.77 (brs), 7.44 (brs).
FIG. 4 shows a chart of $^1$H NMR (400 MHz, DMSO-$d_6$) of the electron-withdrawing polymer (A3-1) and chemical formulas showing the position of protons corresponding to peaks. FIG. 5 shows a chart of $^{19}$F NMR (400 MHz, DMSO-$d_6$) of the electron-withdrawing polymer (A3-1).
GPC:
   weight-average molecular weight (Mw)=7.5×10,000
   number-average molecular weight (Mn)=1.6×10,000
   molecular weight distribution (Mw/Mn)=4.7
IEC:
   theoretical ion exchange capacity (IEC)=3.21 (meq/g)
protonic conductivity:
   40.0 (mS/cm) at temperature 70° C., relative humidity 92%

Synthetic Example 7: Synthesis of Electron-Withdrawing Polymer (A4-1)

After purging the inside of a reaction container with nitrogen, 4,4'-diamino-2,2'-biphenyldisulfonic acid (4.15 g, 12.1 mmol), 2,3,5,6-tetrafluoro-1,4-phenylenediamine (0.230 g, 1.31 mmol), m-cresol (31 g), and triethylamine (3.41 g, 33.7 mmol) were successively added to the reaction container. Then, the reaction mixture was stirred at 140 to 145° C. to dissolve a solid. Naphthalene-1,4,5,8-tetracarboxylic dianhydride (3.65 g, 13.6 mmol) and benzoic acid (3.38 g, 27.7 mol) were added thereto and the reaction mixture was reacted by stirring at 170 to 175° C. for 22 hr.

After completion of the reaction, the reaction mixture was added dropwise to a mixed solvent of methanol and concentrated hydrochloric acid (methanol:concentrated hydrochloric acid=5:1 (volume ratio)) to allow for precipitation, and the precipitate was collected by filtration. Dimethyl sulfoxide was added to the precipitate, and the precipitate was dissolved by heating to 100 to 110° C. Then, the dimethyl sulfoxide solution was added dropwise to a mixed solvent of methanol and concentrated hydrochloric acid (methanol:concentrated hydrochloric acid=5:1 (volume ratio)) to allow for precipitation, and the precipitate was collected by filtration. This operation was repeated twice, and the obtained precipitate was dried under reduced pressure to give an electron-withdrawing polymer (A4-1) which is a random copolymer having a constitutional unit represented by the formula (23a) and a constitutional unit represented by the formula (26a):

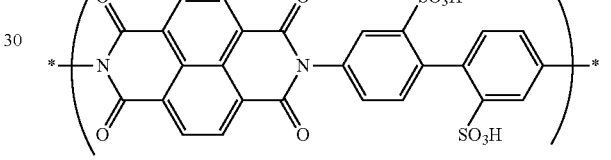

Figure 6:
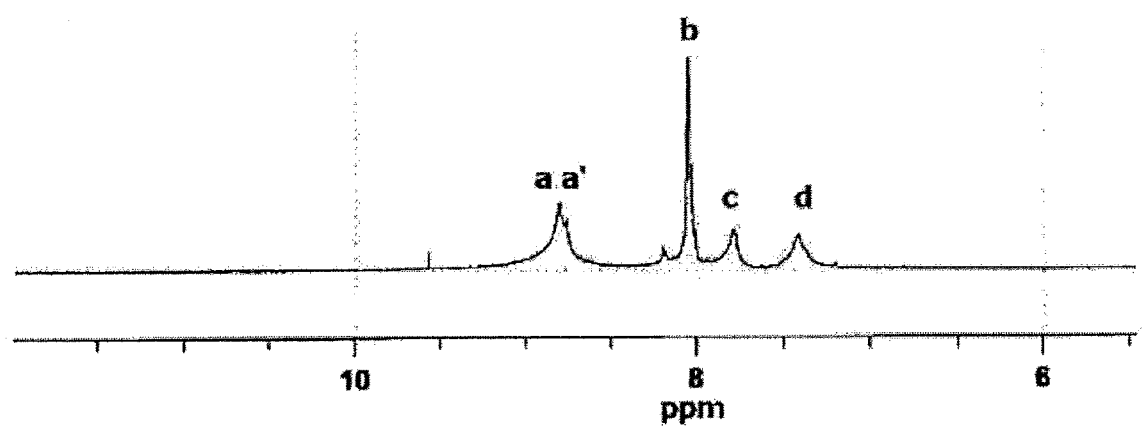
FIG. 6 shows a $^1$H NMR chart of electron-withdrawing polymer (A4-1) obtained in Synthetic Example 7 and chemical formulas showing the position of protons corresponding to the peaks.
Figure 6:
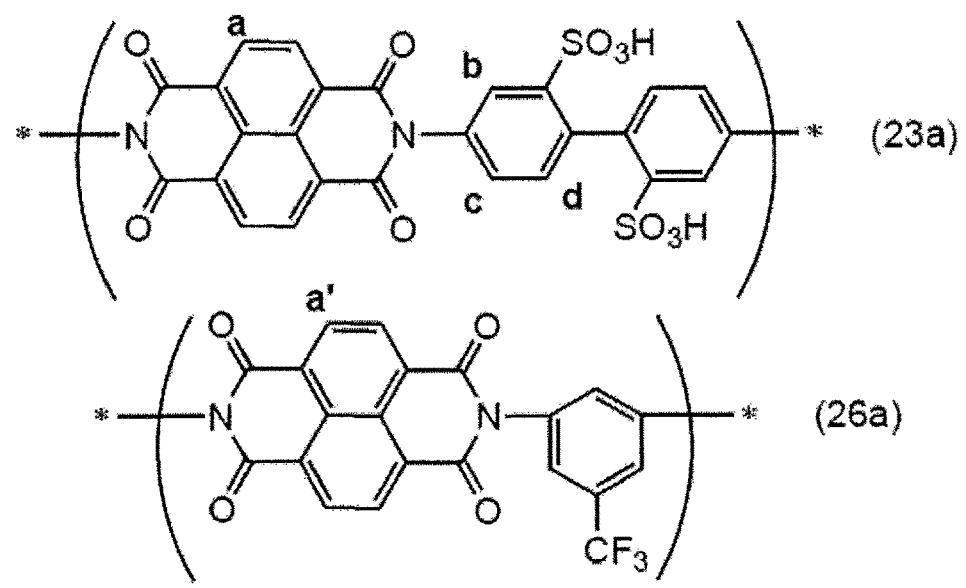

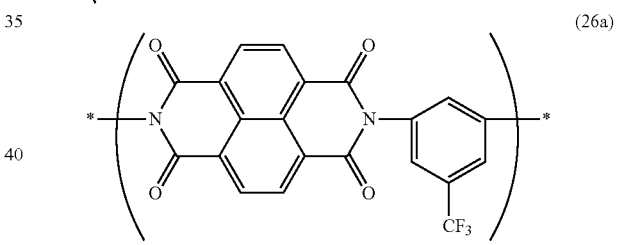

as a deep brown solid (5.5 g, yield 74%). The number of constitutional unit (23a)/number of constitutional unit (26a) in the electron-withdrawing polymer (A4-1), which is calculated from the charged amount of the material, is 9/1.
NMR:
$^1$H NMR (400 MHz, DMSO-$d_6$) δ: 9.10-8.40 (m), 8.05 (s), 7.79 (brs), 7.45 (brs).
FIG. 6 shows a chart of $^1$H NMR (400 MHz, DMSO-$d_6$) of the electron-withdrawing polymer (A4-1) and chemical formulas showing the position of protons corresponding to peaks.
GPC:
   weight-average molecular weight (Mw)=8.4×10,000
   number-average molecular weight (Mn)=2.7×10,000
   molecular weight distribution (Mw/Mn)=3.1
IEC:
   theoretical ion exchange capacity (IEC)=3.22 (meq/g)

Synthetic Example 8: Synthesis of Electron-Withdrawing Polymers (A5-1) and (A5-2)

In the same manner as in the method described in Macromol. Chem. Phys. 2016, 217, 654-663, electron-withdrawing polymers (A5-1) and (A5-2) which are random copolymers having a constitutional unit represented by the formula (23a) and a constitutional unit represented by the formula (27a):

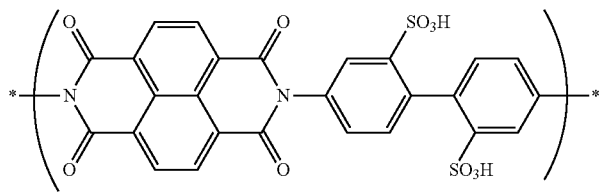

(23a)

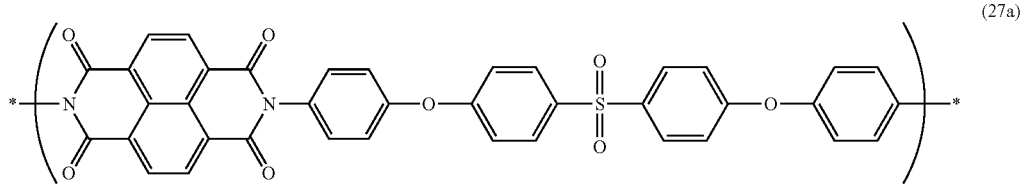

(27a)

were obtained (electron-withdrawing polymer (A5-1): 7.8 g, yield 91%; electron-withdrawing polymer (A5-2): 8.3 g, yield 92%). The number of constitutional unit (23a)/number of constitutional unit (27a) in the electron-withdrawing polymers (A5-1) and (A5-2), which is calculated from the charged amount of the material, is respectively 9/1 and 61.7/38.3.

Synthetic Example 9: Synthesis of Electron-Donating Polymer (D4-1)

After purging the inside of a reaction container with nitrogen, 2,6-dihydroxynaphthalene (1.246 g, 10.00 mmol), diphenylsulfone-4,4'-dichloro-3,3'-disulfonic acid disodium salt (3.439 g, 7.00 mmol), 4,4'-dichlorodiphenylsulfone (0.223 g, 0.78 mmol), potassium carbonate (1.290 g, 9.34 mmol), potassium iodide (1.033 g, 6.22 mmol) and toluene (25 mL) were successively added to the reaction container. A Dean-Stark apparatus was set on the reaction container, the reaction mixture stirred for 3 hr with heating under reflux to remove generated water to the outside of the system of the reaction mixture by utilizing azeotropy with the solvent. The reaction container was heated to 170° C. while evaporating the solvent (toluene) from the reaction mixture, and the reaction container was maintained at 170° C. for 24 hr. After completion of the reaction, the reaction mixture was cooled to 20 to 25° C., diluted with dimethylacetamide (15 mL), and water (300 mL) and sodium chloride (30 g) were further added to the reaction mixture to allow for precipitation, and the precipitate was collected by filtration. Dimethyl sulfoxide was added to the obtained precipitate, and the precipitate was dissolved to prepare a dimethyl sulfoxide solution. The obtained dimethyl sulfoxide solution was dialyzed against dialysis membrane with cut-off molecular weight 1,000 (Spectra/Por 6, MWCO (Daltons) 1000, manufactured by Spectrum Laboratory). In this dialysis, byproducts were removed by the dimethyl sulfoxide solvent, hydrochloric acid was added to the tube of the dialysis membrane to convert the sulfo group in a salt form in the polymer to a free acid form and dialysis was continued for 4 days until the solvent reached a neutral pH. After the completion of dialysis, the solution was freeze-dried to give an electron-donating polymer (D4-1) which is a random copolymer having a constitutional unit represented by the formula (28) and a constitutional unit represented by the formula (29):

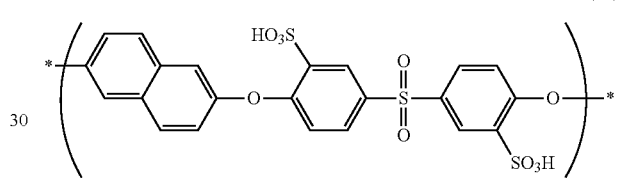

(28)

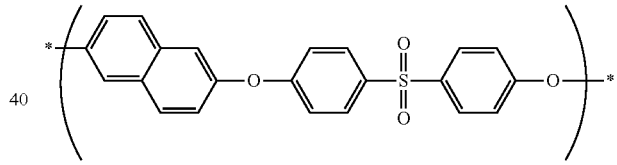

(29)

as a dark reddish-brown solid (2.7 g, yield 67%). The number of constitutional unit (28)/number of constitutional unit (29) in the electron-donating polymer (D4-1), which is calculated from the charged amount of the material, is 9/1.

GPC:

peak top molecular weight (Mp)=1.2×10,000

In the present specification, "peak top molecular weight" means "molecular weight of peak top of GPC chart".

IEC:

ion exchange capacity (IEC)=3.04 (meq/g)

Synthetic Examples 10 to 12: Synthesis of Electron-Donating Polymers (D4-2) to (D4-4)

In the same manner as in Synthetic Example 9 except that the charged amounts of the materials were changed, electron-donating polymers (D4-2) to (D4-4) which are random copolymers having a constitutional unit represented by the formula (28) and a constitutional unit represented by the formula (29):

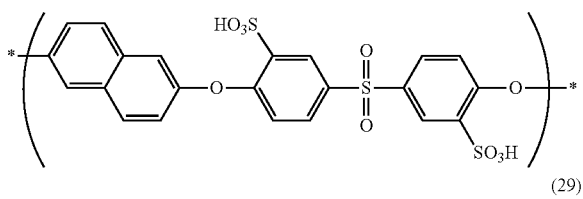

(28)

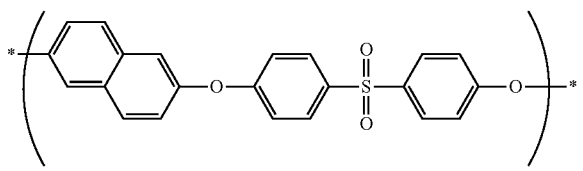

(29)

were obtained (electron-donating polymer (D4-2): 1.8 g, yield 46%; electron-donating polymer (D4-3): 2.4 g, yield 46%; electron-donating polymer (D4-4): 2.9 g, yield 80%). The number of constitutional unit (28)/number of constitutional unit (29) in the electron-donating polymers (D4-2) to (D4-4), which is calculated from the charged amount of the material, is respectively 8/2, 7/3 and 6/4.

Figure 7:
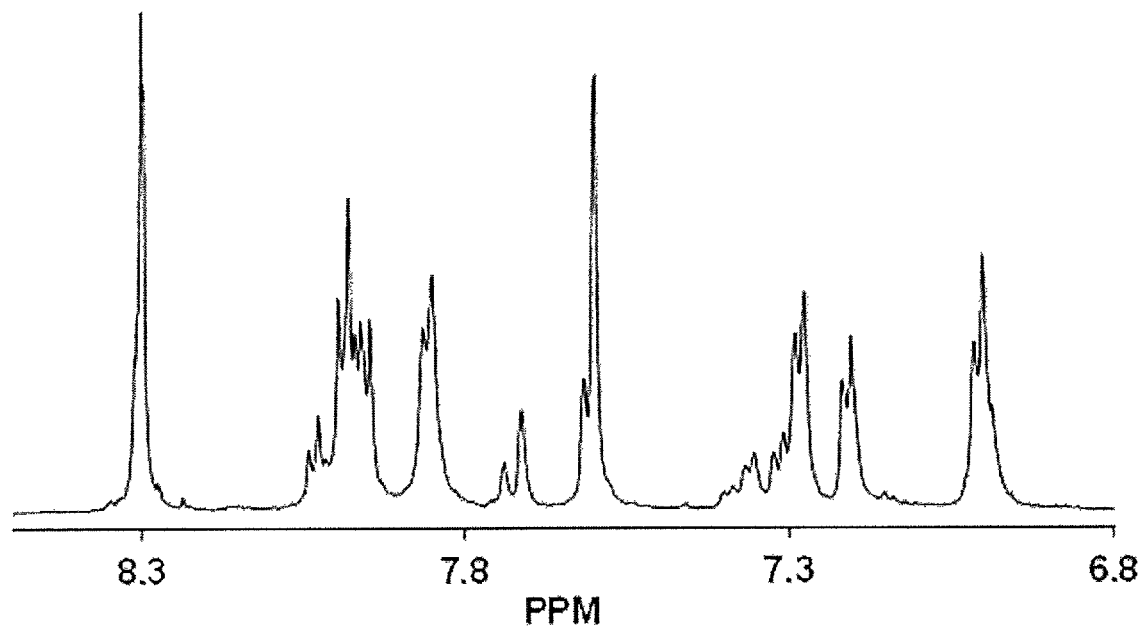
FIG. 7 shows a $^1$H NMR chart of electron-donating polymer (D4-2) obtained in Synthetic Example 10.

FIG. 7 shows a chart of $^1$H NMR (400 MHz, DMSO-$d_5$) of the electron-donating polymer (D4-2).

(1) Electron-Donating Polymer (D4-2)
GPC:
　peak top molecular weight (Mp)=32.0×10,000
IEC:
　ion exchange capacity (IEC)=2.75 (meq/g)
Protonic Conductivity:
　545 (mS/cm) at temperature 120° C., relative humidity 95%

(2) Electron-Donating Polymer (D4-3)
GPC:
　peak top molecular weight (Mp)=18.0×10,000
IEC:
　ion exchange capacity (IEC)=2.47 (meq/g)
Protonic Conductivity:
　384 (mS/cm) at temperature 120° C., relative humidity 95%

(3) Electron-Donating Polymer (D4-4)
GPC:
　peak top molecular weight (Mp)=3.3×10,000
IEC:
　ion exchange capacity (IEC)=2.25 (meq/g)
Protonic Conductivity:
　193 (mS/cm) at temperature 120° C., relative humidity 95%

Synthetic Example 13: Synthesis of Electron-Donating Polymer (D3b-1)

After purging the inside of a reaction container with nitrogen, the electron-donating polymer (D3a-1) (212 mg, 0.410 mmol) obtained in Synthetic Example 3, pyridine-sulfur trioxide complex (65.0 g, 0.410 mmol) and dimethylformamide (0.7 ml) were successively added to the reaction container. Then, the reaction mixture was reacted by stirring at 20 to 25° C. for 12 hr. After completion of the reaction, the reaction mixture was added dropwise to chloroform, the precipitate was redissolved in water, and dialysis was performed using a dialysis membrane with cut-off molecular weight 1,000 (Spectra/Por 6, MWCO (Daltons) 1000, manufactured by Spectrum Laboratory) and water. The aqueous solution after dialysis was dried to solid under reduced pressure to give an electron-donating polymer (D3b-1) having a constitutional unit represented by the formula (16b):

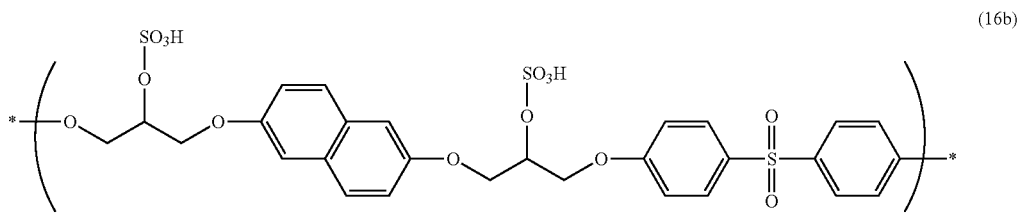

Figure 8:
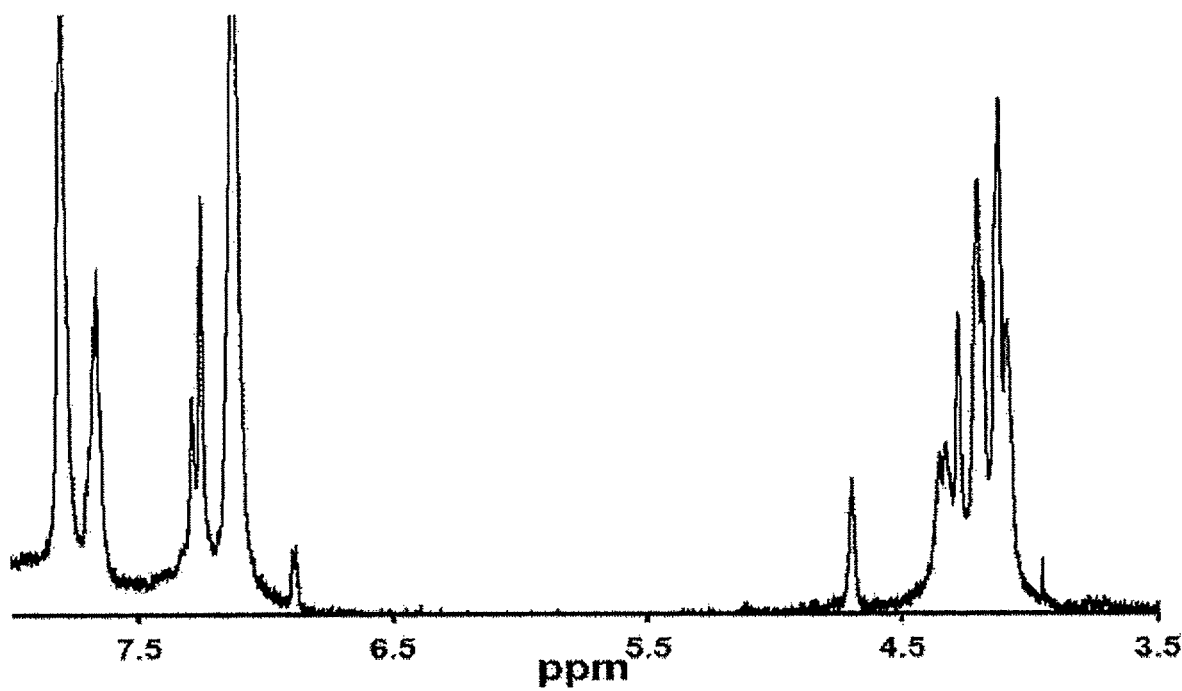
FIG. 8 shows a $^1$H NMR chart of electron-donating polymer (D3b-1) obtained in Synthetic Example 13.

(16b)

as a reddish-orange solid (225 mg, yield 81%).
FIG. 8 shows a chart of $^1$H NMR (400 MHz, DMSO-$d_6$) of the electron-donating polymer (D3b-1).

Synthetic Example 14: Synthesis of Electron-Withdrawing Polymer (A6-1)

After purging the inside of a reaction container with nitrogen, 4,4'-diamino-2,2'-biphenyldisulfonic acid (2.00 g, 5.81 mmol), 2,2-bis(aminophenyl)hexafluoropropane (0.216 g, 0.646 mmol), m-cresol (17 g), and triethylamine (1.64 g, 16.2 mmol) were successively added to the reaction container. Then, the reaction mixture was stirred at 140 to 145° C. to dissolve a solid. Thereto were added naphthalene-1,4, 5,8-tetracarboxylic dianhydride (1.77 g, 6.58 mmol) and benzoic acid (1.58 g, 12.9 mol) and the mixture was reacted by stirring at 170 to 175° C. for 22 hr. After completion of the reaction, the reaction mixture was added dropwise to a mixed solvent of methanol and concentrated hydrochloric acid (methanol:concentrated hydrochloric acid=5:1 (volume ratio)) to allow for precipitation, and the precipitate was collected by filtration.

Dimethyl sulfoxide was added to the obtained precipitate, the precipitate was dissolved by heating to 100 to 110° C. to give a dimethyl sulfoxide solution. Then, the obtained dimethyl sulfoxide solution was added dropwise to a mixed solvent of methanol and concentrated hydrochloric acid (methanol:concentrated hydrochloric acid=5:1 (volume ratio)) to allow for precipitation, and the precipitate was collected by filtration. The operations of the addition of dimethyl sulfoxide and dissolution of the obtained precipitate, dropwise addition of dimethyl sulfoxide solution to the aforementioned mixed solvent, and collection by filtration of the precipitated precipitate were performed again.

Dimethyl sulfoxide was added to the obtained precipitate, the precipitate was dissolved by heating at 100 to 110° C., and the obtained dimethyl sulfoxide solution was dialyzed for 4 days using a dialysis membrane with cut-off molecular weight 3,500 (Spectra/Por 7, MWCO (Daltons) 3500, manufactured by Spectrum Laboratory). After the completion of dialysis, the solution was dried to give an electron-withdrawing polymer (A6-1) which is a random copolymer having a constitutional unit represented by the formula (23a) and a constitutional unit represented by the formula (33a-1):

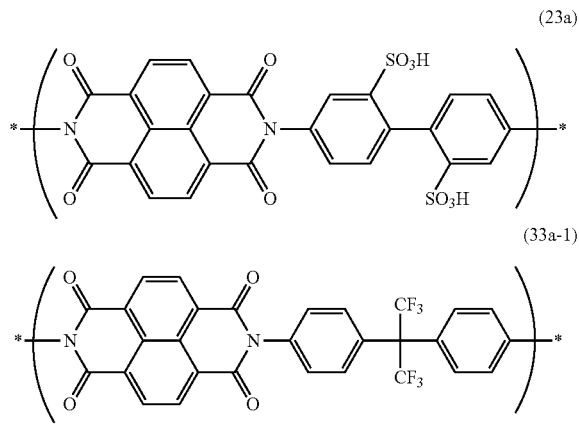

as a deep brown solid (2.9 g, yield 78%). The number of constitutional unit (23a)/number of constitutional unit (33a-1) in the electron-withdrawing polymer (A6-1), which is calculated from the charged amount of the material, is 9/1.

NMR:
$^1$H NMR (500 MHz, DMSO-$d_6$) δ: 8.80-8.76 (m), 8.04 (s), 7.79-7.73 (m), 7.41 (brs).

GPC:
weight-average molecular weight (Mw)=11×10,000
number-average molecular weight (Mn)=2.8×10,000
molecular weight distribution (Mw/Mn)=3.9

Synthetic Example 15: Synthesis of Electron-Withdrawing Polymer (A7-1)

After purging the inside of a reaction container with nitrogen, 4,4'-diamino-2,2'-biphenyldisulfonic acid (2.00 g, 5.81 mmol), 1,1-bis(4-aminophenyl)cyclohexane (0.172 g, 0.642 mmol), m-cresol (17 g), and triethylamine (1.64 g, 16.2 mmol) were successively added to the reaction container. Then, the reaction mixture was stirred at 140 to 145° C. to dissolve a solid. Thereto were added naphthalene-1,4,5,8-tetracarboxylic dianhydride (1.77 g, 6.58 mmol) and benzoic acid (1.58 g, 12.9 mol), and the reaction mixture was reacted by stirring at 170 to 175° C. for 22 hr. After completion of the reaction, the reaction mixture was added dropwise to a mixed solvent of methanol and concentrated hydrochloric acid (methanol:concentrated hydrochloric acid=5:1 (volume ratio)) to allow for precipitation, and the precipitate was collected by filtration.

Dimethyl sulfoxide was added to the obtained precipitate, and the precipitate was dissolved by heating at 100 to 110° C. Then, the obtained dimethyl sulfoxide solution was added dropwise to a mixed solvent of methanol and concentrated hydrochloric acid (methanol:concentrated hydrochloric acid=5:1 (volume ratio)) to allow for precipitation, and the precipitate was collected by filtration. The operations of the addition of dimethyl sulfoxide and dissolution of the obtained precipitate, dropwise addition of dimethyl sulfoxide solution to the aforementioned mixed solvent, and collection by filtration of the precipitated precipitate were performed again.

Dimethyl sulfoxide was added to the obtained precipitate, and the precipitate was dissolved by heating at 100 to 110° C. The obtained dimethyl sulfoxide solution was dialyzed for 4 days using a dialysis membrane with cut-off molecular weight 3,500 (Spectra/Por 7, MWCO (Daltons) 3500, manufactured by Spectrum Laboratory). After the completion of dialysis, the solution was dried to give an electron-withdrawing polymer (A7-1) which is a random copolymer having a constitutional unit represented by the formula (23a) and a constitutional unit represented by the formula (34a):

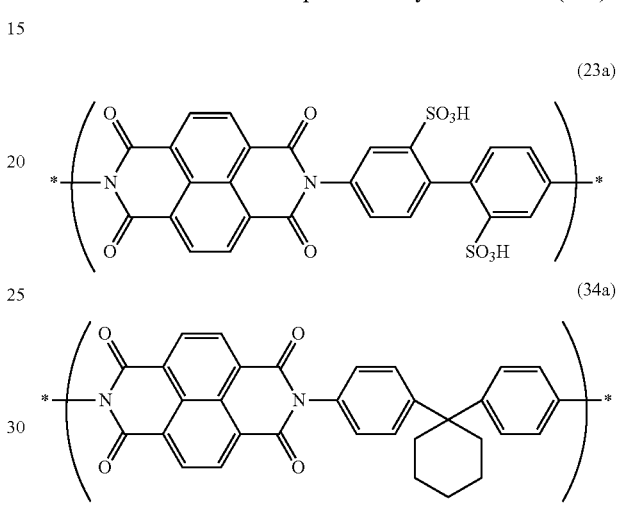

as a deep brown solid (2.8 g, yield 76%). The number of constitutional unit (23a)/number of constitutional unit (34a) in the electron-withdrawing polymer (A7-1), which is calculated from the charged amount of the material, is 9/1.

NMR:
$^1$H NMR (500 MHz, DMSO-$d_5$) δ: 8.99-8.75 (m), 8.05 (s), 7.78-7.60 (m), 7.44 (brs), 1.62-1.54 (m).

GPC:
weight-average molecular weight (Mw)=8.4×10,000
number-average molecular weight (Mn)=2.2×10,000
molecular weight distribution (Mw/Mn)=3.8

Synthetic Example 16: Synthesis of Electron-Withdrawing Polymer (A8-1)

After purging the inside of a reaction container with nitrogen, 4,4'-diamino-2,2'-biphenyldisulfonic acid (10.33 g, 30.0 mmol), m-cresol (75 mL), and triethylamine (7.59 g, 75.0 mmol) were successively added to the reaction container. Then, the reaction mixture was stirred at 140 to 145° C. to dissolve a solid. Thereto were added naphthalene-1,4,5,8-tetracarboxylic dianhydride (8.21 g, 30.6 mmol) and benzoic acid (7.33 g, 60.0 mmol) and the mixture was reacted by stirring at 180 to 185° C. for 20 hr and further at 190 to 195° C. for 5 hr. After completion of the reaction, the reaction mixture was added dropwise to a mixed solvent of methanol and concentrated hydrochloric acid (methanol:concentrated hydrochloric acid=5:1 (volume ratio)) to allow for precipitation, and the precipitate was collected by filtration.

Dimethyl sulfoxide was added to the obtained precipitate, and the precipitate was dissolved by heating at 100 to 110° C. Then, the obtained dimethyl sulfoxide solution was added dropwise to a mixed solvent of methanol and concentrated hydrochloric acid (methanol:concentrated hydrochloric acid=5:1 (volume ratio)) to allow for precipitation, and the precipitate was collected by filtration. The operations of the addition of dimethyl sulfoxide and dissolution of the obtained precipitate, dropwise addition of dimethyl sulfoxide solution to the aforementioned mixed solvent, and collection by filtration of the precipitated precipitate were performed again.

Dimethyl sulfoxide was added to the obtained precipitate, and the precipitate was dissolved by heating at 100 to 110° C. The obtained dimethyl sulfoxide solution was dialyzed for 4 days using a dialysis membrane with cut-off molecular weight 3,500 (Spectra/Por 7, MWCO (Daltons) 3500, manufactured by Spectrum Laboratory). After the completion of dialysis, the solution was dried to give an electron-withdrawing polymer (A8-1) which is a random copolymer composed of constitutional units represented by the formula (23a):

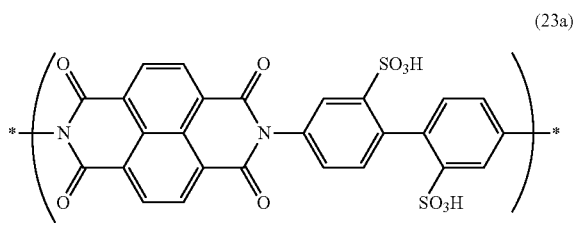

(23a)

as a deep brown solid (12.5 g, yield 70%).
NMR:
$^1$H NMR (500 MHz, DMSO-$d_6$) δ: 9.09-8.51 (br), 8.04 (s), 7.76 (brs), 7.62-7.25 (m).
GPC:
weight-average molecular weight (Mw)=13×10,000
number-average molecular weight (Mn)=5.9×1,000
molecular weight distribution (Mw/Mn)=21

Example 1: Production of Membrane of Composition (I) of Electron-Donating Polymer (D2-1) and Electron-Withdrawing Polymer (A2-1)

To a solution (408.9 mg, polymer concentration: 10 wt %) prepared by dissolving the electron-donating polymer (D2-1) in dimethyl sulfoxide was added a solution (3.26 g, polymer concentration: 3.3 wt %) prepared by dissolving the electron-withdrawing polymer (A2-1) in dimethyl sulfoxide. The solution was stirred and filtered through a 5 μm syringe filter made of polytetrafluoroethylene (PTFE) and the obtained filtrate was added to a petri dish with diameter 4 cm, the petri dish was placed on a hot plate set to 120° C., and dimethyl sulfoxide was evaporated. Then, the petri dish was placed on a vacuum dryer, and dried under reduced pressure at 80° C. for 10 hr to give a membrane of composition (I) of the electron-donating polymer (D2-1) and the electron-withdrawing polymer (A2-1) (brown transparent, membrane thickness: 44 μm).

Example 2: Production of Membrane of Composition (II) of Electron-Donating Polymer (D2-1) and Electron-Withdrawing Polymer (A2-1)

In the same manner as in Example 1 except that the ratio of a solution of the electron-donating polymer (D2-1) in dimethyl sulfoxide (polymer concentration: 10 wt %) and a solution of the electron-withdrawing polymer (A2-1) in dimethyl sulfoxide (polymer concentration: 3.3 wt %) was changed, membrane of composition (II) was produced.

Table 1 shows the amounts of the electron-donating polymer (D2-1) and the electron-withdrawing polymer (A2-1) in the membranes of the compositions (I) and (II) obtained in Examples 1 and 2, as well as the membrane thickness thereof. In Tables in the present specification and drawings, "electron-donating polymer (D2-1)" and the like are abbreviated as "(D2-1)" and the like.

Table 1 also shows molar ratio of naphthalene tetracarboxylic acid diimide part (a) of the electron-withdrawing polymer (A2-1) and dioxynaphthalene part (d) of the electron-donating polymer (D2-1) in the composition (=number (mol) of naphthalene tetracarboxylic acid diimide part (a)/ number (mol) of dioxynaphthalene part (d)). In the present specification, the molar ratio is sometimes abbreviated as "molar ratio of (A2-1)/(D2-1)".

Also, Table 1 shows molar fraction (%) of naphthalene tetracarboxylic acid diimide part (a) relative to the total of naphthalene tetracarboxylic acid diimide part (a) of the electron-withdrawing polymer (A2-1) and dioxynaphthalene part (d) of the electron-donating polymer (D2-1) in the composition (=[(number (mol) of naphthalene tetracarboxylic acid diimide part (a))/{(number (mol) of naphthalene tetracarboxylic acid diimide part (a))+(number (mol) of dioxynaphthalene part (d))}]×100). In the present specification and drawings, the molar fraction is sometimes abbreviated as "molar fraction of (A2-1)".

TABLE 1

| Example | composition | amount (mg) of (A2-1) | amount (mg) of (D2-1) | molar ratio of (A2-1)/ (D2-1) | molar fraction (%) of (A2-1) | membrane thickness (μm) |
|---------|-------------|-----------------------|-----------------------|-------------------------------|------------------------------|-------------------------|
| 1 | (I) | 109.1 | 40.9 | 1/1 | 50 | 44 |
| 2 | (II) | 131.7 | 18.2 | 2/1 | 67 | 38 |

Reference Example 1: Production of Membrane of Electron-Withdrawing Polymer (A2-1) Alone A solution prepared by dissolving the electron-withdrawing polymer (A2-1) (150 mg) in dimethyl sulfoxide (5 g) was filtered using a cotton plug, the obtained filtrate was added to a petri dish with diameter 4 cm, the petri dish was placed on a hot plate set to 60° C., and dimethyl sulfoxide was evaporated. Then, the petri dish was placed on a vacuum dryer, and dried under reduced pressure at 80° C. for 24 hr to give a membrane of the electron-withdrawing polymer (A2-1) (light brown transparent, membrane thickness 24 μm).

Reference Example 2: Production of Membrane of Electron-Withdrawing Polymer (A6-1) Alone A solution prepared by dissolving the electron-withdrawing polymer (A6-1) (151 mg) in dimethyl sulfoxide (10 g) was filtered using a 5 μm syringe filter made of polytetrafluoroethylene (PTFE), the obtained filtrate (5.0 g) was added to a petri dish with diameter 4 cm, the petri dish was placed on a hot plate set to 80° C., and dimethyl sulfoxide was evaporated. Then, the petri dish was placed on a vacuum dryer, and dried under reduced pressure at 80° C. for 12 hr to give a membrane of the electron-withdrawing polymer (A6-1) (brown transparent, membrane thickness 70 μm).

Reference Example 3: Production of Membrane of Electron-Withdrawing Polymer (A7-1) Alone A solution prepared by dissolving the electron-withdrawing polymer (A7-1) (150 mg) in dimethyl sulfoxide (5 g) was filtered using a 5 μm syringe filter made of polytetrafluoroethylene (PTFE), the obtained filtrate (2.5 g) was added to a petri dish with diameter 4 cm, the petri dish was placed on a hot plate set to 80° C., and dimethyl sulfoxide was evaporated. Then, the petri dish was placed on a vacuum dryer, and dried under reduced pressure at 80° C. for 12 hr to give a membrane of the electron-withdrawing polymer (A7-1) (brown transparent, membrane thickness 48 μm).

Example 3: Production of Membrane of Composition (III) of Electron-Donating Polymer (D3a-1) and Electron-Withdrawing Polymer (A2-1)

A solution (185 mg, polymer concentration: 10 wt %) prepared by dissolving the electron-donating polymer (D3a-1) in dimethyl sulfoxide and a solution prepared by dissolving the electron-withdrawing polymer (A2-1) in dimethyl sulfoxide (2.71 g, polymer concentration: 3 wt %) were successively added to a glass container. The solution was stirred and filtered using a cotton plug, the obtained filtrate was added to a petri dish with diameter 4 cm, the petri dish was placed on a hot plate set to 60° C., and dimethyl sulfoxide was evaporated. Then, the petri dish was placed on a vacuum dryer, and dried under reduced pressure at 60° C. for 24 hr to give a membrane of composition (III) of the electron-donating polymer (D3a-1) and the electron-withdrawing polymer (A2-1) (brown transparent, membrane thickness 13 μm).

Examples 4 to 6: Production of Membranes of Compositions (IV) to (VI) of Electron-Donating Polymer (D3a-1) and Electron-Withdrawing Polymer (A2-1)

In the same manner as in Example 3 except that the ratio of a solution of the electron-donating polymer (D3a-1) in dimethyl sulfoxide (polymer concentration: 10 wt %) and a solution of the electron-withdrawing polymer (A2-1) in dimethyl sulfoxide (polymer concentration: 3 wt %) was changed, membranes of compositions (IV) to (VI) were produced.
Protonic Conductivity of Membrane of Composition (IV) of Electron-Donating Polymer (D3a-1) and Electron-Withdrawing Polymer (A2-1):
 20.1 (mS/cm) at temperature 80° C., relative humidity 90%
Protonic Conductivity of Membrane of Composition (V) of Electron-Donating Polymer (D3a-1) and Electron-Withdrawing Polymer (A2-1)
 4.1 (mS/cm) at temperature 80° C., relative humidity 90%
Table 2 shows the amounts of the electron-donating polymer (D3a-1) and the electron-withdrawing polymer (A2-1) in the membranes of the compositions (III) to (VI) obtained in Examples 3 to 6, as well as the membrane thickness thereof.
Table 2 also shows molar ratio of naphthalene tetracarboxylic acid diimide part (a) of the electron-withdrawing polymer (A2-1) and dioxynaphthalene part (d) of the electron-donating polymer (D3a-1) in the composition (=number (mol) of naphthalene tetracarboxylic acid diimide part (a)/number (mol) of dioxynaphthalene part (d)). In the present specification, the molar ratio is sometimes abbreviated as "molar ratio of (A2-1)/(D3a-1)".

Also, Table 2 shows molar fraction (%) of naphthalene tetracarboxylic acid diimide part (a) relative to the total of naphthalene tetracarboxylic acid diimide part (a) of the electron-withdrawing polymer (A2-1) and dioxynaphthalene part (d) of the electron-donating polymer (D3a-1) in the composition (=[(number (mol) of naphthalene tetracarboxylic acid diimide part (a))/{(number (mol) of naphthalene tetracarboxylic acid diimide part (a))+(number (mol) of dioxynaphthalene part (d))}]×100). In the present specification, the molar fraction is sometimes abbreviated as "molar fraction of (A2-1)".

TABLE 2

| Example | composition | amount (mg) of (A2-1) | amount (mg) of (D3a-1) | molar ratio of (A2-1)/ (D3a-1) | molar fraction (%) of (A2-1) | membrane thickness (μm) |
|---|---|---|---|---|---|---|
| 3 | (III) | 81.5 | 18.5 | 4/1 | 80 | 13 |
| 4 | (IV) | 68.8 | 31.2 | 2/1 | 67 | 18 |
| 5 | (V) | 52.4 | 47.6 | 1/1 | 50 | 23 |
| 6 | (VI) | 35.5 | 64.5 | 1/2 | 33 | 29 |

Example 7: Production of Membrane of Composition (VII) of Electron-Donating Polymer (D2-1) and Electron-Withdrawing Polymer (A3-1)

A solution (0.17 g, polymer concentration: 9.46 wt %) prepared by dissolving the electron-donating polymer (D2-1) in dimethyl sulfoxide and a solution (3.84 g, polymer concentration: 2.19 wt %) prepared by dissolving the electron-withdrawing polymer (A3-1) in dimethyl sulfoxide were successively added to a glass container. The solution was stirred and filtered through a 5 μm syringe filter made of polytetrafluoroethylene (PTFE) and the obtained filtrate was added to a petri dish with diameter 4 cm, the petri dish was placed on a hot plate set to 120° C., and dimethyl sulfoxide was evaporated. Then, the petri dish was placed on a vacuum dryer, and dried under reduced pressure at 110° C. for 10 hr to give a membrane of composition (VII) of the electron-donating polymer (D2-1) and the electron-withdrawing polymer (A3-1) (brown transparent, membrane thickness: 21.1 μm).

Example 8: Production of Composition (VIII) Containing Electron-Donating Polymer (D3a-1) and Electron-Withdrawing Polymer (A4-1)

The electron-donating polymer (D3a-1) (12.8 mg) and the electron-withdrawing polymer (A4-1) (25.1 mg) were added to a sample bottle, and dimethyl sulfoxide (5.50 g) and water (0.49 g) were successively added to the sample bottle. The solution was stirred and heated at 80 to 90° C. to give composition (VIII) containing the electron-donating polymer (D3a-1) and the electron-withdrawing polymer (A4-1).

Example 9: Production of Membrane of Composition (IX) of Electron-Donating Polymer (D3a-1) and Electron-Withdrawing Polymer (A6-1)

A solution (0.697 g, polymer concentration: 10 wt %) prepared by dissolving the electron-donating polymer (D3a-

1) in dimethyl sulfoxide and a solution (5.00 g, polymer concentration: 1.5 wt %) prepared by dissolving the electron-withdrawing polymer (A6-1) in dimethyl sulfoxide were successively added to a glass container The solution was stirred and filtered through a 5 μm syringe filter made of polytetrafluoroethylene (PTFE) and the obtained filtrate was added to a petri dish with diameter 4 cm, the petri dish was placed on a hot plate set to 120° C., and dimethyl sulfoxide was evaporated. Then, the petri dish was placed on a vacuum dryer, and dried under reduced pressure at 100° C. for 12 hr to give a membrane of composition (IX) of the electron-donating polymer (D3a-1) and the electron-withdrawing polymer (A6-1) (brown transparent, membrane thickness: 88 μm).

Protonic Conductivity of Membrane of Composition (IX) of Electron-Donating Polymer (D3a-1) and Electron-Withdrawing Polymer (A6-1):

2.5 (mS/cm) at temperature 90° C., relative humidity 80%

Example 10: Production of Membrane of Composition (X) of Electron-Donating Polymer (D3a-1) and Electron-Withdrawing Polymer (A7-1)

A solution (0.698 g, polymer concentration: 10 wt %) prepared by dissolving the electron-donating polymer (D3a-1) in dimethyl sulfoxide and a solution (2.46 g, polymer concentration: 3.1 wt %) prepared by dissolving the electron-withdrawing polymer (A7-1) in dimethyl sulfoxide were successively added to a glass container The solution was stirred and filtered through a 5 μm syringe filter made of polytetrafluoroethylene (PTFE) and the obtained filtrate was added to a petri dish with diameter 4 cm, the petri dish was placed on a hot plate set to 120° C., and dimethyl sulfoxide was evaporated. Then, the petri dish was placed on a vacuum dryer, and dried under reduced pressure at 100° C. for 12 hr to give a membrane of composition (IX) of the electron-donating polymer (D3a-1) and the electron-withdrawing polymer (A7-1) (brown transparent, membrane thickness: 47 μm).

Protonic Conductivity of Membrane of Composition (X) of Electron-Donating Polymer (D3a-1) and Electron-Withdrawing Polymer (A7-1):

14 (mS/cm) at temperature 90° C., relative humidity 80%

Example 11: Production of Composition (XI) Containing Electron-Donating Polymer (D3a-1) and Electron-Withdrawing Polymer (A4-1)

The electron-donating polymer (D3a-1) (12.8 mg) and dimethyl sulfoxide (3 mL) were successively added to a sample bottle. The solution was stirred and heated at 80 to 90° C. to give a solution. Then, to a solution of the electron-donating polymer (D3a-1) in dimethyl sulfoxide was added the electron-withdrawing polymer (A4-1) (25.1 mg), and ethanol (2 mL) was added to give composition (XI) containing the electron-donating polymer (D3a-1) and the electron-withdrawing polymer (A4-1).

Example 12: Production of Membrane of Heat-Treated Composition (XII)

The membrane of the composition (IV) obtained in Example 4 was placed in a glass vacuum desiccator with a cock, and the inside of the desiccator was purged with nitrogen gas. Then, the vacuum desiccator was stood in a constant-temperature dryer set to 130° C. for 2 hr to give a membrane of heat-treated composition (XII) (dark brown transparent, membrane thickness 18 μm).

Examples 13 and 14: Production of Membranes of Heat-Treated Compositions (XIII) and (XIV)

In the same manner as in Example 12 except that the membrane of the composition (V) or (VI) obtained in Example 5 or 6 was used instead of the membrane of the composition (IV) obtained in Example 4, membranes of heat-treated compositions (XIII) and (XIV) were produced.

Table 3 shows the heat-treated compositions obtained in Examples 12 to 14, the starting compositions used for heat treatment, molar ratio of (A2-1)/(D3a-1), molar fraction of (A2-1) and membrane thickness.

TABLE 3

| Example | heat-treated composition | starting composition | molar ratio of (A2-1)/(D3a-1) | molar fraction (%) of (A2-1) | membrane thickness (μm) |
| --- | --- | --- | --- | --- | --- |
| 12 | (XII) | (IV) | 2/1 | 67 | 18 |
| 13 | (XIII) | (V) | 1/1 | 50 | 23 |
| 14 | (XIV) | (VI) | 1/2 | 33 | 29 |

Reference Example 4: Production of Membrane of Heat-Treated Electron-Withdrawing Polymer (A2-1)

In the same manner as in Example 12 except that the membrane of the electron-withdrawing polymer (A2-1) obtained Reference Example 1 was used instead of the membrane of the composition (IV) obtained in Example 4, a membrane of heat-treated electron-withdrawing polymer (A2-1) was obtained (light brown transparent, membrane thickness 24 μm).

Example 15: Production of Membrane of Composition (XV) of Electron-Donating Polymer (D2-1) and Electron-Withdrawing Polymer (A8-1)

To a solution (158.0 mg, polymer concentration: 10 wt %) prepared by dissolving the electron-donating polymer (D2-1) in dimethyl sulfoxide was added a solution (2.81 g, polymer concentration: 3.3 wt %) prepared by dissolving the electron-withdrawing polymer (A8-1) in dimethyl sulfoxide. The solution was stirred and filtered using a cotton plug, the obtained filtrate was added to a petri dish with diameter 4 cm, the petri dish was placed on a hot plate set to 60° C., and dimethyl sulfoxide was evaporated. Then, the petri dish was placed on a vacuum dryer, and dried under reduced pressure at 80° C. for 24 hr to give a membrane of the composition (XV) of the electron-donating polymer (D2-1) and the electron-withdrawing polymer (A8-1) (light brown transparent, membrane thickness 11 μm).

Membrane of Composition (XV)

theoretical ion exchange capacity (IEC)=2.92 (meq/g)

Example 16 and 17: Production of Membranes of Compositions (XVI) and (XVII) of Electron-Donating Polymer (D2-1) and Electron-Withdrawing Polymer (A8-1)

In the same manner as in Example 15 except that the ratio of dimethyl sulfoxide solution (polymer concentration: 10 wt %) of the electron-donating polymer (D2-1) and dimethyl sulfoxide solution (polymer concentration: 3 wt %) of the electron-withdrawing polymer (A8-1) was changed, membranes of the compositions (XVI) and (XVII) were produced.

Membrane of Composition (XVI)
theoretical ion exchange capacity (IEC)=3.34 (meq/g)

Membrane of Composition (XVII)
theoretical ion exchange capacity (IEC)=3.41 (meq/g)

Table 4 shows the amounts of electron-donating polymer (D2-1) and electron-withdrawing polymer (A8-1) in the membranes of the compositions (XV) to (XVII) obtained in Examples 15 to 17, as well as the membrane thickness thereof.

Table 4 also shows molar ratio of naphthalene tetracarboxylic acid diimide part (a) of the electron-withdrawing polymer (A8-1) and dioxynaphthalene part (d) in the electron-donating polymer (D2-1) in the composition (=number (mol) of naphthalene tetracarboxylic acid diimide part (a)/ number (mol) of dioxynaphthalene part (d)). In the present specification, the molar ratio is sometimes abbreviated as "molar ratio of (A8-1)/(D2-1)".

Also, Table 4 shows molar fraction (%) of naphthalene tetracarboxylic acid diimide part (a) relative to the total of naphthalene tetracarboxylic acid diimide part (a) of the electron-withdrawing polymer (A2-1) and dioxynaphthalene part (d) of the electron-donating polymer (D2-1) in the composition (=[(number (mol) of naphthalene tetracarboxylic acid diimide part (a))/{(number (mol) of naphthalene tetracarboxylic acid diimide part (a))+(number (mol) of dioxynaphthalene part (d)))}]×100). In the present specification, the molar fraction is sometimes abbreviated as "molar fraction of (A8-1)".

TABLE 4

| Example | composition | amount (mg) of (A8-1) | amount (mg) of (D2-1) | molar ratio of (A8-1)/ (D2-1) | molar fraction (%) of (A8-1) | membrane thickness (μm) |
|---|---|---|---|---|---|---|
| 15 | (XV) | 84.2 | 15.8 | 1/0.5 | 67 | 11 |
| 16 | (XVI) | 96.4 | 3.6 | 1/0.1 | 91 | 14 |
| 17 | (XVII) | 98.2 | 1.8 | 1/0.05 | 95 | 14 |

Example 18: Production of Membrane of Heat-Treated Composition (XVIII)

The membrane of the composition (XV) obtained in Example 15 was placed in a glass vacuum desiccator with a cock, and the inside of the desiccator was purged with nitrogen gas. Then, the vacuum desiccator was stood in a constant-temperature dryer set to 150° C. for 50 hr to give a membrane of heat-treated composition (XVIII) (dark brown transparent, membrane thickness 11 μm).

Example 19 and 20: Production of Membranes of Heat-Treated Compositions (XIX) and (XX)

In the same manner as in Example 18 except that the membrane of the composition (XVI) or (XVII) obtained in Example 16 or 17 was used instead of the membrane of the composition (XV) obtained in Example 15, membranes of heat-treated compositions (XIX) and (XX) were produced.
Protonic Conductivity of Membrane of Composition (XIX):
9.0 (mS/cm) at temperature 59° C., relative humidity 91%
protonic conductivity of membrane of composition (XX):
32 (mS/cm) at temperature 79° C., relative humidity 90%

Table 5 shows the heat-treated compositions obtained in Examples 18 to 20, the starting compositions used for heat treatment, molar ratio of (A8-1)/(D2--1), molar fraction of (A8-1) and membrane thickness.

TABLE 5

| Example | heat-treated composition | starting composition | molar ratio of (A8-1)/ (D2-1) | molar fraction (%) of (A8-1) | membrane thickness (μm) |
|---|---|---|---|---|---|
| 18 | (XVIII) | (XV) | 1/0.5 | 67 | 11 |
| 19 | (XIX) | (XVI) | 1/0.1 | 91 | 14 |
| 20 | (XX) | (XVII) | 1/0.05 | 95 | 14 |

Reference Example 5: Production of Membrane of Electron-Withdrawing Polymer (A8-1) Alone A solution prepared by dissolving the electron-withdrawing polymer (A8-1) (79.3 mg) in dimethyl sulfoxide (2 mL) was filtered using a cotton plug, the obtained filtrate was added to a petri dish with diameter 4 cm, the petri dish was placed on a hot plate set to 60° C., and dimethyl sulfoxide was evaporated. Then, the petri dish was placed on a vacuum dryer, and dried under reduced pressure at 80° C. for 24 hr to give a membrane of the electron-withdrawing polymer (A8-1) (light brown transparent, membrane thickness 11 μm).

Example 21: Production of Membrane of Composition (XXI) of Electron-Donating Polymer (D3a-1) and Electron-Withdrawing Polymer (A8-1)

A solution prepared by dissolving the electron-donating polymer (D3a-1) (35.8 mg) in dimethyl sulfoxide (1 mL) and a solution prepared by dissolving the electron-withdrawing polymer (A8-1) (78.9 mg) in dimethyl sulfoxide (1 mL) were successively added to a glass container. The solution was stirred and filtered using a cotton plug, the obtained filtrate was added to a petri dish with diameter 4 cm, the petri dish was placed on a hot plate set to 60° C., and dimethyl sulfoxide was evaporated. Then, the petri dish was placed on a vacuum dryer, and dried under reduced pressure at 60° C. for 24 hr to give a membrane of the composition (XXI) of the electron-donating polymer (D3a-1) and the electron-withdrawing polymer (A8-1) (brown transparent, membrane thickness 14 μm).

Example 22: Production of Membrane of Heat-Treated Composition (XXII)

The membrane of the composition (XXI) obtained in Example 21 was placed in a glass vacuum desiccator with a cock, and the inside of the desiccator was purged with nitrogen gas. Then, the vacuum desiccator was stood in a constant-temperature dryer set to 130° C. for 2 hr to give a membrane of heat-treated composition (XXII) (dark brown transparent, membrane thickness 14 μm).

Experimental Example 1: Confirmation of Charge-Transfer Complex

The absorption spectrum of the membranes of the compositions (I) to (VI), (IX) and (X) obtained in Examples 1 to 6, 9 and 10 was measured by ultraviolet-visible spectroscopy (UV-vis). In addition, the absorption spectrum of the membrane of the electron-withdrawing polymer (A2-1), the membrane of the electron-withdrawing polymer (A6-1) and the membrane of the electron-withdrawing polymer (A7-1) obtained in Reference Examples 1 to 3 was measured.

Figure 9:
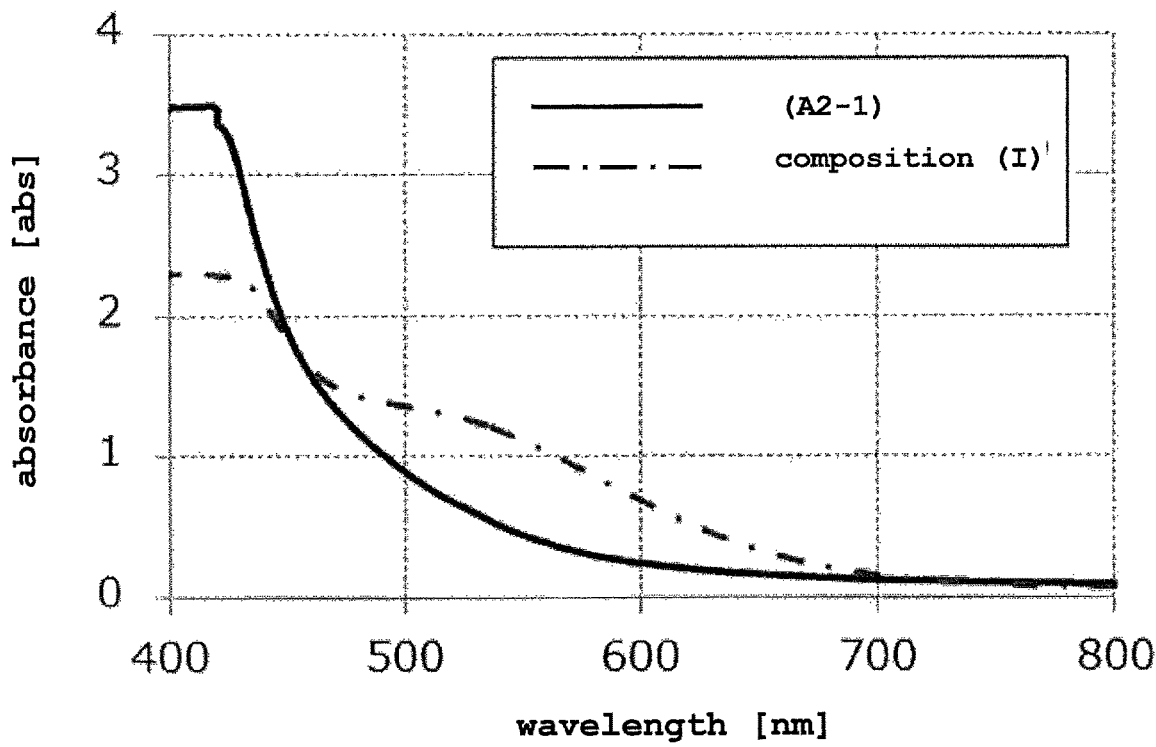
FIG. 9 shows absorption spectra of a membrane of electron-withdrawing polymer (A2-1) and a membrane of composition (I) measured in Experimental Example 1 by ultraviolet-visible spectroscopy (UV-vis).
Figure 10:
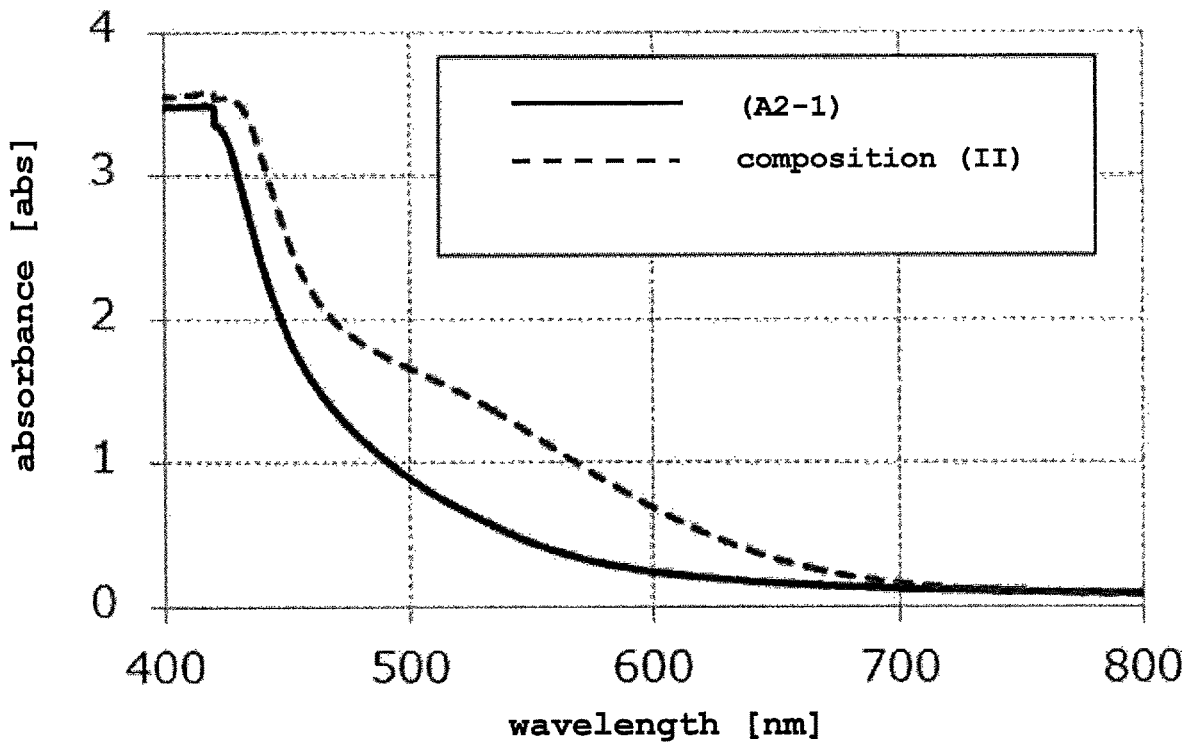
FIG. 10 shows absorption spectra of a membrane of electron-withdrawing polymer (A2-1) and a membrane of composition (II) measured in Experimental Example 1 by ultraviolet-visible spectroscopy (UV-vis).
Figure 11:
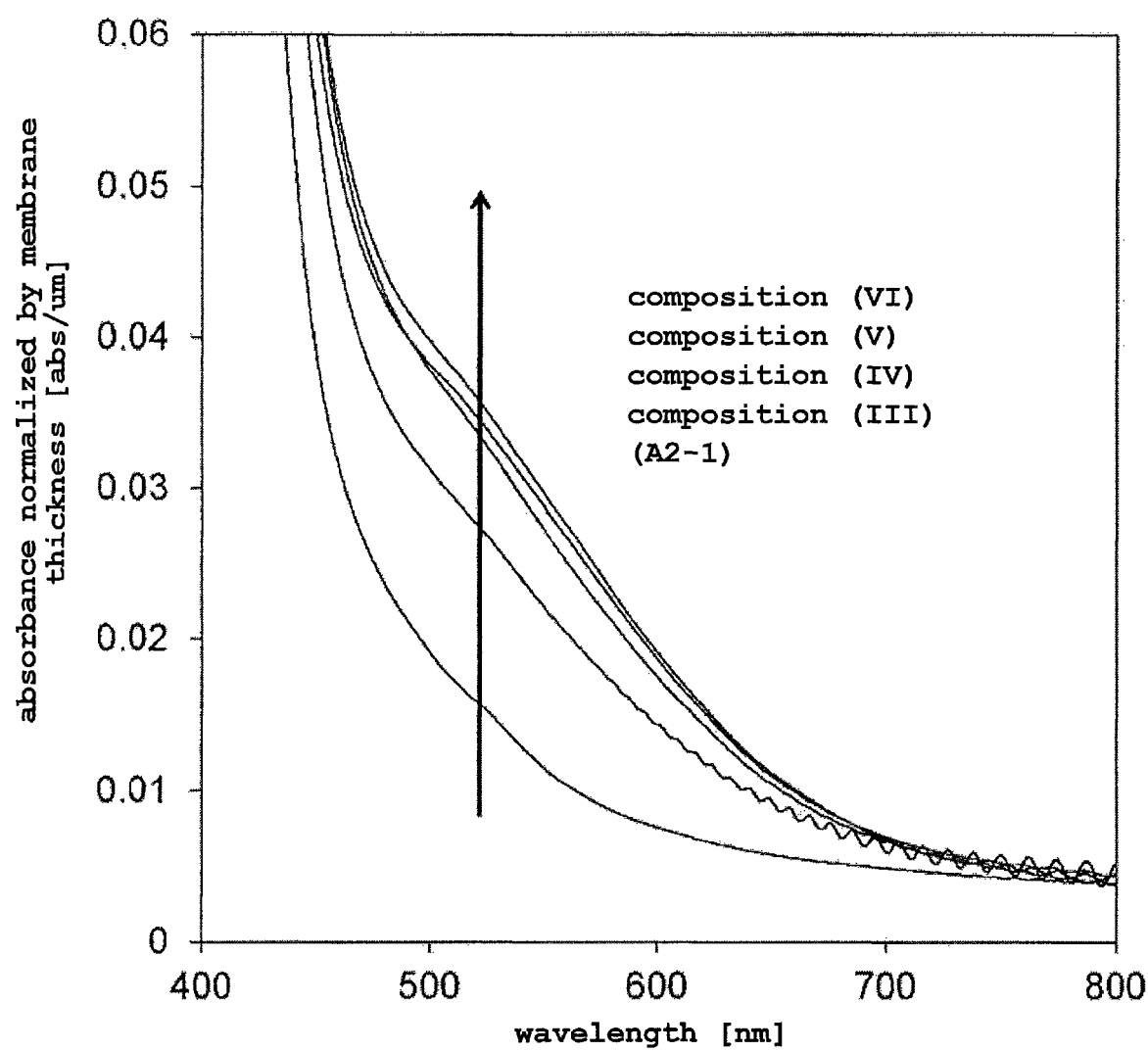
FIG. 11 shows absorption spectra of a membrane of electron-withdrawing polymer (A2-1) and membranes of compositions (III) to (VI) measured in Experimental Example 1 by ultraviolet-visible spectroscopy (UV-vis). The absorption spectrum shows the spectra of the membrane of electron-withdrawing polymer (A2-1) and the membranes of compositions (III) to (VI) in this order from the bottom.
Figure 14:
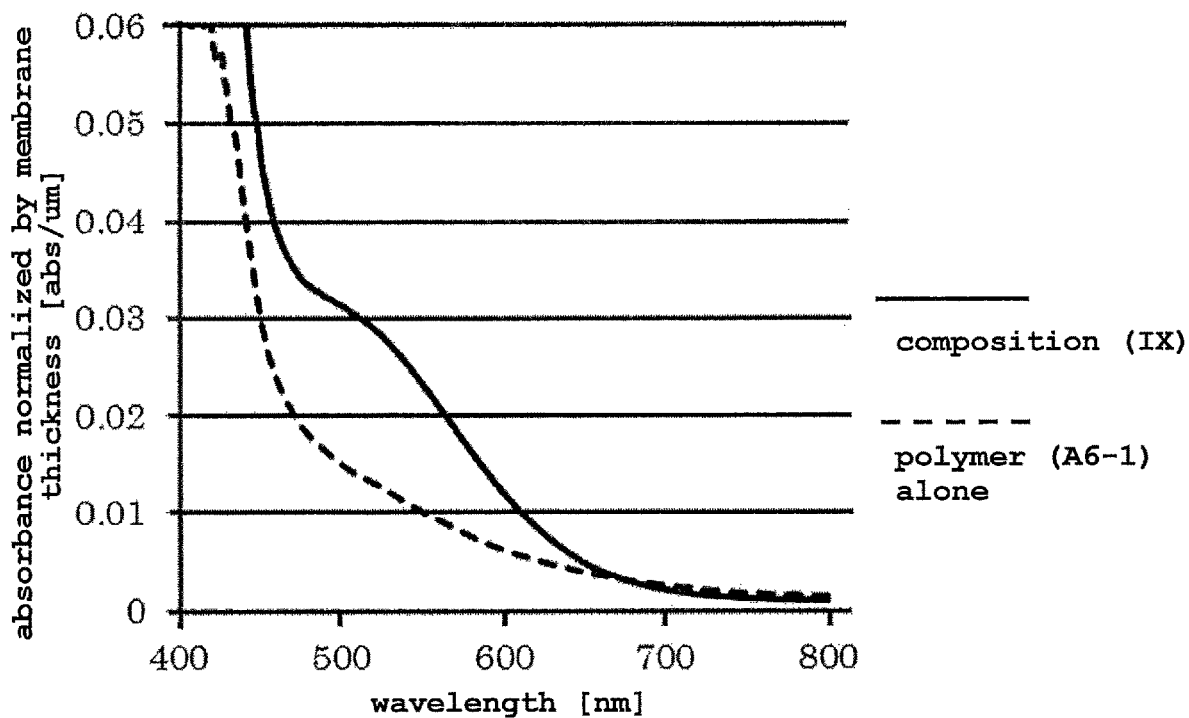
FIG. 14 shows absorption spectra of a membrane of electron-withdrawing polymer (A6-1) and a membrane of composition (IX) measured in Experimental Example 1 by ultraviolet-visible spectroscopy (UV-vis).
Figure 15:
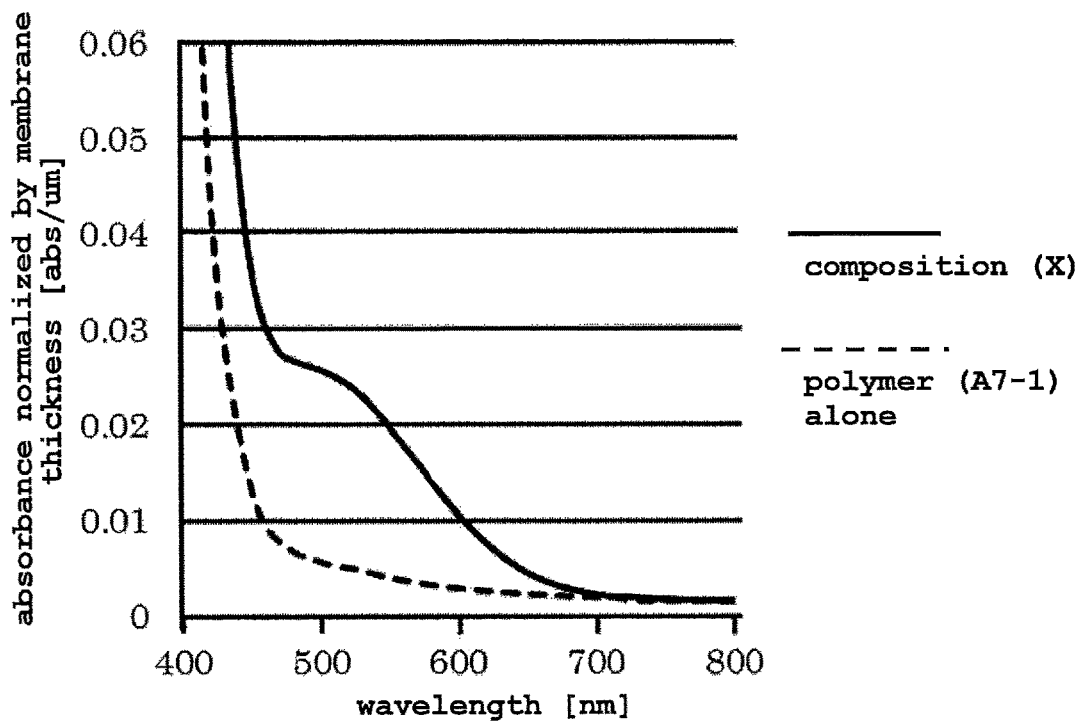
FIG. 15 shows absorption spectra of a membrane of electron-withdrawing polymer (A7-1) and a membrane of composition (X) measured in Experimental Example 1 by ultraviolet-visible spectroscopy (UV-vis).

The absorption spectra of the membrane of the electron-withdrawing polymer (A2-1) and the membrane of the composition (I) are shown in FIG. 9. In addition, the absorption spectra of the membrane of the electron-withdrawing polymer (A2-1) and the membrane of the composition (II) are shown in FIG. 10. In addition, the absorption spectra of the membrane of the electron-withdrawing polymer (A2-1) and the membranes of the compositions (III) to (VI) are shown in FIG. 11. In addition, the absorption spectra of the membrane of the electron-withdrawing polymer (A6-1) and the membrane of the composition (IX) are shown in FIG. 14. In addition, the absorption spectra of the membrane of the electron-withdrawing polymer (A7-1) and the membrane of the composition (X) are shown in FIG. 15.

As shown in FIG. 9 to FIG. 11, FIGS. 14 and 15, the absorption spectra of the membranes of the compositions (I) to (VI), (IX) and (X) had a shoulder at around 530 nm. This shoulder shows absorption by a charge-transfer complex (see Nature, 375(6529), 303-305 (1995) and Polym. J. (2013), 45, 839-844). Therefore, from the results, it was confirmed that the membranes of the composition (I) to (VI) formed a charge-transfer complex. Formation of a charge-transfer complex between the main chains of two or more different polymers has not been reported heretofore.

Experimental Example 2: Measurement (No. 1) of Tensile Breaking Strength, Tensile Elastic Modulus and Tensile Breaking Elongation The tensile breaking strength, tensile elastic modulus and tensile breaking elongation of the membranes of the compositions (IV) to (VI) obtained in Examples 4 to 6, and the membrane of the electron-withdrawing polymer (A2-1) obtained in Reference Example 1 were measured as mentioned above. The results are shown in Table 6. As shown in Table 6, the membranes of the composition (IV) to (VI) showed improved tensile breaking strength as compared to the membrane of the electron-withdrawing polymer (A2-1).

TABLE 6

| | composition or polymer | tensile breaking strength (MPa) | tensile elastic modulus (GPa) | tensile breaking elongation (%) |
| --- | --- | --- | --- | --- |
| Reference Example 1 | (A2-1) | 54 | 2.2 | 2.7 |
| Example 4 | (IV) | 104 | 2.3 | 8.6 |
| Example 5 | (V) | 115 | 2.4 | 8.0 |
| Example 6 | (VI) | 77 | 1.5 | 7.0 |

Experimental Example 3: Measurement (No. 2) of Tensile Breaking Strength, Tensile Elastic Modulus and Tensile Breaking Elongation The tensile breaking strength, tensile elastic modulus and tensile breaking elongation of the membrane of the composition (IV) obtained in Example 4 and the membrane of the heat-treated composition (XII) obtained in Example 12 were measured as mentioned above. The results are shown in Table 7. As shown in Table 7, the membranes of the composition (XII) showed about 2-times improved tensile breaking strength as compared to the membrane of the composition (IV) free of a heat treatment.

TABLE 7

| Example | composition or heat-treated composition | tensile breaking strength (MPa) | tensile elastic modulus (GPa) | tensile breaking elongation (%) |
| --- | --- | --- | --- | --- |
| 4 | (IV) | 104 | 2.34 | 8.6 |
| 12 | (XII) | 231 | 2.62 | 13.5 |

Experimental Example 4: Measurement (No. 3) of Tensile Breaking Strength, Tensile Elastic Modulus and Tensile Breaking Elongation The tensile breaking strength, tensile elastic modulus and tensile breaking elongation of the membrane of the heat-treated composition (XXII) obtained in Example 22 and the membrane of the electron-withdrawing polymer (A8-1) alone obtained in Reference Example 5 were measured as mentioned above. The results are shown in Table 8. As shown in Table 8, the membrane of the heat-treated composition (XXII) showed about 1.7-times improved tensile breaking strength as compared to the membrane of the electron-withdrawing polymer (A8-1) alone obtained in Reference Example 5.

TABLE 8

| | heat-treated composition or polymer | tensile breaking strength (MPa) | tensile elastic modulus (GPa) | tensile breaking elongation (%) |
| --- | --- | --- | --- | --- |
| Example 22 | (XXII) | 75 | 1.4 | 6.4 |
| Reference Example 5 | (A8-1) | 43 | 1.9 | 2.7 |

Experimental Example 5: Measurement of SEM-EDX

Figure 12:
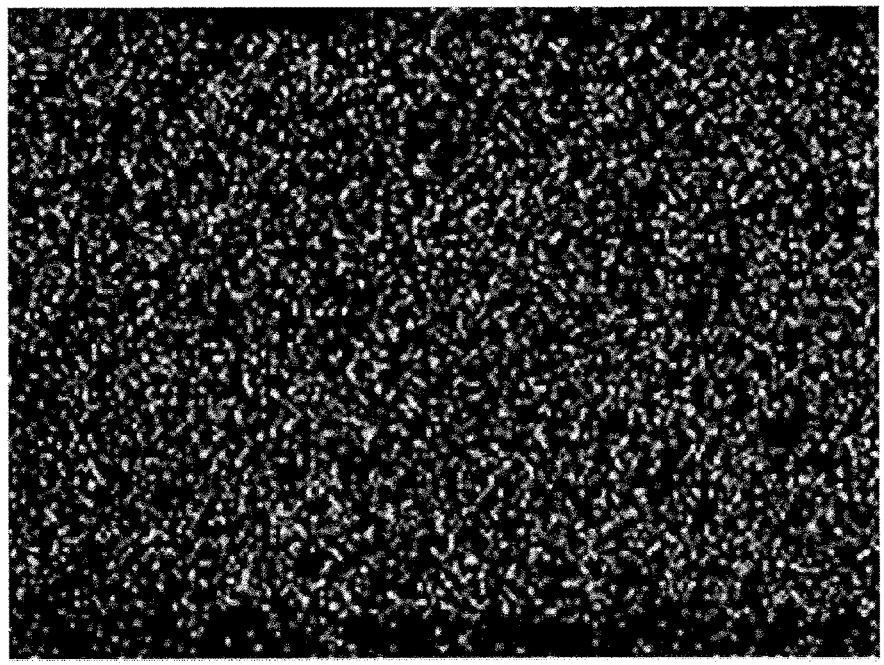
FIG. 12 shows element mapping of fluorine by EDX of the membrane of composition (I) measured in Experimental Example 5.
Figure 13:
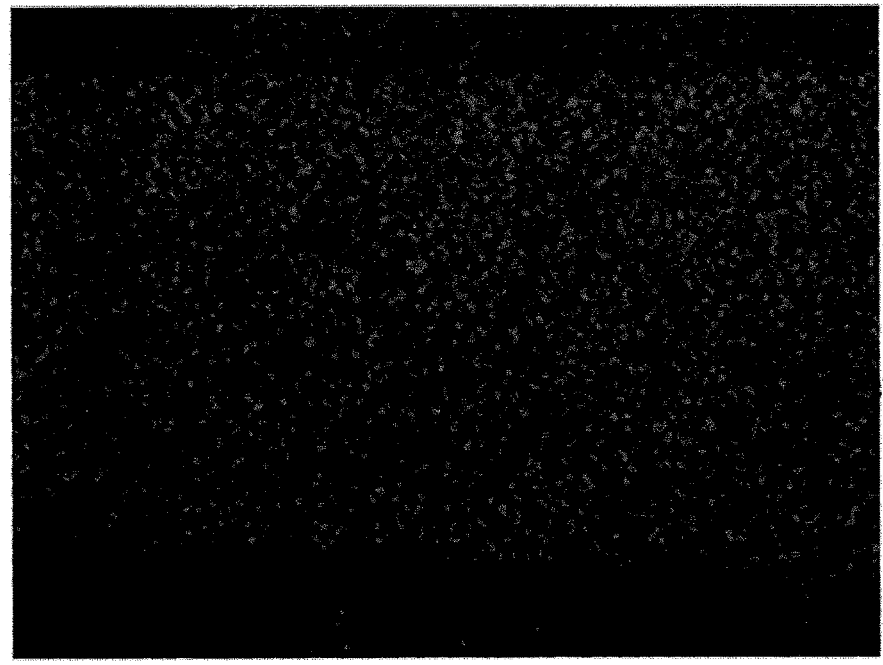
FIG. 13 shows element mapping of fluorine by EDX of the membrane of composition (II) measured in Experimental Example 5.

SEM-EDX of the membranes of the compositions (I) and (II) obtained in Examples 1 and 2 was measured as mentioned above. As a result, the fluorine atom contained in the electron-withdrawing polymer (A2-1) was uniformly detected in the whole membrane. From the results, it could be confirmed that the electron-donating polymer (D2-1) and the electron-withdrawing polymer (A2-1) were uniformly mixed and phase separation did not occur in micrometer order. Element mapping of fluorine of the obtained membrane of the composition (I) by EDX is shown in FIG. 12. In addition, element mapping of fluorine of the obtained membrane of the composition (II) by EDX is shown in FIG. 13.

Experimental Example 6: Measurement of Water Absorption Rate

Test pieces (1 cm×1 cm, about 1 to 4 mg) were cut out from the membranes of the compositions (III) to (VI) obtained in Examples 3 to 6, dried at 80° C. for 24 hr, and a dry weight Wd of the test pieces was measured. The test pieces were immersed in water at room temperature for 24 hr. The test pieces were taken out from the water, water attached to the surface was rapidly wiped out with paper and the weight Ws of the test pieces after immersion in water was measured. Water absorption rate (%) was calculated from Wd and Ws, and the following formula:

Water Absorption Rate (%)=100×(Ws−Wd)/Wd.

The results are shown in Table 9.

TABLE 9

| Example | composition | water absorption rate (%) |
|---|---|---|
| 3 | (III) | 53 |
| 4 | (IV) | 46 |
| 5 | (V) | 29 |
| 6 | (VI) | 20 |

Experimental Example 7: Measurement of Hydrogen Gas Permeability

The hydrogen gas permeability of the membranes of compositions (IV) to (VI) (membrane thickness: 10 μm) produced in the same manner as in Examples 4 to 6 was measured as mentioned above. In addition, the hydrogen gas permeability of a membrane of Nafion 212 (Nafion is registered trade mark, manufactured by Du Pont, purchased from TOYO Corporation, membrane thickness: 50 μm) was measured similarly. The results are shown in Table 10. As shown in Table 10, the membranes of the compositions (IV) to (VI) showed low hydrogen gas permeability as compared to a commercially available membrane of Nafion 212. When the membranes of the composition (IV) to (VI) having low hydrogen gas permeability are used as electrolyte membrane of a fuel cell, crossover of fuel gas can be suppressed and improvement of the property of the fuel cell can be expected.

TABLE 10

| composition or polymer | hydrogen gas permeability (mol/msPa) |
|---|---|
| (IV) | $2.4 \times 10^{-10}$ |
| (V) | $1.8 \times 10^{-10}$ |
| (VI) | $1.6 \times 10^{-10}$ |
| Nafion 212 | $8.6 \times 10^{-10}$ |

Experimental Example 8: Power Generation Test 1 (No. 1) of Fuel Cell

Using the membrane of composition (IV) (membrane thickness: 13 μm) produced in the same manner as in Example 4 and Nafion 212 (manufactured by Du Pont, purchased from TOYO Corporation, membrane thickness: 50 μm) as electrolyte membranes, a power generation test 1 of fuel cell was performed as mentioned above. The results are shown in Table 11. As shown in Table 11, the cell resistance value of the membrane of the composition (IV) was almost equivalent to that of the commercially available Nafion 212. Furthermore, OCV of a single cell prepared using the membrane of the composition (IV) as an electrolyte membrane was 0.875V.

TABLE 11

| composition or polymer | cell resistance value (Ω) |
|---|---|
| (IV) | 0.23 |
| Nafion 212 | 0.22 |

Also, the results of the voltage and current density in power generation test 1 using the membrane of the composition (IV) are shown in Table 12.

TABLE 12

| voltage (V) | current density (A/cm$^2$) |
|---|---|
| 0.63 | 0.10 |
| 0.54 | 0.20 |
| 0.47 | 0.30 |
| 0.40 | 0.40 |
| 0.33 | 0.50 |
| 0.27 | 0.60 |

Experimental Example 9: Power Generation Test 1 (No. 2) of Fuel Cell

Using the membranes of heat-treated composition (XX) (membrane thickness: 14 μm) produced in the same manner as in Example 20 as an electrolyte membrane, power generation test 1 of fuel cell was performed as mentioned above. The cell resistance value of the membranes of the heat-treated composition (XX) was 0.65(Ω). Furthermore, OCV of a single cell prepared using the membrane of the heat-treated composition (XX) as an electrolyte membrane was 0.847V. The results of the voltage and current density in the power generation test 1 are shown in Table 13.

TABLE 13

| voltage (V) | current density (A/cm$^2$) |
|---|---|
| 0.59 | 0.10 |
| 0.48 | 0.20 |
| 0.38 | 0.30 |
| 0.27 | 0.40 |

Experimental Example 10: Power Generation Test 2 of Fuel Cell

A power generation test 2 of fuel cell using a catalyst layer containing the composition (VIII) (i.e., composition of the electron-donating polymer (D3a-1) and the electron-withdrawing polymer (A4-1)) was performed as mentioned above. The results of the voltage and current density in the power generation test 2 are shown in Table 14. As shown in Table 14, it was confirmed that power can be generated using the catalyst layer containing the composition (VIII).

TABLE 14

| voltage (V) | current density (A/cm$^2$) |
|---|---|
| 0.60 | 0.05 |
| 0.47 | 0.10 |

Experimental Example 11: Power Generation Test 3 of Fuel Cell

A power generation test 3 of fuel cell using a catalyst layer containing the composition (XI) (i.e., composition of the electron-donating polymer (D3a-1) and the electron-withdrawing polymer (A4-1)) was performed as mentioned above. The results of the voltage and current density in the power generation test 3 are shown in Table 15. As shown in Table 15, it was confirmed that power can be generated using the catalyst layer containing the composition (XI).

TABLE 15

| voltage (V) | current density (A/cm$^2$) |
|---|---|
| 0.60 | 0.13 |
| 0.45 | 0.28 |

Experimental Example 12: Confirmation of Charge-Transfer Complex

The absorption spectrum of the membrane of the electron-withdrawing polymer (A2-1) and the membranes of the compositions (III) to (VI), as well as the membrane of the heat-treated electron-withdrawing polymer (A2-1) and the membranes of the heat-treated compositions (XII) to (XIV) was measured by ultraviolet-visible spectroscopy (UV-vis). The molar fraction (%) of (A2-1) in the membrane of the electron-withdrawing polymer (A2-1) and the like used is shown in Table 16. The molar fraction of (A2-1) in the membrane of the electron-withdrawing polymer (A2-1) and the membrane of the heat-treated electron-withdrawing polymer (A2-1) is 100%.

TABLE 16

| | molar fraction (%) of (A2-1) |
|---|---|
| electron-withdrawing polymer (A2-1) | 100 |
| composition (III) | 80 |
| composition (IV) | 67 |
| composition (V) | 50 |
| composition (VI) | 33 |
| heat-treated electron-withdrawing polymer (A2-1) | 100 |
| heat-treated composition (XII) | 67 |
| heat-treated composition (XIII) | 50 |
| heat-treated composition (XIV) | 33 |

Figure 16:
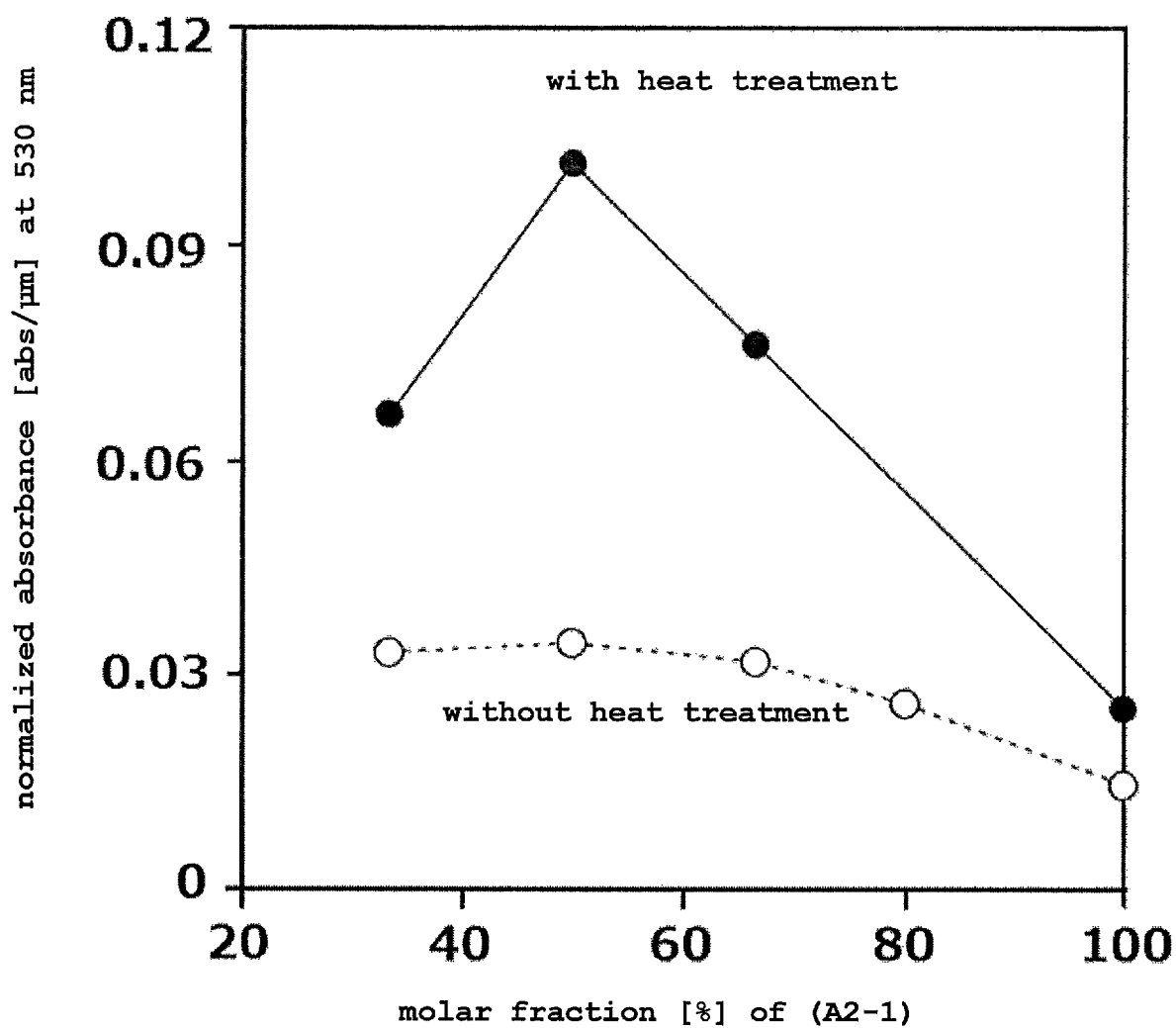
FIG. 16 is a graph showing the relationship between a molar fraction of (A2-1) in a membrane of a polymer or composition without a heat treatment and a molar fraction of (A2-1) in a membrane of a heat-treated polymer or heat-treated composition, and normalized absorbance at 530 nm of the absorption spectrum measured in Experimental Example 12.

A graph showing the relationship between a molar fraction of (A2-1) in a membrane of a polymer or composition without a heat treatment and a molar fraction of (A2-1) in a membrane of a heat-treated polymer or heat-treated composition, and normalized absorbance at 530 nm of the measured absorption spectrum is shown in FIG. 16.

As shown in FIG. 16, irrespective of the presence or absence of heat treatment, the absorbance at 530 nm derived from a charge-transfer complex was the maximum when the molar fraction of (A2-1) was 50%. From the results, it was confirmed that the formation amount of the charge-transfer complex reached maximum when the molar ratio of dioxynaphthalene part (d) of the electron-donating polymer (D3a-1) and naphthalene tetracarboxylic acid diimide part (a) of the electron-withdrawing polymer (A2-1) was 1:1.

Furthermore, the absorbance of the membrane of the heat-treated composition at 530 nm was 2 to 3 times higher as compared to the absorbance of the membrane of the composition without a heat treatment. From the results, it was confirmed that, in the composition without a heat treatment, a part free from formation of the charge-transfer complex of the electron-donating polymer (D3a-1) and the electron-withdrawing polymer (A2-1) forms a charge-transfer complex by a heat treatment.

Experimental Example 13: Evaluation of Chemical Durability

A chemical durability evaluation test of the membrane of the heat-treated composition (XVIII) (membrane thickness: 11 μm) obtained in Example 18, the membrane (membrane thickness: 12 μm) of electron-withdrawing polymer (A8-1) alone produced in the same manner as in Reference Example 5, and the membrane (membrane thickness: 51 μm) of Nafion 212 was performed as mentioned above. The results are shown in Table 17. In this test, the membranes of the heat-treated composition (XVIII) showed the same level of chemical durability as the membrane of Nafion 212.

The membrane of the electron-withdrawing polymer (A8-1) alone was melted in Fenton test solution in 15 min from the start of the chemical durability evaluation test and could not maintain the shape of the membrane. From a comparison of the membrane of the heat-treated composition (XVIII) and the membrane of the electron-withdrawing polymer (A8-1) alone, it could be confirmed that the membranes of the composition (XVIII) suppressed dissolution in Fenton test solution (i.e., so aqueous solution containing iron (II) sulfate and hydrogen peroxide).

TABLE 17

| | residual rate (wt %) |
|---|---|
| Nafion 212 | 98 |
| membrane of heat-treated composition (XVIII) | >99 |
| membrane of electron-withdrawing polymer (A8-1) alone | 0 |

INDUSTRIAL APPLICABILITY

The composition of the present invention is useful as, for example, an electrolyte material for a fuel cell (e.g., electrolyte material used for catalyst layer, electrolyte membrane etc.).

This application is based on patent application Nos. 2016-196739, 2017-019056 and 2017-096077 filed in Japan, the contents of which are incorporated in full herein.

The invention claimed is:

1. A composition comprising electron-donating polymer (D) and electron-withdrawing polymer (A), wherein
the electron-donating polymer (D) has a structure represented by the formula (1):

wherein $X^1$ is a divalent group containing a naphthalene ring,
$Y^1$ is a divalent group containing a $C_{3-10}$ alkylene group optionally having a substituent or a divalent group containing a benzene ring optionally having a substituent, and
shows a bonding position, and
the electron-withdrawing polymer (A) has a structure represented by the formula (2):

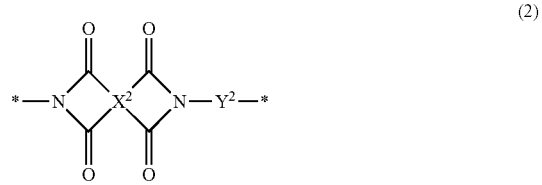

wherein $X^2$ is a tetravalent group containing a naphthalene ring, when $Y^1$ is a divalent group containing a $C_{3-10}$ alkylene group optionally having a substituent, then $Y^2$ is a divalent group containing a benzene ring optionally having a substituent, when $Y^1$ is a divalent group containing a benzene ring optionally having a substituent, then $Y^2$ is a divalent group containing a $C_{3-10}$ alkylene group optionally having a substituent, and

* shows a bonding position.

2. The composition according to claim 1, wherein at least one of $Y^1$ and $Y^2$ has a sulfo group.

3. The composition according to claim 1, wherein $Y^1$ is a divalent group containing a $C_{3-10}$ alkylene group optionally having a substituent, and $Y^2$ is a divalent group containing a benzene ring optionally having a substituent.

4. The composition according to claim 1, wherein $X^1$ is a divalent group represented by the formula (3) or the formula (4):

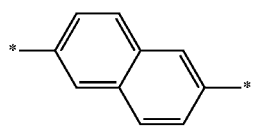

(3)

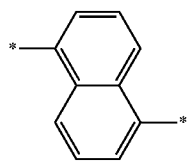

(4)

wherein * shows a bonding position.

5. The composition according to claim 1, wherein $X^2$ is a tetravalent group represented by the formula (5), the formula (6-1) or the formula (6-2):

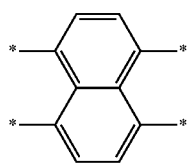

(5)

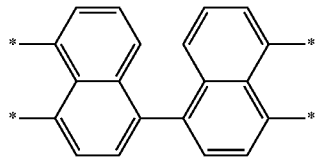

(6-1)

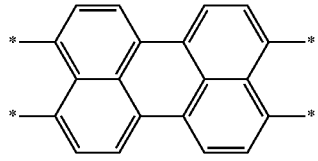

(6-2)

wherein * shows a bonding position.

6. The composition according to claim 1, wherein $Y^1$ or $Y^2$ is a divalent group containing a structure represented by the formula (7):

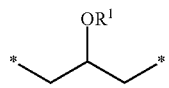

(7)

wherein $R^1$ is a hydrogen atom or a sulfo group, and * shows a bonding position.

7. The composition according to claim 1, wherein $Y^1$ or $Y^2$ is a divalent group represented by any of the formula (8) to the formula (11):

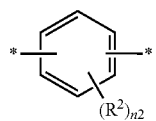

(8)

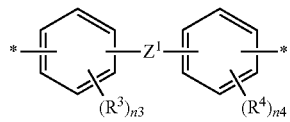

(9)

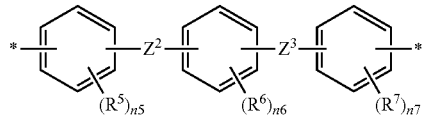

(10)

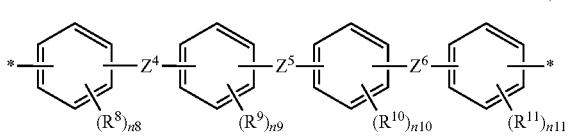

(11)

wherein n2 to n11 are each independently an integer of 0 to 4, $R^2$ to $R^{11}$ are each independently a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group, a sulfo group, a phenyl group optionally substituted by $W^1$, a thienyl group optionally substituted by $W^1$, or a furyl group optionally substituted by $W^1$, $W^1$ is a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group or a sulfo group, when n2 to n11 are an integer of 2 to 4, plural $R^2$ to $R^{11}$ are optionally the same as or different from each other, $Z^1$ to $Z^6$ are each independently a single bond, a $C_{1-2}$ alkylene group optionally substituted by a halogen atom, a $C_{3-10}$ alkylene group, a sulfonyl group, a carbonyl group, *—CONH—*, *—NHCO—*, *—C($R^{21}$)($R^{22}$)—*, or an oxy group, $R^{21}$ and $R^{22}$ are each independently a $C_{1-3}$ alkyl group optionally substituted by a halogen atom, or $R^{21}$ and $R^{22}$ are bonded to each other to form a $C_{3-6}$ hydrocarbon ring together with a carbon atom bonded thereto, and

* shows a bonding position.

8. The composition according to claim 1, wherein the electron-donating polymer (D) comprises electron-donating polymer (D1) having a constitutional unit represented by the formula (12) or the formula (13):

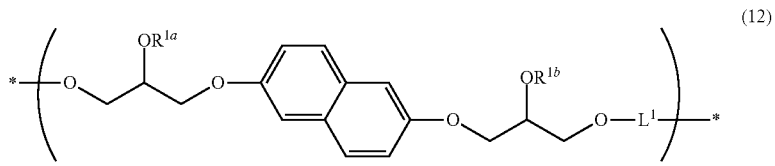

(12)

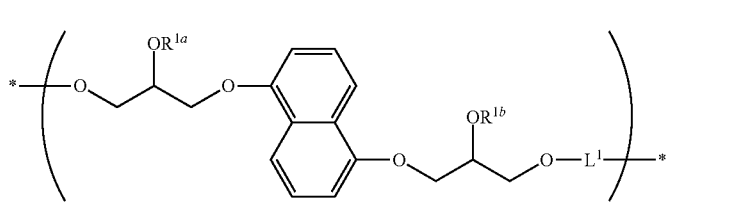

(13)

wherein $L^1$ is a divalent group represented by the formula (3), the formula (4) or the formula (14):

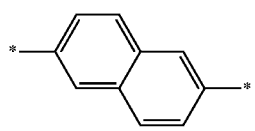

(3)

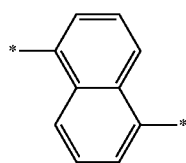

(4)

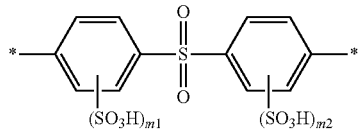

(14)

{wherein m1 and m2 are each independently an integer of 0 to 4, and * shows a bonding position}, when $L^1$ is a divalent group represented by the formula (3) or the formula (4), $R^{1a}$ and $R^{1b}$ are hydrogen atoms, when $L^1$ is a divalent group represented by the formula (14), $R^{1a}$ and $R^{1b}$ are each independently a hydrogen atom or a sulfo group, and

* shows a bonding position.

9. The composition according to claim 8, wherein the electron-donating polymer (D1) comprises electron-donating polymer (D2) having a constitutional unit represented by the formula (15):

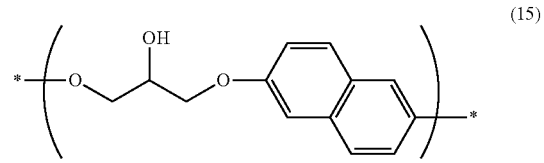

(15)

wherein * shows a bonding position.

10. The composition according to claim 8, wherein the electron-donating polymer (D1) comprises electron-donating polymer (D3) having a constitutional unit represented by the formula (16):

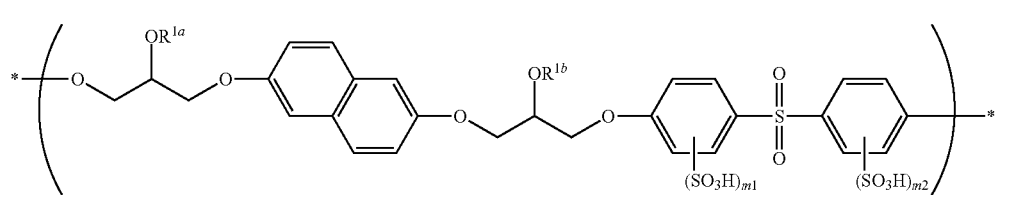

(16)

wherein $R^{1a}$ and $R^{1b}$ are each independently a hydrogen atom or a sulfo group, m1 and m2 are each independently an integer of 0 to 4, and

* shows a bonding position.

11. The composition according to claim 8, wherein $R^{1a}$ and $R^{1b}$ are hydrogen atoms.

12. The composition according to claim 8, wherein m1 and m2 are 0.

13. The composition according to claim 7, wherein the divalent group represented by the formula (8) is a divalent group represented by the formula (8-1):

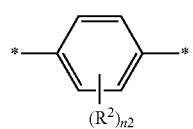

(8-1)

wherein n2, $R^2$ and * are as defined above, and $Z^1$ to $Z^6$ are each independently a single bond, a $C_{1-2}$ alkylene group optionally substituted by a halogen atom, a $C_{3-10}$ alkylene group, a sulfonyl group, a carbonyl group, *—CONH—*, *—NHCO—*, or an oxy group.

14. The composition according to claim 1, wherein the electron-withdrawing polymer (A) comprises electron-withdrawing polymer (A1a) having a constitutional unit represented by the formula (17a):

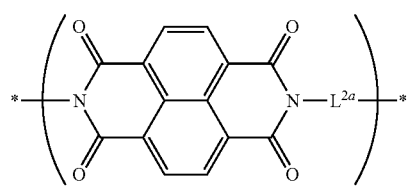

(17a)

$L^{2a}$ is a divalent group represented by any of the formula (8) to the formula (11):

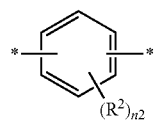

(8)

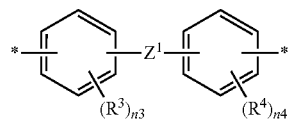

(9)

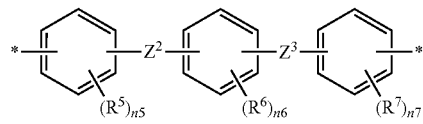

(10)

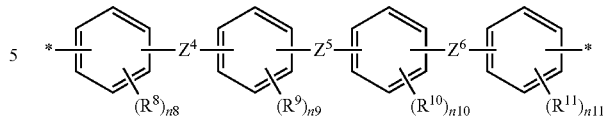

(11)

{wherein n2 to n11 are each independently an integer of 0 to 4, $R^2$ to $R^{11}$ are each independently a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group, a sulfo group, a phenyl group optionally substituted by $W^1$, a thienyl group optionally substituted by $W^1$, or a furyl group optionally substituted by $W^1$, $W^1$ is a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group or a sulfo group, when n2 to n11 are each an integer of 2 to 4, plural $R^2$ to $R^{11}$ are optionally the same as or different from each other, $Z^1$ to $Z^6$ are each independently a single bond, a $C_{1-2}$ alkylene group optionally substituted by a halogen atom, a $C_{3-10}$ alkylene group, a sulfonyl group, a carbonyl group, *—CONH—*, *—NHCO—*, *—C($R^{21}$)($R^{22}$)—*, or an oxy group, $R^{21}$ and $R^{22}$ are each independently a $C_{1-3}$ alkyl group optionally substituted by a halogen atom, or $R^{21}$ and $R^{22}$ are bonded to each other to form a $C_{3-6}$ hydrocarbon ring together with a carbon atom bonded thereto, and * shows a bonding position}, and

* shows a bonding position.

15. The composition according to claim 14, wherein the electron-withdrawing polymer (A1a) comprises electron-withdrawing polymer (A1b) having a constitutional unit represented by the formula (23):

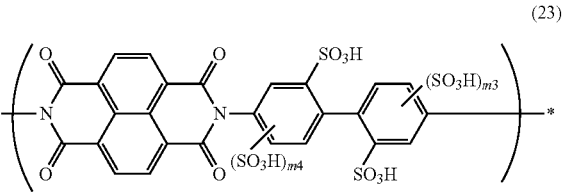

(23)

wherein m3 and m4 are each independently an integer of 0 to 3, and * shows a bonding position, and a constitutional unit represented by the formula (17b):

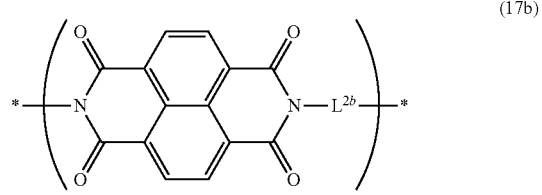

(17b)

wherein $L^{2b}$ is a divalent group represented by any of the formula (8b) to the formula (11b):

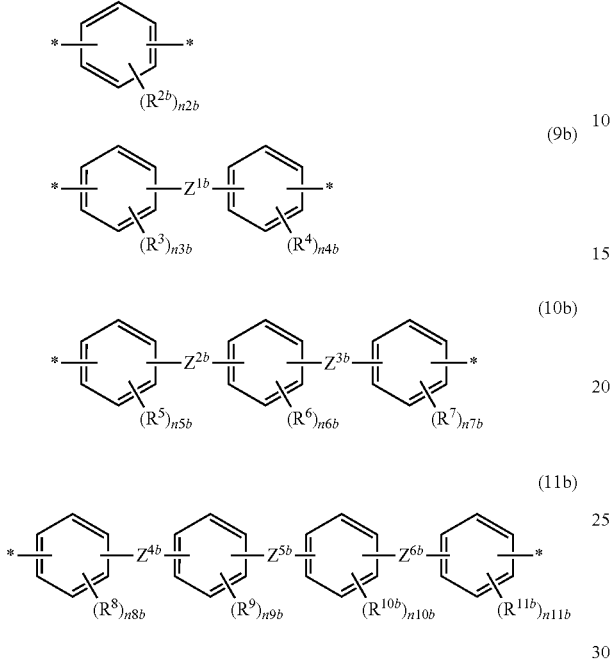

{wherein n2b to n11b are each independently an integer of 0 to 4, $R^{2b}$ to $R^{11b}$ are each independently a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group, a phenyl group optionally substituted by $W^{1b}$, a thienyl group optionally substituted by $W^{1b}$, or a furyl group optionally substituted by $W^{1b}$, $W^{1b}$ is a $C_{1-10}$ alkyl group optionally substituted by a halogen atom, a $C_{1-10}$ alkoxy group I optionally substituted by a halogen atom, a hydroxy group, a halogen atom, a nitro group, a formyl group, or a cyano group, when n2b to n11b are each an integer of 2 to 4, plural $R^{2b}$ to $R^{11b}$ are optionally the same as or different from each other, $Z^{1b}$ to $Z^{6b}$ are each independently a single bond, a $C_{1-2}$ alkylene group optionally substituted by a halogen atom, a $C_{3-10}$ alkylene group, a sulfonyl group, a carbonyl group, *—CONH—*, *—NHCO—*, *—C($R^{21b}$)($R^{22b}$)—*, or an oxy group, $R^{21b}$ and $R^{22b}$ are each independently a $C_{1-3}$ alkyl group optionally substituted by a halogen atom, or $R^{21b}$ and $R^{22b}$ are bonded to each other to form a $C_{3-6}$ hydrocarbon ring together with a carbon atom bonded thereto, and * shows a bonding position}, and

* shows a bonding position.

16. The composition according to claim 1, wherein the electron-withdrawing polymer (A) comprises electron-withdrawing polymer (A1) having a constitutional unit represented by the formula (17):

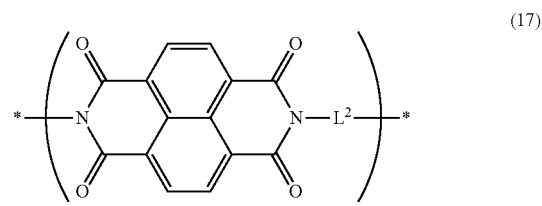

wherein $L^2$ is a divalent group represented by any of the formula (18) to the formula (22), the formula (31) and the formula (32):

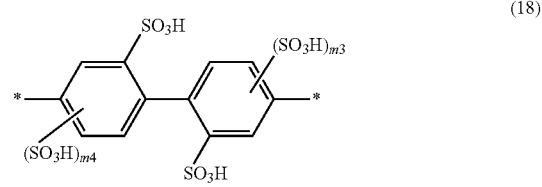

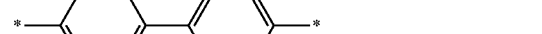

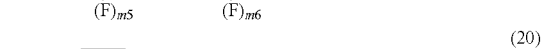

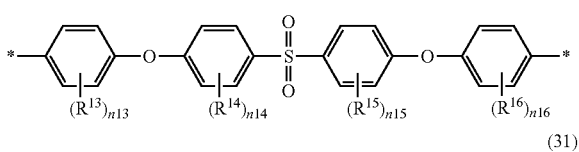

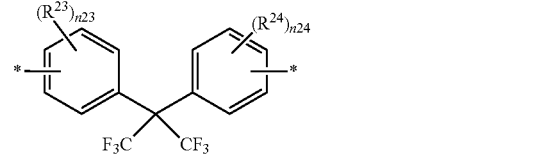

{wherein m3 and m4 are each independently an integer of 0 to 3, m5 to m7 are each independently an integer of 1 to 4, n12 is an integer of 1 to 4, $R^{12}$ is a fluorine atom or a trifluoromethyl group, when n12 is an integer of 2 to 4, plural $R^{12}$ are optionally the same as or different from each other, n13 to n16 are each independently an integer of 0 to 4, $R^{13}$ is a nitro group, a sulfo group or a trifluoromethyl group, when n13 is an integer of 2 to 4, plural $R^{13}$ are optionally the same as or different from each other, $R^{14}$ is a chlorine atom or a sulfo group, when n14 is an integer of 2 to 4, plural $R^{14}$ are optionally the same as or different from each other, $R^{15}$ is a chlorine atom or a sulfo group, when n15 is an integer of 2 to 4, plural $R^{15}$ are optionally the same as or different from each other, $R^{16}$ is a nitro group, a sulfo group or a trifluoromethyl group, when n16 is an integer of 2 to 4, plural $R^{16}$ are optionally the same as or different from each other, n23 and n24 are each independently an integer of 0 to 4, $R^{23}$ is a $C_{1-3}$ alkyl group optionally substituted by a halogen atom, or a sulfo group, when n23 is an integer of 2 to 4, plural $R^{23}$ are optionally the same as or different from each other, $R^{24}$ is a $C_{1-3}$ alkyl group optionally substituted by a halogen atom, or a sulfo group, when n24 is an integer of 2 to 4, plural $R^{24}$ are optionally the same as or different from each other, n25 and n26 are each independently an integer of 0 to 4, $R^{25}$ is a $C_{1-3}$ alkyl group optionally substituted by a halogen atom, or a sulfo group, when n25 is an integer of 2 to 4, plural $R^{25}$ are optionally the same as or different from each other, $R^{26}$ is a $C_{1-3}$ alkyl group optionally substituted by a halogen atom, or a sulfo group, when n26 is an integer of 2 to 4, plural $R^{26}$ are optionally the same as or different from each other, and * shows a bonding position}, and

* shows a bonding position.

17. The composition according to claim 16, wherein the electron-withdrawing polymer (A1) comprises electron-withdrawing polymer (A2) having a constitutional unit represented by the formula (23):

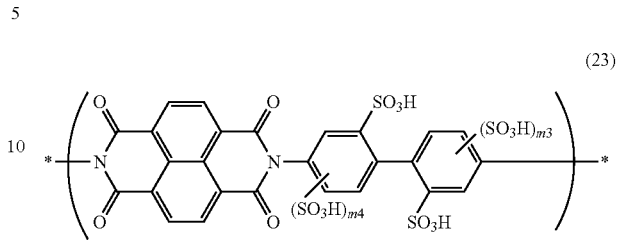

(23)

wherein m3 and m4 are each independently an integer of 0 to 3, and * shows a bonding position, and a constitutional unit represented by the formula (24):

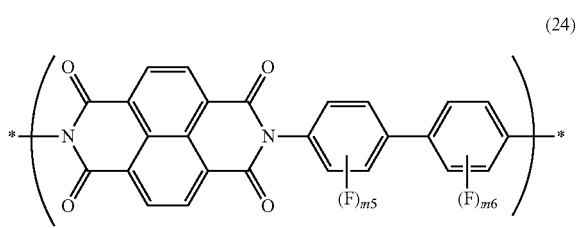

(24)

wherein m5 and m6 are each independently an integer of 1 to 4, and * shows a bonding position.

18. The composition according to claim 1, wherein the electron-donating polymer (D) and the electron-withdrawing polymer (A) form a charge-transfer complex.

19. An electrolyte membrane of a fuel cell comprising the composition according to claim 1.

20. A catalyst layer of a fuel cell comprising the composition according to claim 1.

* * * * *